United States Patent
Ramachandra et al.

(10) Patent No.: US 12,348,448 B2
(45) Date of Patent: Jul. 1, 2025

(54) FIRST NETWORK NODE, SECOND NETWORK NODE, THIRD NETWORK NODE AND METHODS PERFORMED THEREBY, FOR HANDLING A MEASUREMENT CONFIGURATION

(71) Applicant: Telefonaktiebolaget LM Ericsson (publ), Stockholm (SE)

(72) Inventors: Pradeepa Ramachandra, Linköping (SE); Alexander Vesely, Feldbach (AT); Angelo Centonza, Torrenueva Costa (ES); Yazid Lyazidi, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 17/796,043

(22) PCT Filed: Jan. 14, 2021

(86) PCT No.: PCT/SE2021/050019
§ 371 (c)(1),
(2) Date: Jul. 28, 2022

(87) PCT Pub. No.: WO2021/154138
PCT Pub. Date: Aug. 5, 2021

(65) Prior Publication Data
US 2023/0070368 A1    Mar. 9, 2023

Related U.S. Application Data

(60) Provisional application No. 62/968,246, filed on Jan. 31, 2020.

(51) Int. Cl.
*H04L 5/00*   (2006.01)

(52) U.S. Cl.
CPC .......... *H04L 5/0051* (2013.01); *H04L 5/0035* (2013.01)

(58) Field of Classification Search
CPC .................... H04L 5/0051; H04L 5/0035
(Continued)

(56) References Cited

U.S. PATENT DOCUMENTS

| 2016/0269982 A1* | 9/2016 | Larsson ................ H04L 5/0048 |
| 2017/0250787 A1 | 8/2017 | Geirhofer et al. |
| 2019/0253949 A1* | 8/2019 | Park ..................... H04W 76/19 |

OTHER PUBLICATIONS

Author Unknown, "Technical Specification Group Radio Access Network; NG-RAN; Xn application protocol (XnAP) (Release 15)," Technical Specification 38.423, Version 16.0.0, Dec. 2019, 3GPP Organizational Partners, 330 pages.
(Continued)

*Primary Examiner* — Gbemileke J Onamuti
(74) *Attorney, Agent, or Firm* — Withrow & Terranova, PLLC

(57) ABSTRACT

A method performed by a first network node. The first network node operates in a communications network. The method is for handling a measurement configuration. The first network node sends an indication to a second network node operating in the communications network. The indication indicates a transmission status of one or more Channel State Information-Reference Signal (CSI-RS) configurations of the first network node. The second network node receives the indication. The third network node receives another indication from the second network node. The third network node is managed by the second network node. The another indication indicates a transmission status of the one or more CSI-RS configurations of the first network node and configures the wireless device based on the received other indication.

24 Claims, 20 Drawing Sheets

(58) Field of Classification Search
USPC .......................................................... 370/329
See application file for complete search history.

(56) References Cited

OTHER PUBLICATIONS

ZTE Corporation, et al., "R2-1909796: Consideration on CSI-RS configuration transfer," 3GPP TSG-RAN WG2 Meeting #107, Aug. 26-30, 2019, Prague, Czech Republic, 12 pages.

Office Action for Taiwanese Patent Application No. 110103413, mailed Jun. 7, 2022, 13 pages.

Author Unknown, "Technical Specification Group Radio Access Network; Evolved Universal Terrestrial Radio Access Network (E-UTRAN); X2 application protocol (X2AP) (Release 16)," Technical Specification 36.423, Version 16.0.0, Dec. 2019, 3GPP Organizational Partners, 432 pages.

Author Unknown, "Technical Specification Group Radio Access Network; NR; Radio Resource Control (RRC) protocol specification (Release 15)," Technical Specification 38.331, Version 15.7.0, Sep. 2019, 3GPP Organizational Partners, 526 pages.

Author Unknown, "Technical Specification Group Radio Access Network; NG-RAN; Architecture description (Release 15)," Technical Specification 38.401, Version 15.4.0, Dec. 2018, 3GPP Organizational Partners, 40 pages.

Author Unknown, "Technical Specification Group Radio Access Network; NG-RAN; Xn application protocol (XnAP) (Release 15)," Technical Specification 38.423, Version 15.5.0, Sep. 2019, 3GPP Organizational Partners, 311 pages.

China Telecom, "R3-193588: Support of CSI-RS Configuration Transfer for SA and EN-DC," 3GPP TSG-RAN WG3 #105, Aug. 26-30, 2019, Ljubljana, Slovenia, 6 pages.

Ericsson, "R3-195941: Discussion on CSI transfer in NG-RAN nodes," 3GPP TSG-RAN3 Meeting #105bis, Oct. 14-18, 2019, Chongqing, China, 3 pages.

Huawei, et al., "R2-1914668: Report of [107bis#50][NR TEI16] Adding CSI-RS information into inter-nose msg," 3GPP TSG-RAN WG2 #108, Nov. 18-22, 2019, Reno, Nevada, 11 pages.

International Search Report and Written Opinion for International Patent Application No. PCT/SE2021/050019, mailed Apr. 29, 2021, 9 pages.

* cited by examiner a)

b)

a)

b)

a)

b)

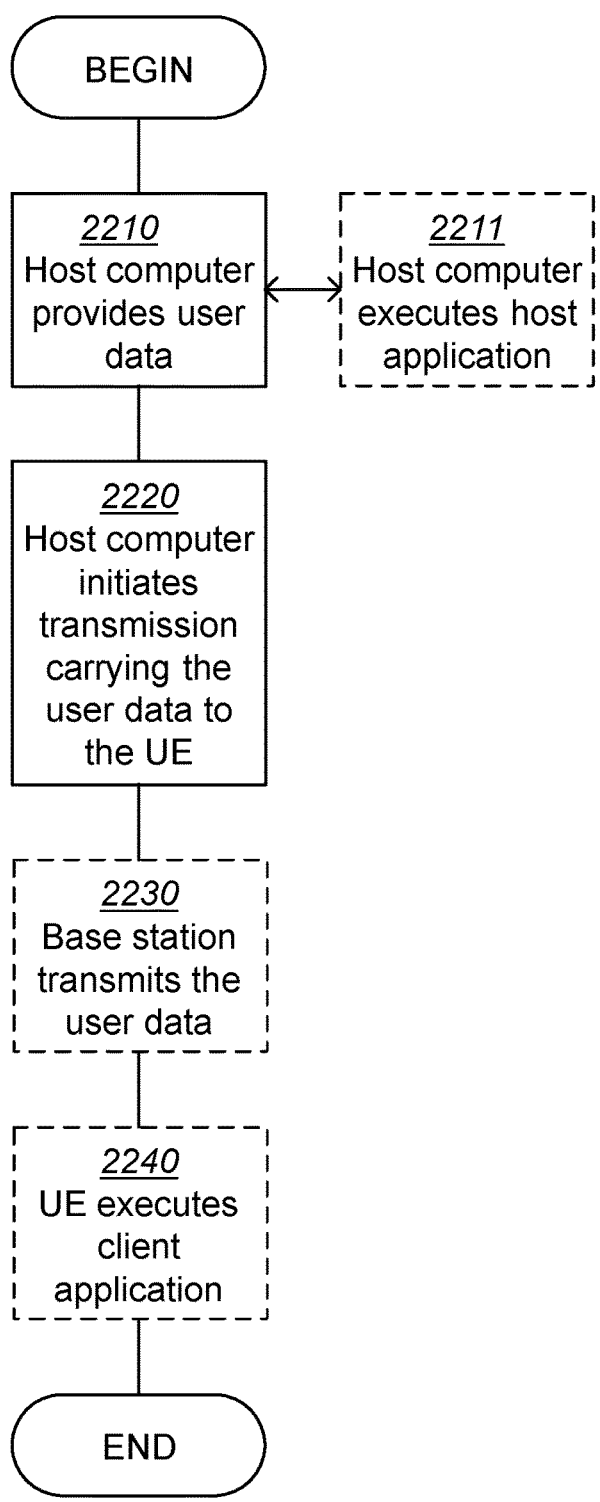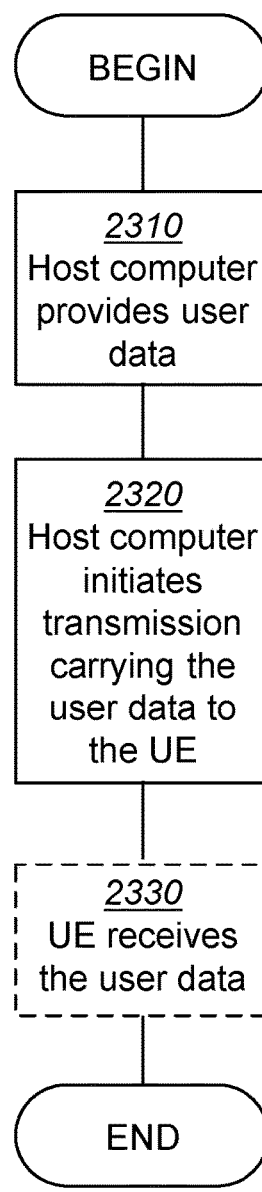
FIG. 22
FIG. 23

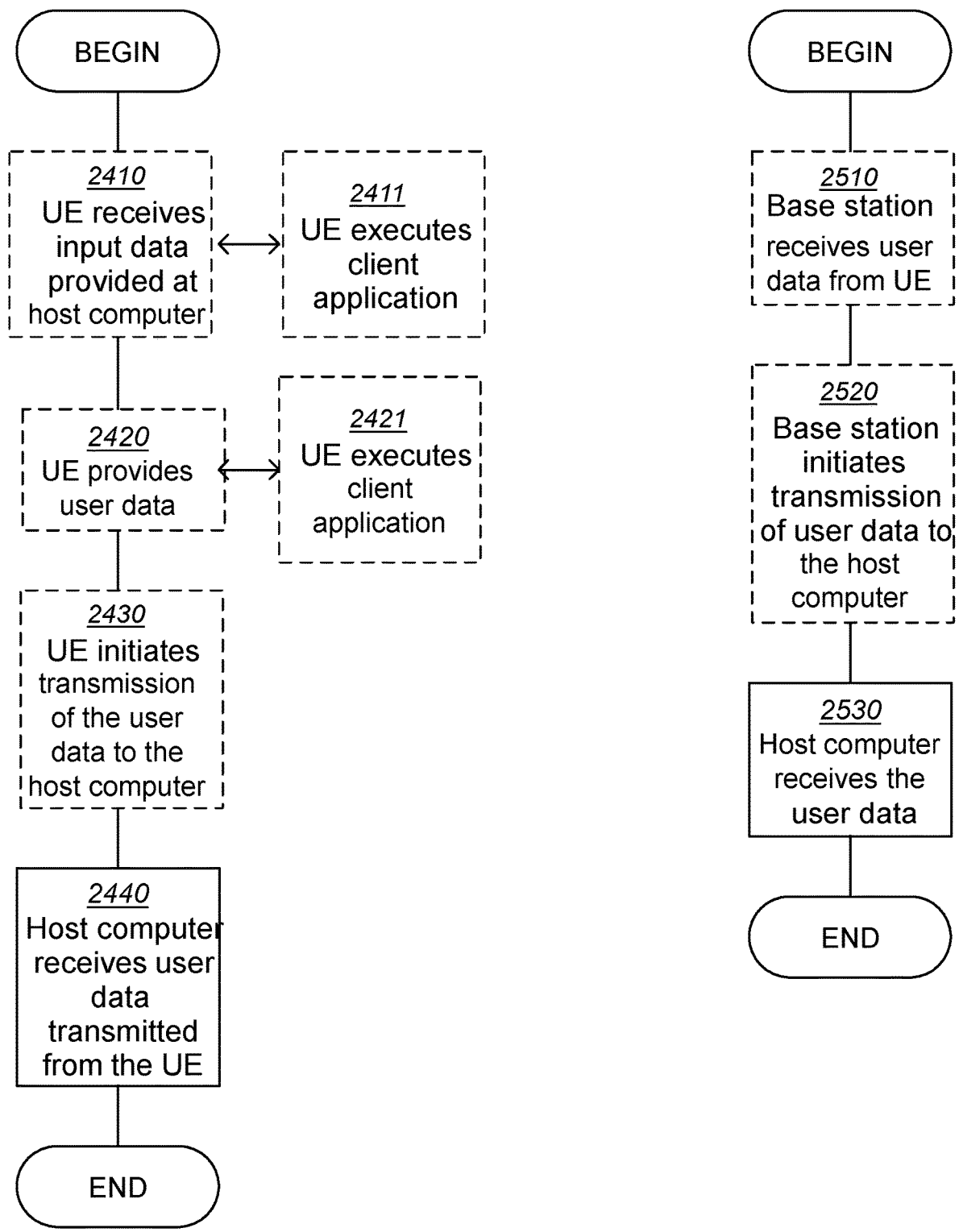

FIRST NETWORK NODE, SECOND NETWORK NODE, THIRD NETWORK NODE AND METHODS PERFORMED THEREBY, FOR HANDLING A MEASUREMENT CONFIGURATION

This application is a 35 U.S.C. § 371 national phase filing of International Application No. PCT/SE2021/050019, filed Jan. 14, 2021, which claims the benefit of provisional patent application Ser. No. 62/968,246, filed Jan. 31, 2020, the disclosures of which are incorporated herein by reference in their entireties.

TECHNICAL FIELD

The present disclosure relates generally to a first network node and methods performed thereby for handling a measurement configuration. The present disclosure relates generally to a second network node and methods performed thereby for handling a measurement configuration. The present disclosure relates generally to a third network node and methods performed thereby for handling a measurement configuration.

BACKGROUND

Wireless devices within a communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

5G Radio Network Architecture

The third generation partnership project (3GPP) is currently working on standardization of the 5th generation of mobile radio access system, also called Next Generation Radio Access Network (NG-RAN). The NG-RAN may include nodes providing radio connections according to the standard for New Radio (NR), as well as nodes providing radio connections according to the Long-Term Evolution (LTE) standard. The NG-RAN may need to be connected to some network that may provide non-access stratum functions and connection to communication networks outside NG-RAN, such as the internet.

The current Fifth Generation (5G) RAN (NG-RAN) architecture is described in TS 38.401 v15.4.0, http://www.3gpp.org/ftp//Specs/archive/38_series/38.401/38401440.zip, as depicted in FIG. 1. The NG architecture may be further described as follows. The NG-RAN 10 may comprise a set of gNBs 20 connected to the 5G Core network (5GC) 30 through the NG. A gNB may support FDD mode, TDD mode or dual mode operation. gNBs may be interconnected through the Xn interface 40. A gNB may comprise a gNB-CU 50 and gNB-DUs 60. A gNB-CU 50 and a gNB-DU 60 may be connected via an F1 logical interface 70. One gNB-DU 60 may be connected to only one gNB-CU 50. For resiliency, a gNB-DU 60 may be connected to multiple gNB-CU 50 by appropriate implementation. NG 80 may be understood to be another logical interface. The NG-RAN 10 may be layered into a Radio Network Layer (RNL) and a Transport Network Layer (TNL). The NG-RAN 10 architecture, that is, the NG-RAN logical nodes and interfaces between them, may be defined as part of the RNL. For each NG-RAN 10 interface, that is, NG, Xn and F1, the related TNL protocol and the functionality may be specified. The TNL may provide services for user plane transport and signalling transport.

A gNB may also be connected to an LTE eNB via the X2 interface. Another architectural option is that where an LTE eNB connected to the Evolved Packet Core network is connected over the X2 interface with a so called nr-gNB. The latter may be understood as a gNB not connected directly to a CN, and connected via X2 to an eNB for the sole purpose of performing dual connectivity.

The architecture in FIG. 1 may be expanded by splitting the gNB-CU into two entities. One gNB-CU-User Plane (UP), which may serve the user plane and host the Packet Data Convergence Protocol (PDCP) protocol, and one gNB-CU-Control Plane (CP), which may serve the control plane and host the PDCP and Radio Resource Control (RRC) protocols. For completeness it may be said that a gNB-DU may host the Radio Link Control (RLC)/Media Access Control (MAC)/Physical Layer (PHY) protocols.

General Background on CSI-RS

In the last 3GPP meetings, Channel State Information Reference Signal (CSI-RS) based mobility has been discussed and its benefits compared to SSB based mobility have been confirmed.

In fact, compared to Synchronization Signal Block (SSB), the 1-port CSI-RS that may be used for mobility purposes may be configured with a larger frequency bandwidth and with a narrower beam. In contrast, the measurement based on SSB may not always be able to reflect the channel quality of the narrow beam which may carry user data to the target cell. SSB may also not be transmitted in some cases, such as in Carrier Aggregation (CA) scenario. Moreover, the SSB based handover is not applicable for some scenarios, such as Single Frequency Network (SFN). The different Transmission Reception Points (TRPs) may share the same physical cell IDentifier (ID) and the UE may not be able to differentiate the SSBs which may be transmitted from different TRPs. The Network may then have problems in determining the TRP and resource for data transmission to the UE in SSB based handover. However, if CSI-RS based handover is supported, the network may immediately configure UE-specific TRP for data transmission based on CSI-RS and RRM measurement results that had triggered the handover.

Therefore, the CSI-RS based mobility, which is introduced as a function in NR, may provide higher accurate measurement results compared to SSB to improve handover success rate.

Background on CSI-RS in RAN3

The need of supporting inter-node CSI-RS based mobility was discussed in RAN3 since RAN3 #100AH meeting. The purpose of supporting CSI-RS between NG-RAN nodes may be understood to be to provide to the gNB the CSI-RS resource configurations of cells served by neighbour gNBs before configuring the CSI-RS measurements associated with those cells to the UE.

To address the inter-node CSI-RS mobility, XnAP procedures requirements were assessed for CSI-RS based Radio Resource Management (RRM) measurements, which may be configured to a UE per cell level. Two approaches on CSI-RS configuration transfer over Xn were proposed in the past RAN3 meetings.

In a first approach, or Approach 1, CSI-RS measurements may be exchanged in a Xn setup and updated in an NG-RAN node configuration update. By this approach, the CSI-RS configuration of cells may be exchanged when the Xn interface is setup between two neighbouring nodes.

In a second approach, or Approach 2, new class 2 procedures were proposed, with registration and periodic report, such as resource status request and/or report in X2AP. By this approach, one gNB may register a CSI-RS resource report request to a neighbouring gNB with a proper periodicity. The neighbouring gNB may then need to report its CSI-RS resource configuration as required by the initiating gNB.

After some liaison exchanges with RAN1 and RAN2, RAN3 understood that the CSI-RS transfer between nodes may be considered semi-static, and that the frequency of updating configuration of CSI-RS transmission for the purpose of connected mode inter-cell mobility is up to Network (NW) implementation. Therefore, RAN3 agreed to support the first above mentioned approach, where the CSI-RS configuration may be exchanged in a Xn Setup message and updated in an NG-RAN node Configuration Update for Standalone (SA) and New Radio (NR) Multi Radio Dual Connectivity (MR-DC) scenarios [1].

Furthermore, RAN3 also agreed to support CSI-RS transmission over X2 in the E-UTRAN New Radio-Dual Connectivity (EN-DC) scenarios depicted in FIG. 2 and FIG. 3. FIG. 2 is a schematic representation of a Secondary gNB (SgNB) change. FIG. 3 is a schematic representation of an inter-Master eNodeB (MeNB) Handover (HO) with SgNB change. In the scenarios depicted in FIG. 2 and FIG. 3, the CSI-RS measurement configuration may be generated by a Secondary gNB node. Since there is no direct interface between the two en-gNBs, the SgNB1 node may need to send its updated configuration via the X2 interface to the MeNB. And the MeNB may then need to forward the updated information to its neighbour en-gNBs, as depicted in the example of FIG. 2, or to forward it to its neighbour MeNBs that may then relay the measurements to their SgNBs, as depicted in the example of FIG. 3.

Thus, CSI-RS configuration has been agreed to also be exchanged in an EN-DC X2 Setup message and updated in an eNB/EN-DC Configuration Update message for the EN-DC scenario [1].

Energy Savings for CSI-RS Based Mobility

RAN2 is currently discussing the detailed CSI-RS configuration information and has agreed that the CSI-RS may be transferred within the Measurement Timing Configuration container between NG-RAN nodes. This container may be already present in the relevant RAN3 messages, so RAN3 may assume no further impact is foreseen on the X2/Xn/F1 specifications. However, additional information may be needed to indicate CSI-RS based mobility switching off. In practice, a vendor may decide, based on its regional policy, e.g., energy efficiency, limitation of radio waves, etc., to stop and/or limit configuring the CSI-RS in its given tracking area or region. The gNBs in another different vendor's region may need to acquire this information on time, that is, that CSI-RS transmission has been switched off, in order to avoid handover failure in the boundary area between gNBs of the different vendors.

Existing methods to support mobility in wireless communications networks may lead to high signalling overhead, waste of resources, e.g., energy resources, and/or time-frequency resources, and unnecessary delays which may result in a suboptimal performance of the network.

SUMMARY

It is an object of embodiments herein to improve the handling of a measurement configuration in a communications network.

According to a first aspect of embodiments herein, the object is achieved by a method, performed by a first network node. The first network node operates in the communications network. The method may be understood to be for handling a measurement configuration. The first network node sends an indication to a second network node operating in the communications network. The indication indicates a transmission status of one or more CSI-RS configurations of the first network node.

According to a second aspect of embodiments herein, the object is achieved by a method, performed by a second network node. The second network node operates in the communications network. The method may be understood to be for handling a measurement configuration. The second network node receives the indication, referred to herein as the third indication, from the first network node operating in the communications network. The second network node manages the first network node. The indication indicates a transmission status of one or more CSI-RS configurations of the first network node.

According to a third aspect of embodiments herein, the object is achieved by a method, performed by a third network node. The third network node is comprised in a first group of network nodes. The first group of network nodes are neighbours to the first network node. The third network node operates in the communications network. The method may be understood to be for enabling for handling a measurement configuration. The third network node receives another indication, referred to herein as a fifth indication, from the second network node operating in the communications network. The third network node is managed by the second network node. The indication indicates a transmission status of the one or more CSI-RS configurations of the first network node. The third network node configures the wireless device based on the received indication, that is, the received fifth indication.

According to a fourth aspect of embodiments herein, the object is achieved by the first network node. The first network node may be considered to be for handling a measurement configuration. The first network node is configured to operate in the communications network. The first network node is further configured to send the third indication to the second network node configured to operate in the communications network. The third indication is configured to indicate the transmission status of one or more CSI-RS configurations of the first network node.

According to a fifth aspect of embodiments herein, the object is achieved by the second network node. The second network node may be understood to be for handling a measurement configuration. The second network node is configured to operate in the communications network. The second network node is further configured to receive the third indication from the first network node configured to operate in the communications network. The second network node is configured to manage the first network node. The third indication is configured to indicate the transmission status of one or more CSI-RS configurations of the first network node.

According to a sixth aspect of embodiments herein, the object is achieved by the third network node. The third network node may be understood to be for handling a measurement configuration. The third network node is configured to operate in the communications network. The third network node is configured to be comprised in the first group of network nodes. The first group of network nodes are configured to be neighbours to the first network node configured to operate in the communications network. The third network node is further configured to receive the fifth indication from the second network node configured to operate in the communications network. The third network node is configured to be managed by the second network node. The indication is configured to indicate the transmission status of the one or more CSI-RS configurations of the first network node. The third network node is also configured to configure the wireless device based on the indication configured to be received.

By sending the third indication, the first network node may enable the second network node to know how often the CSI-RS measurements may be switched on and/or off, or whether they may have changed their configuration. This timing indication may be addressed to a list of candidate target network nodes that may benefit from this information, e.g., in in MR-DC scenarios. These may be, for example, network nodes in another region managed by a different operator. These network nodes may need to acquire this information on time, that is, that CSI-RS transmission has been switched off, in order to avoid handover failure in the boundary area between network nodes managed by different operators. When the first network node may update the ON/OFF status of its CSI-RS transmissions to the second network node, the second network node may be enabled to indicate this change of CSI-RS transmission status to any relevant neighbours of the first network node, such as the third network node.

By receiving the fifth indication, the third network node may be enabled to receive the information regarding how often the CSI-RS measurements may be switched on and/or off, or whether they may have changed their configuration, and may then be enabled to configure the wireless device accordingly. By configuring the wireless device, the third network node may enable the wireless device to limit the monitoring of the Reference Signals (RS) in neighbour cells to the relevant neighbour cells, an/or the relevant time periods, for example, the network nodes that may be ON, and during the timer periods that they may be ON. This may enable the wireless device to avoid having to measure the CSI-RS transmission of all the neighbours of the first network node, and/or to have to perform the monitoring all the time, thereby saving time-frequency resources, as well as energy resources. This may in turn also avoid scalability issues in the communications network.

BRIEF DESCRIPTION OF THE DRAWINGS

Examples of embodiments herein are described in more detail with reference to the accompanying drawings, according to the following description.

FIG. 22 is a flowchart depicting embodiments of a method in a communications system including a host computer, a base station and a user equipment, according to embodiments herein.

FIG. 23 is a flowchart depicting embodiments of a method in a communications system including a host computer, a base station and a user equipment, according to embodiments herein.

FIG. 24 is a flowchart depicting embodiments of a method in a communications system including a host computer, a base station and a user equipment, according to embodiments herein.

FIG. 25 is a flowchart depicting embodiments of a method in a communications system including a host computer, a base station and a user equipment, according to embodiments herein.

DETAILED DESCRIPTION

Figure 1:
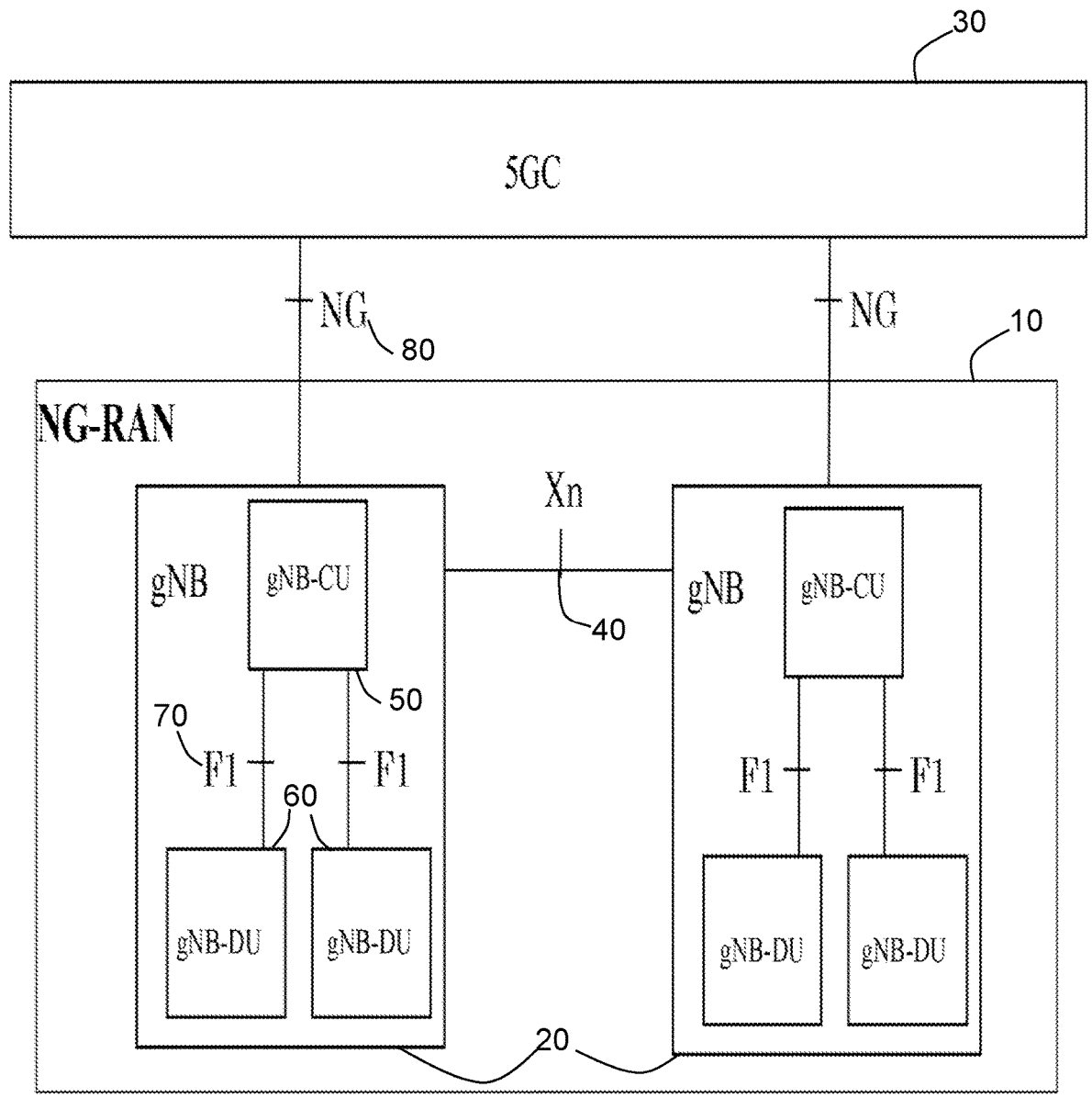
FIG. 1 is a schematic block diagram illustrating an example Next-Generation RAN architecture.
Figure 2:
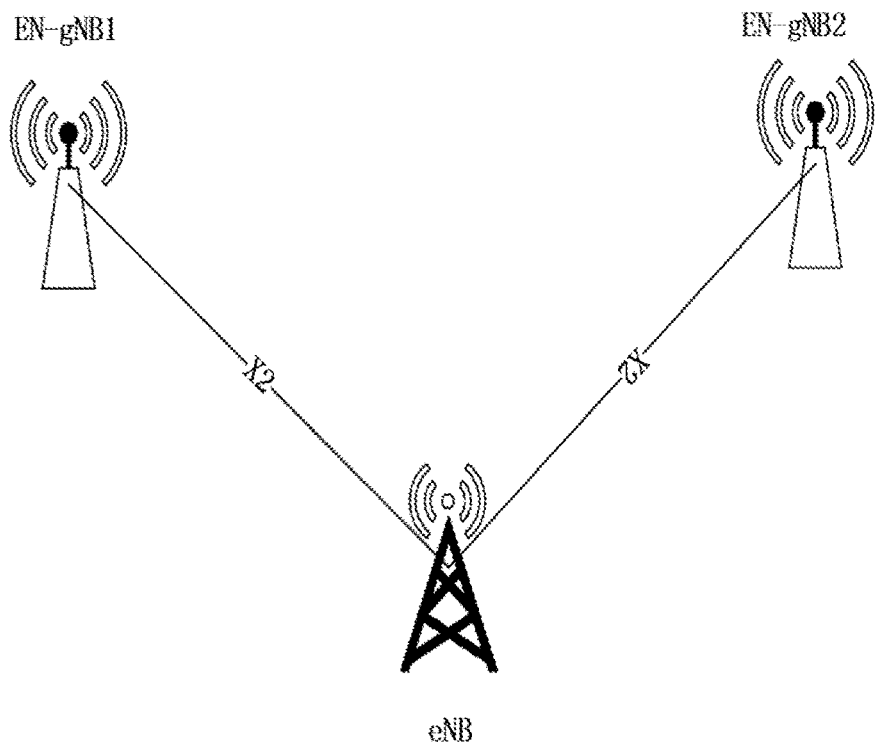
FIG. 2 is a schematic block diagram illustrating an example of an SgNB change.
Figure 3:
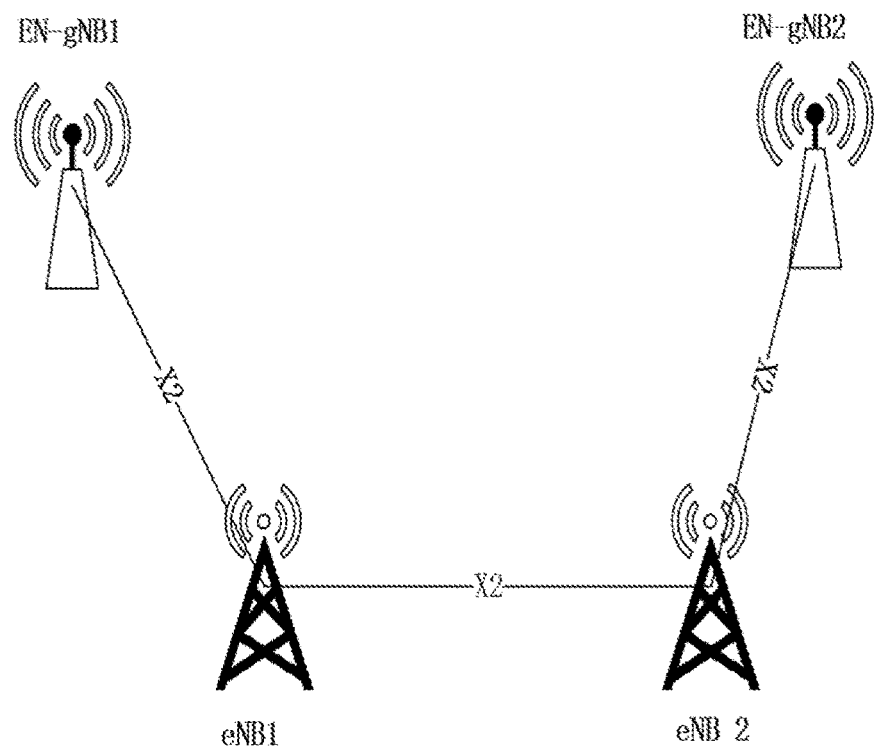
FIG. 3 is a schematic block diagram illustrating an example of an inter-MeNB HO with SgNB change.

As part of the development of embodiments herein, one or more challenges with the existing technology will first be identified and discussed.

When a MeNB may receive a gNB configuration update message from a SgNB, it is not possible for the MeNB to know to which Secondary Node (SN) candidates the changes in the original SgNB's CSI-RS configurations may need to be signalled. It is not practical from a signaling point of view that the MeNB informs all the SN candidates that are neighbours to the MeNB given that it is likely that most of these SNs will make no use of the CSI-RS information.

Further, if a detailed knowledge of neighbour relations between different CSI-RS coverage areas wants to be achieved, there may be understood to be the need of indicating, for each CSI-RS of a given cell, the CSI-RS coverage areas in neighbouring cells with which a neighbour relation may exist. Without such knowledge, there may be a problem in configuring a UE to measure and report neighbour cell CSI-RSs, that is, the UE may be configured with too many beams, that is, target beams, to measure, impacting several aspects of performance, latency in target beam identification, impacting current service, etc . . . .

It may also be beneficial to indicate how often the CSI-RS measurements are switched on and/or off, or whether they have changed their configuration. This may improve the handover of UE monitoring the Reference Signals (RS) in neighbour cells, and also avoid scalability issues in the network. This timing indication may also, as stated above, be addressed to a list of target SgNB that may benefit from this information in MR-DC scenarios. When a SgNB, e.g., a first SgNB, may update the ON/OFF status of its CSI-RS transmissions to the MeNB, then the MeNB may have to indicate this change of CSI-RS transmission status to all the neighbours of SgNBs of the first SgNB.

Certain aspects of the present disclosure and their embodiments may provide solutions to these or other challenges. Embodiments herein may be generally understood to relate to CSI-RS measurement transmission between NG-RAN nodes.

Embodiments herein may also be generally understood to relate to methods for resolving, for CSI-RS mobility, the provision of meaningful neighbouring beam information between RAN nodes for one or several CSI-RS (beam) configurations. Embodiments herein may also be generally understood to relate to methods for how to identify which RAN nodes to inform in case of a CSI-RS (beam) configuration change, which may be applied to various kind of mobility including MR-DC. A first method disclosed herein may be based on an index that may express which CSI-RSs are active or not. A second method disclosed herein may be understood to be more explicit and may list some and/or all CSI-RSs contained in the MTC, and whether they are active or not. An explicit neighbour relation structure may also be added for cell to CSI-RS and CSI-RS to CSI-RS relations. A third method disclosed herein may be a combination that comprises both the first and second methods above. All the methods may be understood to apply for ON/OFF status related changes.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 4:
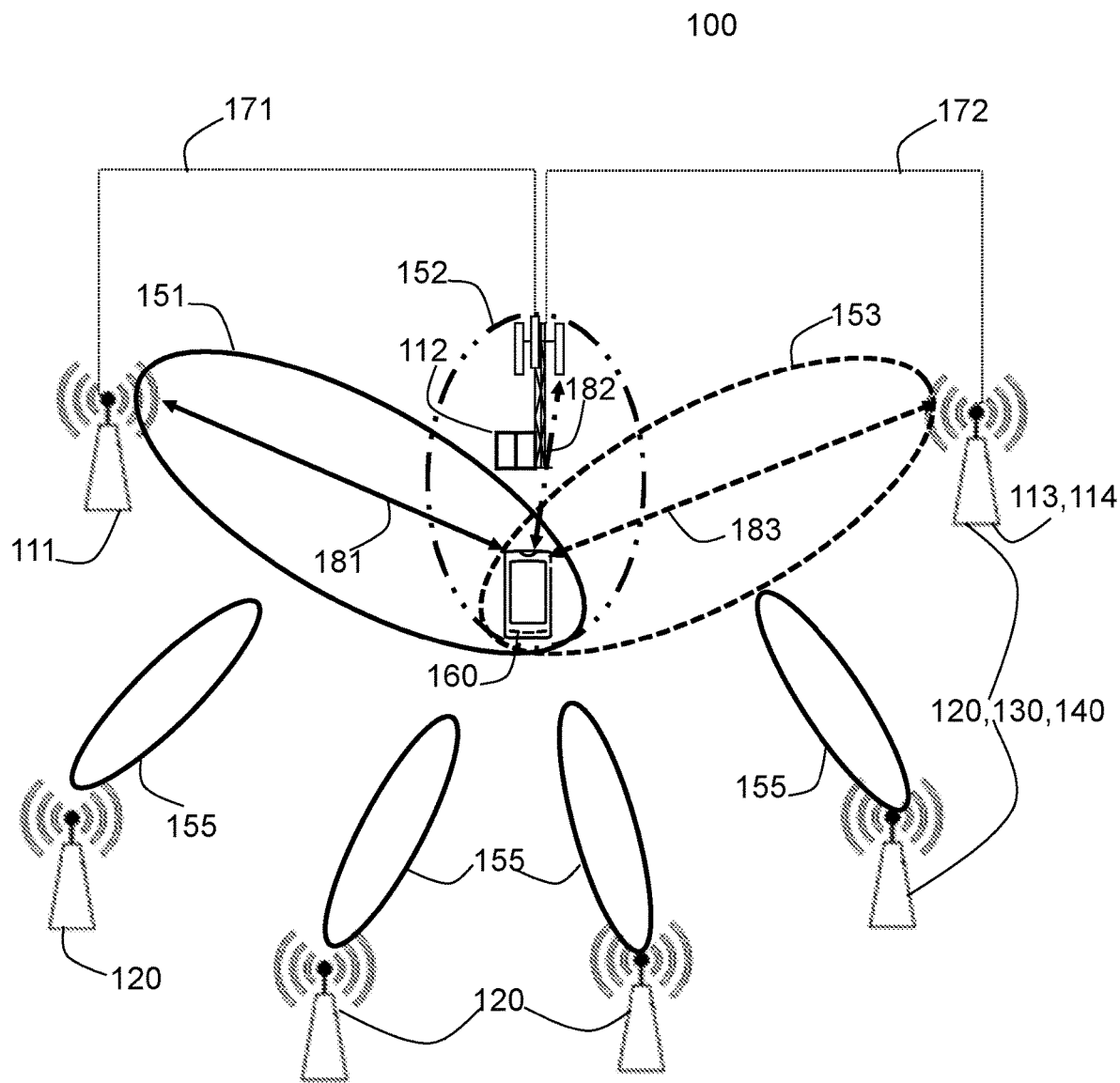
FIG. 4 is a schematic diagram illustrating an example of a communications network, according to embodiments herein.

FIG. 4 depicts two non-limiting examples of a wireless network or communications network 100, sometimes also referred to as a wireless communications network, wireless communications system, cellular radio system, or cellular network, in which embodiments herein may be implemented. The communications network 100 may typically be a 5G system, 5G network, or Next Gen System or network, New Radio Unlicensed (NR-U), Licensed-Assisted Access (LAA), or MulteFire. The wireless communications network 100 may alternatively be a younger system than a 5G system. The communications network 100 may also support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g. Multi- Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The communications network 100 comprises a plurality of network nodes, whereof a first network node 111, a second network node 112, a third network node 113 and a fourth network node 114 are depicted in the non-limiting example of FIG. 4. The communications network 100 may comprise other nodes. Also depicted in FIG. 4 are a first group of network nodes 120, a second group of network nodes 130 and a third group of network nodes 140. The third network node 113 may be comprised in the first group of network nodes 120. The fourth network node 114 may be comprised in the third group of network nodes 140. Some network nodes may be in more than one group of the first group of network nodes 120, the second group of network nodes 130 and the third group of network nodes 140. That is, some of the network nodes in any of the first group of network nodes 120, the second group of network nodes 130 and the third group of network nodes 140 may be the same network node. In the non-limiting example of FIG. 4, the third network node 113 is the same as the fourth network node 114. Also, in the non-limiting example of FIG. 4, the third network node 113 and another node comprised in the first group of network nodes 120 are also comprised in the second group of network nodes 130 and the third group of network nodes 140.

Any of the first group of network nodes 120, the second group of network nodes 130 and the third group of network nodes 140 may be neighbour network nodes to the first network node 111.

Any of the first network node 111, the second network node 112, the third network node 113, and any of the nodes comprised in any of the first group of network nodes 120, the second group of network nodes 130 and the third group of network nodes 140 may be a radio network node. That is, a transmission point such as a radio base station, for example a gNB, an eNB, or any other network node with similar features capable of serving a user equipment, such as a wireless device or a machine type communication device, in the communications network 100.

In other examples, which are not depicted in FIG. 4, any of the first network node 111, the second network node 112, the third network node 113, and any of the nodes comprised in any of the first group of network nodes 120, the second group of network nodes 130 and the third group of network nodes 140 may be a distributed node, such as a virtual node in a cloud, and may perform its functions entirely on the cloud, or partially, in collaboration with a radio network node.

The communications network 100 may cover a geographical area, which in some embodiments may be divided into cell areas, wherein each cell area may be served by a radio network node, although, one radio network node may serve one or several cells. In the example of FIG. 4, the first network node 111 may manage a first cell 151, the second network node 112 may manage a second cell 152, and the third network node 113 may manage a third cell 153. The first network node 111 may have neighbouring cells, e.g., neighbouring New Radio (NR) cells 155. The neighbouring New Radio (NR) cells 155 may be managed, respectively, by respective network nodes in the first group of network nodes 120. Any of the first network node 111, the second network node 112, the third network node 113, and any of the nodes comprised in any of the first group of network nodes 120, the second group of network nodes 130 and the third group of network nodes 140 may be e.g., a transmission point such as a radio base station, or any other network node capable to serve a wireless device, such as a user equipment or a machine type node in the communications network 100. The radio network node may be of different classes, such as, e.g., macro node, home node, or pico base station, based on transmission power and thereby also cell size. In some examples, the radio network node may serve receiving nodes with serving beams. The radio network node may support one or several communication technologies, and its name may depend on the technology and terminology used. Any of the radio network nodes that may be comprised in the communications network 100 may be directly connected to one or more core networks.

In some particular examples, the first network node 111 is a first gNB, the second network node 112 is an eNB, and the third network node 113 is a second gNB. In some particular examples, the first network node 111 is a first SN, the second network node 112 is an MN and the third network node 113 is a second SN. The first network node 111 may be a source SN serving a wireless device, such as the wireless device 160 described below, and the third network node 113 may be a target SN.

A plurality of user equipments may be located in the wireless communication network 100, whereof a wireless device 160, is depicted in the non-limiting example of FIG. 4. The wireless device 160 comprised in the communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the communications network 100 may be, for example, portable, pocket-storable, handheld, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 160 comprised in the communications network 100 may be enabled to communicate wirelessly in the communications network 100. The communication may be performed e.g., via a RAN, and possibly the one or more core networks, which may be comprised within the communications network 100.

The first network node 111 may be configured to communicate within the communications network 100 with the second network node 112 over a first link 171, e.g., a radio link or a wired link. The third network node 113 may be configured to communicate within the communications network 100 with the second network node 112 over a second link 172, e.g., a radio link or a wired link. The first network node 111 and the third network node 113 may lack a direct connection. Any communication between the first network node 111 and the third network node 113 may be performed via the second network node 112.

The wireless device 160 may be configured to communicate within the communications network 100 with the first network node 111 over a first radio link 181. The wireless device 160 may be configured to communicate within the communications network 100 with the second network node 112 over a second radio link 182. The wireless device 160 may be configured to communicate within the communications network 100 with the third network node 113 over a third radio link 183. The wireless device 160 may be configured to communicate within the communications network 100 with the network nodes in any of the first group of network nodes 120, the second group of network nodes 130 and the third group of network nodes 140 over a respective radio link, which are not depicted in FIG. 4 to simplify the Figure.

It may be understood that FIG. 4 is schematic and that the number of network nodes depicted is not limiting. Any of the first group of network nodes 120, the second group of network nodes 130 and the third group of network nodes 140 may comprise a larger or smaller number of network nodes.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third" and/or "fourth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a network node, such as the first network node 111, e.g., a gNB, embodiments related to another network node, such as the second network node 112, e.g., an eNB, and embodiments related to yet another network node, such as the third network node 113, e.g., another gNB.

Figure 5:
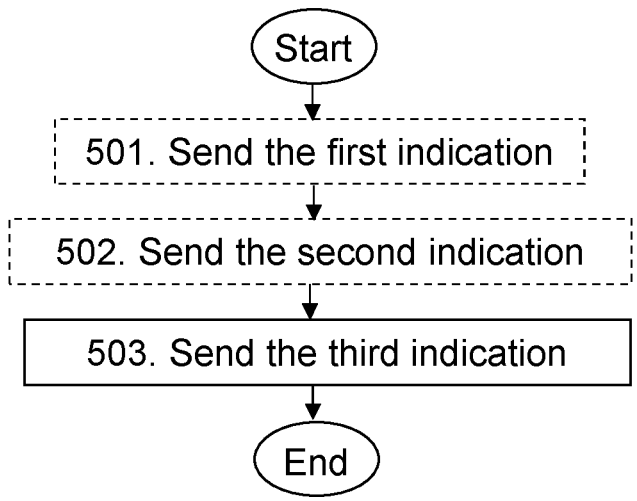
FIG. 5 is a flowchart depicting a method in a first network node, according to embodiments herein.

Embodiments of a method, performed by the first network node 111, will now be described with reference to the flowchart depicted in FIG. 5. The first network node 111 operates in the communications network 100. The method may be understood to be for handling a measurement configuration.

Several embodiments are comprised herein. In some embodiments all the actions may be performed. In other embodiments, one or more actions may be performed. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. A non-limiting example of the method performed by the first network node 111 is depicted in FIG. 5. In FIG. 5, actions which may be optional in some examples are depicted with dashed boxes.

Action 501

In the course of operations of the communications network 100, the wireless device 160 may move, and its coverage by different cells and/or beams may change. In a beamforming system such as 5G system may be, this may happen numerous times. As stated earlier, embodiments herein may be understood to aim at resolving, for mobility, particularly for CSI-RS mobility, the provision of meaningful neighbouring beam information between RAN nodes for one or several CSI-RS configurations, e.g., beam configurations, so that the information may not need to be provided to all the neighbour nodes of any given node, given that it is likely that most of these nodes will make no use of the information.

According to the foregoing, in this Action 501, the first network node 111 may send a first indication to the second network node 112. The second network node 112 may be understood to be operating in the communications network 100. The first indication may indicate one or more CSI-RS configurations of the first network node 111.

A CSI-RS configuration may be understood as, one or more settings defining the CSI-RS, for example, a CSI-RS index. The first network node 111 may be managed by the second network node 112. In some particular embodiments, the first network node 111 may be a Secondary Node (SN), and the second network node 112 may be a Master Node (MN).

The sending in this Action 501 may be performed, e.g., via the first link 171.

The first indication may map to, that is, be comprised in a field, e.g., an IE.

By sending the first indication in this Action 501, the first network node 111 may enable the second network node 112 to know which are its CSI-RS configurations, so that the second network node 112, e.g., an MN, may then share this information with any relevant nodes, e.g., neighbour nodes, or the wireless device 160, so this information may be used for mobility procedures. For example, the second network node 112 may use this information to forward the updated information to its neighbour nodes, such as the third network node 113, and the fourth network node 114, who may in turn also forward this information to their neighbour nodes, such as the first group of network nodes 120, the second group of network nodes 130, and the third group of network nodes 140.

Action 502

In this Action 502, the first network node 111 may send a second indication to the second network node 112. The second indication may indicate a relation between the one or more CSI-RS configurations of the first network node 111 with network nodes comprised in the first group of network nodes 120 operating in the communications network 100 comprising the third network node 113.

The network nodes in the first group of network nodes 120 may be neighbour nodes to the first network node 111.

The relation may be a first relation. At least one of the following options may apply to the first relation between the one or more CSI-RS configurations of the first network node 111 with the network nodes comprised in the first group of network nodes 120. According to a first option, the relation may be based on a second relation between each CSI-RS of the first network node 111 and neighbouring New Radio (NR) cells 155 of the first network node 111. According to a second option, the relation may be based on a third relation between a group of CSI-RSs of the first network node 111 and the neighbouring NR cells 155 of the first network node 111. According to a third option, the relation may comprise a map between the one or more CSI-RS configurations of the first network node 111 and the network nodes comprised in the first group of network nodes 120. In some examples, the said relation may include the mapping associated to each individual CSI-RS configuration with one or more neighbouring network nodes. According to a fourth option, the relation may comprise a list of one or more network nodes comprised in the first group of network nodes 120 to which the one or more CSI-RS configurations of the first network node 111 may be applicable. In some examples, the said relation may include the list of one or more neighbouring network nodes that may be applicable to all the CSI-RS configurations of the first node 111. "Applicable" may be understood as e.g., beneficial, for example, in the context of dual connectivity. As an example, a MN may trigger addition of a cell in an SN for the purpose of configuring dual connectivity for a UE such as the wireless device 160, on the basis of CSI-RS measurements collected and reported by the U E.

In some embodiments, at least one of the following options may apply. In a first option, the first network node 111 may operate on Fifth Generation 3GPP, 5G, particularly, on NR. In a second option, the second network node 112 may operate on Long Term Evolution, LTE. That is, the second network node 112 may operate on Evolved Universal Terrestrial Access (E-UTRA). In a third option, the third network node 113 may operate on 5G 3GPP, that is, on NR. In a fourth option, the first network node 111 may be a Secondary Node (SN). In a fifth option, the second network node 112 may be a Master Node (MN). In a sixth option, the third network node 113 may be another SN.

In some embodiments, the second indication may comprise an explicit neighbour relation for at least one of: a) a set of CSI-RS indexes of a first cell 151 managed by the first network node 111; and b) each of the CSI-RS indexes of the first cell 151 managed by the first network node 111.

In some examples, the first network node 111 may include the transmission status of all the CSI-RS configurations that may have been included in the first indication.

In some other examples, the first network node 111 may include the transmission status of only those CSI-RS configurations that may have changed their status compared to a previous update of the transmission status.

In some other examples, both of the above examples may be included.

According to one group of examples, the identification of the neighbouring NR cells of the first cell 151 may be performed by the first network node 111 via signaling to the second network node 112 of the explicit neighbour relation information provided for a set of the CSI-RS indexes of the first cell 151. This may enable the creation of a neighbour relation between CSI-RS beam in the first cell 151 to the neighbouring cells, that is, the CSI-RS beam of the first cell 151 to neighbour NR cells.

According to another group of examples, the identification of the neighbouring NR cells of the first cell 151 as well as the identification of CSI-RS coverage areas of the neighbour cells, which may be neighbouring the first cell 151, may be performed by the first network node 111 via the explicit neighbour relations provided for each of the CSI-RS indexes of the first cell 151. This may enable each CSI-RS beam of the first cell 151 to be linked to a neighbour CSI-RS area in a neighbour cell.

According to a fourth group of examples, the identification of the neighbouring NR cells of the first cell 151 may be performed by the first network node 111 via a combination of the methods described for second group of examples and the third group of examples above.

In some embodiments, the second indication may be mapped to, that is, comprised in a first field in a first information element (IE), e.g., a first IE.

The first field may be mapped to one of the following fields in different IEs, e.g., according to an example method 1, which will be described later:
1) A "Neighbour Relation for given for the indicated Measurement Timing Configuration Index" field, as provided in Table 2 under the Section numbered "9.2.2.13 Neighbour Information NR". This may be understood to be specific to NR neighbour cells. This field may provide an indication as to which neighbour cells, amongst all the ones that may be listed as neighbour cells in the previous similar Xn messages, may still be the neighbours based on the currently activated CSI-RS configuration.
2) A "Neighbour Relation for given for the indicated Measurement Timing Configuration Index" field, as provided in Table 3 under the Section numbered "9.2.2.14 Neighbour Information E-UTRA". This may be understood to be specific to LTE neighbour cells.

The first field may be mapped to the following fields in different IEs, e.g., according to an example method 2, which will be described later:
1) A "CSI-RS neighbour list" as provided in Table 5, Table 6, Table 7, and Table 8.

However, it may be noted that the examples provided in the data structures are just examples. There may be other ways of providing the second indication in the data structure.

The sending in this Action 502 may be performed, e.g., via the first link 171.

In some examples, the first indication and the second indication may be sent together at the same time from the first network node 111 to the second network node 112 in an inter-node message.

In some examples, the first indication and the second indication may be sent at different times from the first network node 111 to the second network node 112 in the inter-node message.

In some examples, the first indication and the second indication may be sent together at the same time from the first network node 111 to the second network node 112 in the inter-node message.

In some other examples, the first indication and the second indication may be sent at different times from the first network node 111 to the second network node 112 in the inter-node message.

By sending the second indication in this Action 502, the first network node 111 may enable the second network node 112 to know the CSI-RS coverage areas in neighbouring cells with which a neighbour relation may exist. The second network node 112 may use this information to determine which neighbour network nodes may benefit from knowing this information in the event of mobility procedures for a wireless device such as the wireless device 160. The network nodes receiving this information, such as the third network node 113 may then configure the wireless device 160 to perform the measurements on the cells and/or beams that may be relevant for the wireless device 160, and not waste resources in an unnecessary measurements, thereby avoiding that the wireless device 160 be configured with too many beams, that is, target beams, to measure, and avoid impacting several aspects of performance, latency in target beam identification, impacting current service, etc . . . .

Action 503

In this Action 503, the first network node 111 sends an indication, which may be referred to herein as a third indication, to the second network node 112 operating in the communications network 100. The indication indicates a transmission status of one or more CSI-RS configurations of the first network node 111. The transmission status may be understood, for example, as whether these CSI-RSs may be ON or OFF and also the duration for which this transmission status may be applicable.

The sending in this Action 503 may be performed, e.g., via the first link 171.

The first network node 111 may manage the first cell 151. In some embodiments, the sending in this Action 503 may comprise sending the transmission status of the CSI-RS configurations of the first network node 111.

According to a group of examples, the identifications of which of the CSI-RS indexes may be part of the currently active CSI-RS configuration and which of the neighbour relations, CSI-RS and/or Cell related, may be currently applicable, may be performed either by indicating per CSI-RS whether it may be active or by referencing to a measurement timing configuration which may contain configuration information of the current active beams.

In some examples, the third indication may be mapped to a second field in an Information Element (IE), e.g., a second IE.

The second field may be mapped to, that is, comprised in, one of the following fields in different IEs, e.g., according to the example method 1, which will be described later:

1) The combination of "Additional Measurement Timing Configuration Item" and "Active Measurement Timing Configuration Index" as provided in Table 1 wherein "Additional Measurement Timing Configuration Item" may provide different configurations mapped to different indexes and "Active Measurement Timing Configuration Index" may inform that a configuration associated to the said index is active.

2) The "Active Measurement Timing Configuration Index" is further detailed in Section 9.2.2.x provided under Table 4 (third paragraph under Table 4).

3) The ">Measurement Timing Configuration Update Information NR" provided in Table 4. The details of the field are provided in Section 9.2.2.y, above the last table of the Section entitled "XnAP Example method 1", Section 9.2.2.y provides a further reference to 9.2.2.x The second field may be mapped to, that is, comprised in, the following field in different IEs, e.g., according to the example method 2, which will be described later:

1) A "CSI-RS status" as provided in Table 5, Table 6, and Table 8.

However, it may be noted that the examples provided in the data structures are just examples. There may be other ways of providing the third indication in the data structure.

In some embodiments, at least one of the following may apply: a) the second indication may be mapped to, that is, comprised in the first field in the first information element, and b) the third indication may be comprised in the second field in the second information element.

The first indication may map to, that is, be comprised in another field, which may be referred to herein as a third field, in another IE, which may be referred to herein as a third IE.

In some examples, the first indication, the second indication and the third indication may be sent together at the same time from the first network node 111 to the second network node 112 in the inter-node message.

The purpose of the third indication may be understood to be to update neighbour nodes about whether a given CSI-RS may be available over the air or not.

By sending the third indication in this Action 503, the first network node 111 may enable the second network node 112 to know how often the CSI-RS measurements may be switched on and/or off, or whether they may have changed their configuration. This timing indication may be addressed to a list of candidate target network nodes that may benefit from this information, e.g., in MR-DC scenarios. These may be, for example, network nodes in another region managed by a different operator. These network nodes may need to acquire this information on time, that is, that CSI-RS transmission has been switched off, in order to avoid handover failure in the boundary area between network nodes managed by different operators. When the first network node 111 may update the ON/OFF status of its CSI-RS transmissions to the second network node 112, the second network node 112 may be enabled to indicate this change of CSI-RS transmission status to any relevant neighbours of the first network node 111, such as the third network node 113. This may in turn enable to ultimately improve the configuration of monitoring by the wireless device 160 of the Reference Signals (RS) in neighbour cells, and also avoid scalability issues in the communications network 100. This timing indication may also, as stated above, be addressed to a list of target network nodes, e.g., SgNB, that may benefit from this information in MR-DC scenarios. When the first network node 111 may update the ON/OFF status of its CSI-RS transmissions to the second network node 112, then the second network node 112 may avoid having to indicate this change of CSI-RS transmission status to all the neighbours of the first network node 111 or to maintain the monitoring all the time.

In any of the above embodiments, the different sets of parameters may be due to the parameters originating in e.g., different core networks, different slices, different providers, etc. . . . using their own sets of parameters to identify a same feature, e.g., a same requirement, target or service.

Figure 6:
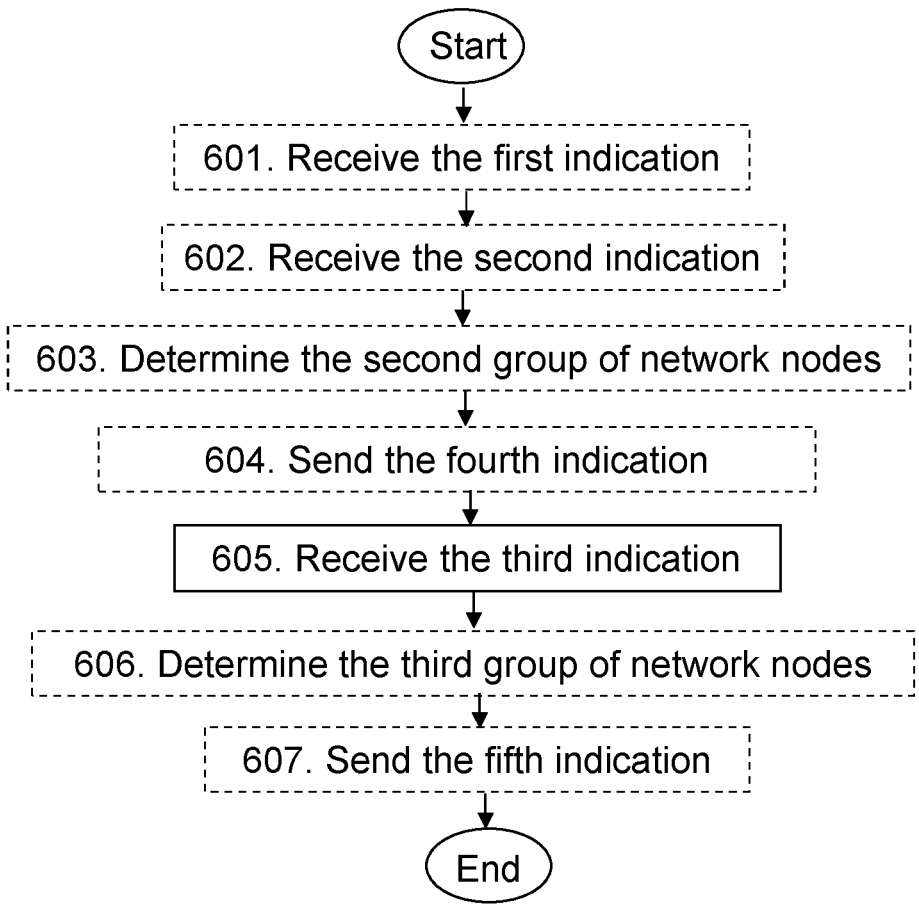
FIG. 6 is a flowchart depicting a method in a second network node, according to embodiments herein.

Embodiments of a method, performed by the second network node 112, will now be described with reference to the flowchart depicted in FIG. 6. The second network node 112 operates in the communications network 100. The method may be understood to be for handling a measurement configuration.

The method may comprise one or more of the following actions. Several embodiments are comprised herein. In some embodiments, all the actions may be performed. In other embodiments, one or more actions may be performed. One or more embodiments may be combined, where applicable. It should be noted that the examples herein are not mutually exclusive. Components from one embodiment may be tacitly assumed to be present in another embodiment and it will be obvious to a person skilled in the art how those components may be used in the other. All possible combinations are not described to simplify the description. A non-limiting example of the method performed by the second network node 112 is depicted in FIG. 6. In FIG. 6, actions which may be optional in some examples are depicted with dashed boxes. Some actions may be performed in a different order than that shown in FIG. 6. The detailed description of some of the following corresponds to the same references provided above, in relation to the actions described for the first node 111 and will thus not be repeated here. For example, the second indication may map to the first field, as described earlier, and/or the third indication may map to the second field, as described earlier.

Action 601

In this Action 601, the second network node 112 may receive the first indication from the first network node 111. The first network node 111 may be operating in the communications network 100. The first indication may indicate the one or more CSI-RS configurations of the first network node 111.

The receiving in this Action 601 may be performed, e.g., via the first link 171.

The advantages of this Action 601 may be understood to be corresponding to those provided for Action 501.

Action 602

In this Action 602, the second network node 112 may receive the second indication from the first network node 111. The second indication may indicate the first relation between the one or more CSI-RS configurations of the first network node 111 with network nodes comprised in the first group of network nodes 120 operating in the communications network 100 comprising a third network node 113.

The receiving in this Action 602 may be performed, e.g., via the first link 171.

In some embodiments, at least one of the following options may apply to the first relation between the one or more CSI-RS configurations of the first network node 111 with the network nodes comprised in the first group of network nodes 120. According to a first option, the first relation may be based on a second relation between each CSI-RS of the first network node 111 and neighbouring NR cells 155 of the first network node 111. According to a second option, the first relation may be based on a third relation between a group of CSI-RSs of the first network node 111 and the neighbouring NR cells 155 of the first network node 111. According to a third option, the first relation may comprise a map between the one or more CSI-RS configurations of the first network node 111 and the network nodes comprised in the first group of network nodes 120. According to a fourth option, the first relation may comprise a list of one or more neighbouring network nodes to which the one or more CSI-RS configurations of the first network node 111 are applicable.

In some embodiments, at least one of the following options may apply. In a first option, the first network node 111 may operate on Fifth Generation 3GPP, 5G, particularly, on NR. In a second option, the second network node 112 may operate on Long Term Evolution, LTE. That is, the second network node 112 may operate on Evolved Universal Terrestrial Access (E-UTRA). In a third option, the third network node 113 may operate on 5G 3GPP, that is, on NR. In a fourth option, the first network node 111 may be a Secondary Node (SN). In a fifth option, the second network node 112 may be a Master Node (MN). In a sixth option, the third network node 113 may be another SN.

In some embodiments, the second indication may comprise an explicit neighbour relation for at least one of: a) a set of CSI-RS indexes of a first cell 151 managed by the first network node 111; and b) each of the CSI-RS indexes of the first cell 151 managed by the first network node 111.

In some examples, the second indication may be mapped to the first field in an Information Element (IE).

The advantages of this Action 602 may be understood to be corresponding to those provided for Action 502.

Action 603

In this Action 603, the second network node 112 may determine, or select, based on the received second indication a second group of network nodes 130 operating in the communications network 100, to which the second network node 112 is to transmit the one or more CSI-RS configurations of the first network node 111.

Determining may be understood as e.g., calculating, deriving, selecting, etc. . . . . . That is, in this Action 603, of all the potential target nodes that the wireless device 160 may in principle consider for a handover, the second network node 112 may select e.g., a subgroup of nodes that may be most relevant for a potential handover by the wireless device 160.

In typical examples, the second group of network nodes 130 may have one or more network nodes in common with the first group of network nodes 120. In other examples, the third second group of network nodes 130 may be the same as the second group of network nodes 130, e.g., when the number of network nodes in the first group of network nodes 120 may be small.

In some examples, the third indication may be mapped to the second field in an Information Element (IE).

According to a first group of examples, the identification of the neighbouring NR cells of the first cell 151 may be performed by the second network node 112 via available neighbour cells list, e.g., such as the Neighbour Information NR/NR Neighbour Information in TS 38.423, v16.0.0/TS 36.423, v16.0.0, provided at the Xn/X2 setup between the first cell 151 and the second cell 152. This may enable the first cell 151 to setup or update other NR cell relations, that is, to send the CSI-RS configuration of the first cell 151 to its neighbour NR cells.

According to a second group of examples, the identification of the neighbouring NR cells of the first cell 151 may have been performed by the first network node 111 via signaling to the second network node 112 of the explicit neighbour relation information provided for a set of the CSI-RS indexes of the first cell 151. This may enable the creation of a neighbour relation between CSI-RS beam in the first cell 151 to the neighbouring cells, that is, the CSI-RS beam of the first cell 151 to neighbour NR cells.

According to a third group of examples, the identification of the neighbouring NR cells of the first cell 151 as well as the identification of CSI-RS coverage areas of the neighbour cells, which may be neighbouring the first cell 151, may have been performed by the first network node 111 via the explicit neighbour relations provided for each of the CSI-RS indexes of the first cell 151. This may enable each CSI-RS beam of the first cell 151 to be linked to a neighbour CSI-RS area in a neighbour cell.

According to a fourth group of examples, the identification of the neighbouring NR cells of the first cell 151 may have been performed by the first network node 111 via a combination of the methods described for second group of examples and the third group of examples above.

By determining the second group of network nodes 130 in this Action 603, the second network node 112 may then be enabled to know which network nodes may be relevant for receiving the information received from the first network node 111, e.g., for any mobility procedures involving for example, the wireless device 160. This may in turn enable that ultimately, the wireless device 160 is only configured to perform the measurements on the second group of network nodes 130, that is, on the cells and/or beams that may be relevant for the wireless device 160. This may in turn enable the wireless device 160 to refrain from wasting resources in an unnecessary large amount of measurements, thereby enabling to avoid that the wireless device 160 be configured with too many beams, that is, target beams, to measure, and avoid impacting several aspects of performance, latency in target beam identification, impacting current service, etc . . .

Action 604

In this Action 604, the second network node 112 may send, based on the determined second group of network nodes 130, a fourth indication to the third network node 113. The fourth indication may indicate the one or more CSI-RS configurations of the first network node 111.

The sending in this Action 604 may be performed, e.g., via the second link 172.

The fourth indication may map to, that is, be comprised in yet another field, which may be referred to herein as a fourth field, in another IE, which may be referred to herein as a fourth IE.

The receiving in this Action 601 may be performed, e.g., via the first link 171.

In some examples, the sending in this Action 604, may be performed immediately upon receiving, in any of Actions 601 and/or 602, the CSI-RS configurations from the first network node 111.

In some examples, the sending in this Action 604, may be performed upon a specific request from the third network node 113 regarding the CSI-RS configurations of the neighbouring nodes.

In some examples, the contents of the sending in this Action 604 may include only a subset of the CSI-RSs that may have been sent by the first network node 111. This sub-selection may be performed so that only those CSI-RSs of the first network node 111 that may be impacting the associated NR neighbour cells may be selected.

By sending the fourth indication to the third network node 113 in this Action 604, the second network node 112 may then be enabled provide the information received from the first network node 111, to only the relevant network nodes that may benefit from having it, e.g., for any mobility procedures involving for example the wireless device 160. This may in turn enable that ultimately, the wireless device 160 is only configured to perform the measurements on the second group of network nodes 130, that is, on the cells and/or beams that may be relevant for the wireless device 160. This may in turn enable the wireless device 160 to refrain from wasting resources in an unnecessary large amount of measurements, thereby enabling to avoid that the wireless device 160 be configured with too many beams, that is, target beams, to measure, and avoid impacting several aspects of performance, latency in target beam identification, impacting current service, etc . . . .

Action 605

In this Action 605, the second network node 112 receives an indication, referred to herein as the third indication, from the first network node 111 operating in the communications network 100. The second network node 112 manages the first network node 111. The third indication indicates the transmission status of one or more CSI-RS configurations of the first network node 111.

The first network node 111 may manage the first cell 151. In some embodiments, the receiving in this Action 605 may comprise receiving the transmission status of the CSI-RS configurations of the first network node 111.

In some embodiments, at least one of the following may apply: a) the second indication may be mapped to, that is, comprised in the first field in the first information element, and b) the third indication may be comprised in the second field in the second information element.

According to a fifth group of examples, the identifications of which of the CSI-RS indexes may be part of the currently active CSI-RS configuration and which of the neighbour relations, CSI-RS and/or Cell related, may be currently applicable, may be performed either by indicating per CSI-RS whether it may be active or by referencing to a measurement timing configuration which may contain configuration information of the current active beams.

The advantages of this Action 605 may be understood to be corresponding to those provided for Action 503.

Action 606

In this Action 606, the second network node 112 determines a third group of network nodes 140 operating in the communications network 100, to which the second network node 112 is to transmit the transmission status of the one or more CSI-RS configurations of the first network node 111.

In some particular examples, the third group of network nodes 140 may be the same as the second group of network nodes 130. In other particular examples, the third group of network nodes 140 may have one or more network nodes in common with the second group of network nodes 130. In yet other examples, the third group of network nodes 140 may be completely different from the second group of network nodes 130.

In some embodiments, at least one of the following options may apply. According to a first option, the determining in this Action 606 of the third group of network nodes 140 may be based on the received second indication. According to a second option, the determining in this Action 606 of the third group of network nodes 140 may be based on a neighbour relation identified by the second network node 112 based on at least one of: i) radio measurements reported by the wireless device 160 operating in the communications network 100, and ii) another indication sent by the first network node 111. In some examples, the selecting in this Action 606 may be based on the first network node 111 and the third network node 113 related neighbour relation identification based on RRM measurements obtained by the second network node 112 from one or more UEs. According to a third option, the determining in Action 603 of the second group of network nodes 130 may be based on the neighbour relation identified by the second network node 112.

In some examples, the selecting in this Action 606 may be based on the specific request received from one or more network nodes including the third network node 113.

By determining the third group of network nodes 140 in this Action 606, the second network node 112 may be enabled to only provide the information regarding how often the CSI-RS measurements may be switched on and/or off, or whether they may have changed their configuration to a subset of all the potential network nodes that could receive this information and thereby avoid having to indicate this change of CSI-RS transmission status to all the neighbours of the first network node 111.

Action 607

In this Action 607, the second network node 112 may send a fifth indication to a fourth network node 114 comprised in the third group of network nodes 140. The fifth indication may indicate the transmission status of the one or more CSI-RS configurations of the first network node 111.

The sending in this Action 604 may be performed, e.g., via the second link 172.

The fifth indication may map to, that is, be comprised in another field, which may be referred to herein as a fifth field, in another IE, which may be referred to herein as a fifth IE.

In some other examples, the sending in this Action 606, may be performed immediately upon receiving in Action 605 the CSI-RS configurations from the first network node 111.

In some other examples, the sending in this Action 606, may be performed upon a specific request from the third network node 113 regarding the CSI-RS transmission status of neighbouring nodes.

In some other examples, the sending in this Action 606, may be performed periodically with certain periodicity.

In some examples, the contents of the sending in Action 606 may include only a subset of the CSI-RSs that may have been sent by the first network node 111. This sub-selection may be performed so that only those CSI-RSs of the first network node 111 that may be impacting the associated NR neighbour cells may be selected.

By sending the fifth indication to the to the third network node 113 in this Action 607, the second network node 112 may provide the information regarding how often the CSI-RS measurements may be switched on and/or off, or whether they may have changed their configuration, to only the relevant network nodes, such as the third network node 113 and thereby avoid having to indicate this change of CSI-RS transmission status to all the neighbours of the first network node 111. By sending the fifth indication, the second network node 112 may then enable the third network node 113 may be enabled to receive the information regarding how often the CSI-RS measurements may be switched on and/or off, or whether they may have changed their configuration, and may then be enabled to configure the wireless device accordingly. In turn, the wireless device may be enabled to limit the monitoring of the Reference Signals (RS) in neighbour cells to the relevant neighbour cells, an/or the relevant time periods, for example, the network nodes that may be ON, and during the timer periods that they may be ON. This may enable the wireless device to avoid having to measure the CSI-RS transmission of all the neighbours of the first network node, and/or to have to perform the monitoring all the time, thereby saving time-frequency resources, as well as energy resources. This may in turn also avoid scalability issues in the communications network.

Embodiments of a method, performed by the third network node 113, will now be described with reference to the flowchart depicted in FIG. 7. The third network node 113 operates in the communications network 100. The third network node 113 may be comprised in the first group of network nodes 120. The first group of network nodes 120 may be neighbours to the first network node 111 operating in the communications network 100. The method may be understood to be for handling a measurement configuration.

Several embodiments are comprised herein. The method may comprise one or more of the following actions. In some embodiments, all the actions may be performed. In other embodiments, one or more actions may be performed. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. A non-limiting example of the method performed by the third network node 113 is depicted in FIG. 7. In FIG. 7, optional actions are indicated with dashed lines.

Figure 7:
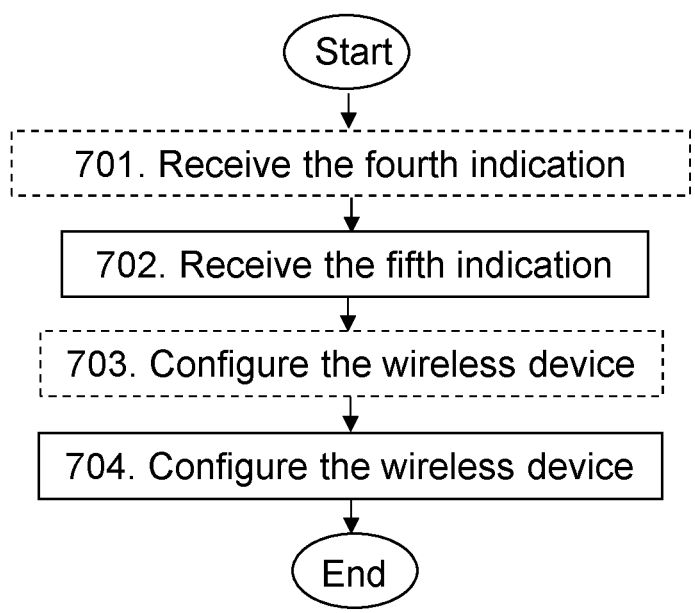
FIG. 7 is a flowchart depicting a method in a third network node, according to embodiments herein.

Some actions may be performed in a different order than that shown in FIG. 7. The detailed description of some of the following corresponds to the same references provided above, in relation to the actions described for the first node 111 and will thus not be repeated here. For example, the second indication may map to the first field, as described earlier, and/or the third indication may map to the second field, as described earlier.

Action 701

In this Action 701, the third network node 113 may receive the fourth indication from the second network node 112. The second network node 112 may be operating in the communications network 100. The fourth indication may indicate the one or more CSI-RS configurations of the first network node 111.

The third network node 113 may be managed by the second network node 112.

The receiving in this Action 701 may be performed, e.g., via the second link 172.

The receiving in this Action 701 may be based on at least one of: a) the relation between the one or more CSI-RS configurations of the first network node 111 and the third network node 113, b) the second relation between each CSI-RS of the first network node 111 and the third NR cell 153 of the third network node 113, and c) the third relation between the group of CSI-RSs of the first network node 111 and the third NR cell 153 of the third network node 113.

In some embodiments, at least one of the following options may apply. In a first option, the first network node 111 may operate on 5G, particularly, on NR. In a second option, the second network node 112 may operate on LTE. That is, the second network node 112 may operate on E-UTRA. In a third option, the third network node 113 may operate on 5G 3GPP, that is, on NR. In a fourth option, the first network node 111 may be a SN. In a fifth option, the second network node 112 may be a MN. In a sixth option, the third network node 113 may be another SN.

The advantages of this Action 701 may be understood to be corresponding to those provided for Action 604.

Action 702

In this Action 702, the third network node 113 receives an indication, referred to herein as the fifth indication, from the second network node 112 operating in the communications network 100. The third network node 113 is managed by the second network node 112. The indication, that is, the fifth indication, indicates the transmission status of the one or more CSI-RS configurations of the first network node 111.

The receiving in this Action 702 may be performed, e.g., via the second link 172.

In some embodiments, the fifth indication may be comprised in the second field in the second information element.

The advantages of this Action 702 may be understood to be corresponding to those provided for Action 605.

Action 703

In this Action 703, the third network node 113 may configure the wireless device 160 operating in the communications network 100 based on the received fourth indication.

By configuring the wireless device 160 in this Action 703, the third network node 113 may enable the wireless device 160 to limit the monitoring of the Reference Signals (RS) in neighbour cells to the relevant neighbour cells, an/or the relevant time periods, for example, the network nodes that may be using this indication to allocate the right Random Access CHannel (RACH) resources to a UE, such as the wireless device 160, that may be performing the CSI-RS based Handover (HO). This may enable the wireless device to avoid having to measure the CSI-RS transmission of all the neighbours of the first network node, and/or to have to perform the monitoring all the time, thereby saving time-frequency resources, as well as energy resources. This may in turn also avoid scalability issues in the communications network.

Action 704

In this Action 704, the third network node 113 configures the wireless device 160 based on the received indication, that is, the fifth indication.

By configuring the wireless device 160 in this Action 704, the third network node 113 may enable the wireless device 160 to limit the monitoring of the Reference Signals (RS) in neighbour cells to the relevant neighbour cells, an/or the relevant time periods. This may enable the wireless device to avoid having to measure the CSI-RS transmission of all the neighbours of the first network node, and/or to have to perform the monitoring all the time, thereby saving time-frequency resources, as well as energy resources. This may in turn also avoid scalability issues in the communications network.

EXAMPLES

Some embodiments herein will now be further described with some non-limiting examples.

In the following description, any reference to a/the UE, or simply "UE" may be understood to equally refer the wireless device 160; any reference to a/the first network node, a/the first network node 1000, and/or a/the "SN node", "Serving node", "source SN", "first SN" and/or a/the "RAN Node 1" may be understood to equally refer to the first network node 111; any reference to a/the second network node, a/the second network node 2000, and/or a/the "MN node", and/or a/the "RAN Node 2" may be understood to equally refer to the second network node 112; any reference to a/the third network node, a/the third network node 3000, and/or a/the "another SN node", "another serving node", "target node", "second SN", "target SN", and/or a/the "RAN Node 3" may be understood to equally refer to the third network node 113; any reference to a/the "NR cell", "SN cell", "first NR cell" and/or Cell 1, may be understood to equally refer to the first cell 151; any reference to a/the "neighbouring NR cell", "Neighbour cell", "another candidate SN cell", "neighbour NR cell", may be understood to equally refer to the third NR cell 153; any reference to a/the "other neighbour cells", "neighbouring NR cells", "Neighbour cell", "Neighbour cells", "neighbour NR cells", "neighbouring cells", may be understood to equally refer to the neighbouring NR cells 155; any reference to a/the "LTE cell", "MN cell", "Primary cell", "EUTRA cell", may be understood to equally refer to the second cell 152; any reference to a/the gNBs, and/or a/the RAN, and/or a/the RAN nodes may be understood to equally refer to any of the first network node 111, and/or the second network node 112, based on context.

DETAILED EXAMPLES

In this section, the Xn interface may be taken as an example and a description of the methods is made on the basis of the procedures and IEs specified for the XnAP. The person skilled in the art may be able to appreciate that equivalent methods and examples may be derived for the X2 interface and other similar interfaces.

The parts highlighted below correspond to changes with respect to current specifications.

XnAP Example Method 1

In this method, the list of CSI-RS configurations used and/or supported by a cell may be fully contained in the Measurement Timing Configuration (MTC) Information Element (IE), that is, it may not be visible at the XnAP level. An index, named Active Measurement Timing Configuration Index IE may identify a specific CSI-RS combination, e.g. one value of the index may point at CSI RS configuration 1, 4, 6 being active in a cell, while another index value may point at CSI RS configuration 2, 3, 7 being active. With this method, exposure of each CSI RS configuration over the XnAP may be understood to be not needed, namely the active and/or inactive status of each CSI-RS configuration may not need to be explicitly signaled over the XnAP.

Figure 8:
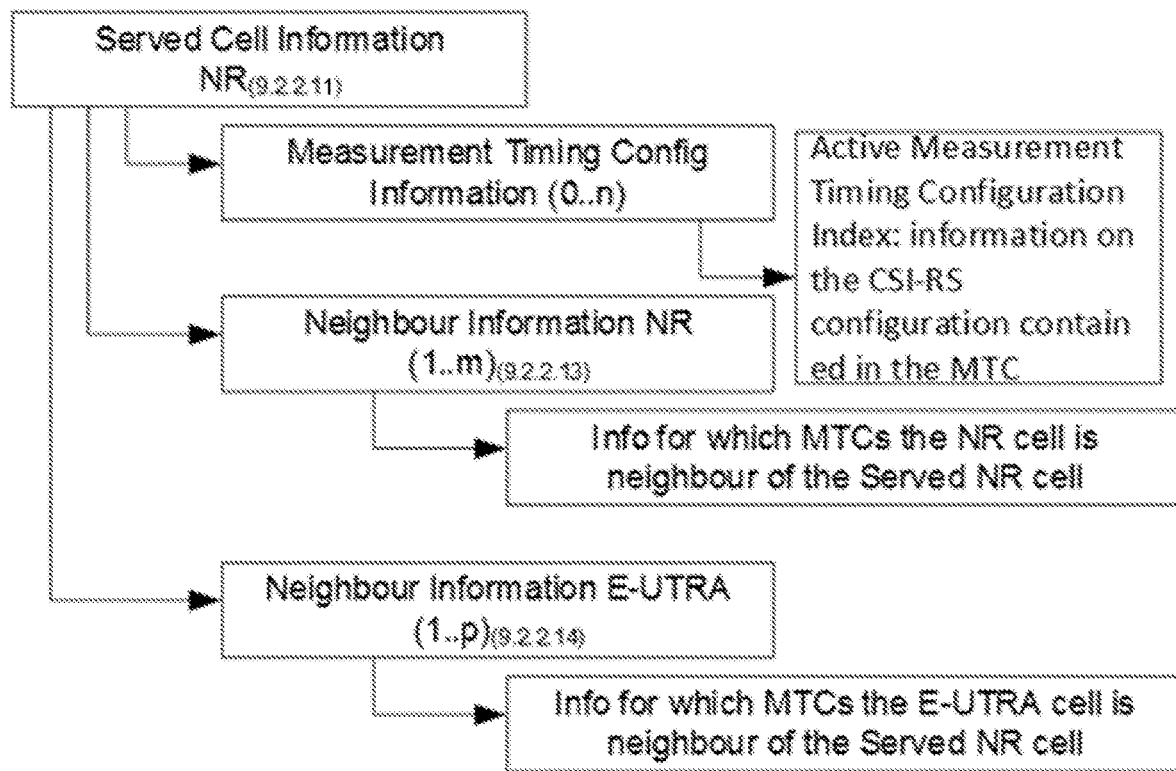
FIG. 8 is a schematic diagram illustrating an example of a Data structure in XnAP Example method 1, according to embodiments herein.

This method may be understood to enhance the current XnAP protocol by not adding beam-related neighbour relations, but may avoid providing whole served cell and neighbour cell relations in between nodes by the usage of indices. FIG. 8 is a schematic diagram representation of a non-limiting example of a Data Structure in XnAP Example Method 1, taking TS38.423v15.5.0 as a reference.

To implement embodiments herein according to the Examine method 1, changes to the current TS38.423 specification may need to be implemented as follows. The changes are indicated by all columns for any given row containing bold font.

In the following, some tables may be split over more than one page. All tables, which may not be necessarily numbered, not having a header row may be understood to be continuations of the table in the previous page.

Start of the Changes to XnAP 9.1.3.1 Xn Setup Request

This message may be sent by a NG-RAN node to a neighbouring NG-RAN node to transfer application data for an Xn-C interface instance.

| | | | | | | |
|---|---|---|---|---|---|---|
| Direction: NG-RAN nodes$_1$ → NG-RAN node$_2$. | | | | | | |
| IE/Group Name | Presence | Range | IE type and reference | Semantics description | Criticality | Assigned Criticality |
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |

-continued

| | | Direction: NG-RAN nodes₁ → NG-RAN node₂. | | | | |
|---|---|---|---|---|---|---|
| AMF Region Information | M | | 9.2.3.83 | Contains a list of all the AMF Regions to which the NG-RAN node belongs. | YES | reject |
| List of Served Cells NR | | 0..<maxnoofCell sin NG-RAN node> | | Contains a complete list of cells served by the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| List of Served Cells E-UTRA | | 0..<maxnoofCellsinNG-RAN node> | | Contains a complete list of cells served by the ng-eNB. | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| Interface Instance Indication | O | | 9.2.2.39 | | YES | reject |

| Range bound | Explanation |
|---|---|
| maxnoofCellsinNG-RAN node | Maximum no. cells that can be served by a NG-RAN node. Value is 16384. |

9.1.3.2 Xn Setup Response

This message may be sent by a NG-RAN node to a neighbouring NG-RAN node to transfer application data for an Xn-C interface instance.

| | | Direction: NG-RAN node₂ → NG-RAN node₁. | | | |
|---|---|---|---|---|---|
| IE/Group Name | Presence | Range | IE type and reference | Semantics description | Criticality | Assigned Criticality |
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |

-continued

| | | | Direction: NG-RAN node₂ → NG-RAN node₁. | | | |
|---|---|---|---|---|---|---|
| IE/Group Name | Presence | Range | IE type and reference | Semantics description | Criticality | Assigned Criticality |
| List of Served Cells NR | | 0..<maxnoofCellsinNG-RAN node> | | Contains a complete list of cells served by the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| List of Served Cells E-UTRA | | 0..<maxnoofCellsinNG-RAN node> | | Contains a complete list of cells served by the ng-eNB | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| Criticality Diagnostics | O | | 9.2.3.3 | | YES | ignore |
| AMF Region Information | O | | 9.2.3.83 | Contains a list of all the AMF Regions to which the NG-RAN node belongs. | YES | reject |
| Interface Instance Indication | O | | 9.2.2.39 | | YES | reject |

| Range bound | Explanation |
|---|---|
| maxnoofCellsinNG-RAN node | Maximum no. cells that can be served by a NG-RAN node. Value is 16384. |

9.1.3.4 NG-RAN Node Configuration Update

This message may be sent by a NG-RAN node to a neighbouring NG-RAN node to transfer updated information for an Xn-C interface instance.

| | | | Direction: NG-RAN node₁ → NG-RAN node₂. | | | |
|---|---|---|---|---|---|---|
| IE/Group Name | Presence | Range | IE type and reference | Semantics description | Criticality | Assigned Criticality |
| Message Type | M | | 9.2.3.1 | | YES | reject |
| TAI Support List | O | | 9.2.3.20 | List of supported TAs and associated characteristics. | GLOBAL | reject |

| | | Direction: NG-RAN node$_1$ → NG-RAN node$_2$. | | | | |
|---|---|---|---|---|---|---|
| CHOICE Initiating NodeType | M | | | | YES | ignore |
| >gNB | | | | | | |
| >>Served Cells To Update NR | O | | 9.2.2.15 | | YES | ignore |
| >>Cell Assistance Information NR | O | | 9.2.2.17 | | YES | ignore |
| >ng-eNB | | | | | | |
| >>Served Cells to Update E-UTRA | O | | 9.2.2.16 | | YES | ignore |
| >>Cell Assistance Information NR | O | | 9.2.2.17 | | YES | ignore |
| TNLA To Add List | | 0..1 | | | YES | ignore |
| >TNLA To Add Item | | 1..<maxnoofTNLAssociations> | | | — | |
| >>TNLA Transport Layer Information | M | | CP Transport Layer Information 9.2.3.31 | CP Transport Layer Information of NG-RAN node$_1$ | — | |
| >>TNL Association Usage | O | | 9.2.3.84 | | — | |
| TNLA To Update List | | 0..1 | | | YES | ignore |
| >TNLA To Update Item | | 1..<maxnoofTNLAssociations> | | | — | |
| >>TNLA Transport Layer Information | M | | CP Transport Layer Information 9.2.3.31 | CP Transport Layer Information of NG-RAN node$_1$ | — | |
| >>TNL Association Usage | O | | 9.2.3.84 | | — | |
| TNLA To Remove List | | 0..1 | | | YES | ignore |
| >TNLA To Remove Item | | 1..<maxnoofTNLAssociations> | | | — | |
| >>TNLA Transport Layer Information | M | | CP Transport Layer Information 9.2.3.31 | CP Transport Layer Information of NG-RAN node$_1$ | — | |
| Global NG-RAN Node ID | O | | 9.2.2.3 | | YES | reject |
| AMF Region Information To Add | O | | AMF Region Information 9.2.3.83 | List of all added AMF Regions to which the NG-RAN node belongs. | YES | reject |

-continued

| | | Direction: NG-RAN node₁ → NG-RAN node₂. | | | | |
|---|---|---|---|---|---|---|
| AMF Region Information To Delete | O | | AMF Region Information 9.2.3.83 | List of all deleted AMF Regions to which the NG-RAN node belongs. | YES | reject |
| Interface Instance Indication | O | | 9.2.2.39 | | YES | reject |

| Range bound | Explanation |
|---|---|
| maxnoofTNLAssociations | Maximum numbers of TNL Associations between the NG RAN nodes. Value is 32. |

9.1.3.5 NG-RAN Node Configuration Update Acknowledge

This message may be sent by a neighbouring NG-RAN node to a peer node to acknowledge update of information for a TNL association.

| | | Direction: NG-RAN node₂ → NG-RAN node₁. | | | | |
|---|---|---|---|---|---|---|
| IE/Group Name | Presence | Range | IE type and reference | Semantics description | Criticality | Assigned Criticality |
| Message Type | M | | 9.2.3.1 | | YES | reject |
| CHOICE Responding NodeType | M | | | | YES | ignore |
| >ng-eNB | | | | | | |
| >gNB | | | | | | |
| >>Served NR Cells | | 0 .. <maxnoofCellsinNG-RANnode> | | Complete or limited list of cells served by a gNB, if requested by an NG-RAN node. | — | |
| >>>Served Cell Information NR | M | | 9.2.2.11 | | — | |
| >>>Neighbour Information NR | O | | 9.2.2.13 | NR neighbours. | — | |
| >>>Neighbour Information E-UTRA | O | | 9.2.2.14 | E-UTRA neighbours | — | |
| TNLA Setup List | | 0 .. 1 | | | YES | ignore |
| >TNLA Setup Item | | 1.. <maxnoofTNLAssociations> | | | — | |
| >>TNLA Transport Layer Address | M | | CP Transport Layer Information 9.2.3.31 | CP Transport Layer Information as received from NG-RAN node₁ | | |
| TNLA Failed to Setup Lis | | 0.. 1 | | | YES | ignore |
| >TNLA Failed To Setup Item | | 1.. <maxnoofTNLAssociations> | | | — | |
| >>TNLA Transport Layer | M | | CP Transport | CP Transport | | |

| Direction: NG-RAN node₂ → NG-RAN node₁. | | | | | |
|---|---|---|---|---|---|
| Address | | Layer Information 9.2.3.31 | Layer Information as received from NG-RAN node₁ | | |
| >>Cause | M | 9.2.3.2 | — | | |
| Criticality Diagnostics | O | 9.2.3.3 | | YES | ignore |
| Interface Instance Indication | O | 9.2.2.39 | | YES | reject |

| Range bound | Explanation |
|---|---|
| maxnoofCellsinNGRANnode | Maximum no. cells that can be served by an NG-RAN node. Value is 16384. |
| maxnoofTNLAssociations | Maximum numbers of TNL Associations between NG-RAN nodes. Value is 32. |

9.2.2.11 Served Cell Information NR

This IE may contain cell configuration information of an NR cell that a neighbouring NG-RAN node may need for the Xn AP interface.

TABLE 1

| IE/Group Name | Presence | Range | IE type and reference | Semantics description | Criticality | Assigned Criticality |
|---|---|---|---|---|---|---|
| NR-PCI | M | | INTEGER (0.. 1007, ..) | NR Physical Cell ID | — | |
| NR CGI | M | | 9.2.2.7 | | — | |
| TAG | M | | 9.2.2.5 | Tracking Area Code | — | |
| RANAC | O | | RAN Area Code 9.2.2.6 | | — | |
| Broadcast PLMNs | | 1..<maxnoofBPLMNs> | | Broadcast PLMNs | — | |
| >PLMN Identity | M | | 9.2.2.4 | | — | |
| CHOICE NR-Mode-Info | M | | | | — | |
| >FDD | | | | | | |
| >>FDD Info | | 1 | | | — | |
| >>>UL NR Frequency Info | M | | NR Frequency Info 9.2.2.19 | | — | |
| >>>DL NR Frequency Info | M | | NR Frequency Info 9.2.2.19 | | — | |
| >>>UL Transmission Bandwidth | M | | NR Transmission Bandwidth 9.2.2.20 | | — | |
| >>>DL Transmission Bandwidth | M | | NR Transmission Bandwidth 9.2.2.20 | | — | |
| >TDD | | | | | | |
| >>TDD Info | | 1 | | | — | |
| >>>Frequency Info | M | | NR Frequency Info 9.2.2.19 | | — | |

TABLE 1-continued

| IE/Group Name | Presence | Range | IE type and reference | Semantics description | Criticality | Assigned Criticality |
|---|---|---|---|---|---|---|
| >>>Transmission | M | | NR Transmission Bandwidth 9.2.2.20 | | — | |
| Measurement Timing Configuration | M | | OCTET STRING | Contains the Measurement TimingConfiguration inter-node message for the served cell, as defined in TS 38.331 [10]. | — | |
| Additional Measurement Timing Configuration List | O | 1..<maxnoofMTCItems> | | | YES | Ignore |
| >Additional Measurement Timing Configuration Item | M | | OCTET STRING | Contains the Measurement TimingConfiguration inter-node message for the neighbour cell, as defined in TS 38.331 [10]. | — | |
| Active Measurement Timing Configuration Index | c-ifadditional MTC | | 9.2.2.x | "0" refers to the configuration contained in the Measurement Timing Configuration IE. Any value between "1" and "maxnoofMTCItems" to a configuration within the Additional Measurement Timing Configuration List. | | |
| Connectivity Support | M | | 9.2.2.28 | | — | |
| Broadcast PLMN Identity Info List NR | | 0..<maxnoofBPLMNs-1> | | This IE corresponds to the PLMN-IdentityInfoList IE in SIB1 as specified in TS 38.331 [8]. The PLMN Identities and associated information contained in this IE are provided in the same order as broadcast in SIB1. | YES | ignore |

TABLE 1-continued

| IE/Group Name | Presence | Range | IE type and reference | Semantics description | Criticality | Assigned Criticality |
|---|---|---|---|---|---|---|
| >Broadcast PLMNs | | 1..<maxnoofBPLMNs> | | Broadcast PLMNs | — | |
| >>PLMN Identity | M | | 9.2.2.4 | | — | |
| >TAC | M | | 9.2.2.5 | | — | |
| >NR Cell Identity | M | | BIT STRING (SIZE(36)) | | — | |
| >RANAC | O | | RAN Area Code 9.2.2.6 | | — | |

| Range bound | Explanation |
|---|---|
| maxnoofBPLMNs | Maximum no. of broadcast PLMNs by a cell. Value is 12. |
| maxnoofBPLMNs-1 | Maximum no. of PLMN Ids.broadcast a cell minus 1. Value is 11. |
| maxnoofMTCItems | Maximum no. of measurement timing configurations associated with the neighbour cell. |

| Condition | Explanation |
|---|---|
| 1. ifadditionalMTC | 2. This IE may be required to be present if the Additional Measurement Timing Configuration List is present. |

9.2.2.13 Neighbour Information NR

This IE may contain cell configuration information of NR cells that a neighbour NG-RAN node may need to properly operate its own served cells.

TABLE 2

| IE/Group Name | Presence | Range | IE type and reference | Semantics description |
|---|---|---|---|---|
| Neighbour Information NR | | 1..<maxnoofNeighbours> | | |
| >NRPCI | M | | INTEGER (0..1007) | NR Physical Cell ID |
| >NR CGI | M | | 9.2.2.7 | |
| >TAC | M | | 9.2.2.5 | Tracking Area Code |
| >RANAC | O | | RAN Area Code 9.2.2.6 | |
| >CHOICE NR-Mode-Info | M | | | |
| >>FDD | | | | |
| >>>FDD Info | | 1 | | |
| >>>>UL NR FreqInfo | M | | NR Frequency Info 9.2.2.19 | |
| >>>>DL NR FreqInfo | M | | NR Frequency Info 9.2.2.19 | |
| >>TDD | | | | |
| >>>TDD Info | | 1 | | |
| >>>>NR FreqInfo | M | | NR ARFCN Frequency Info 9.2.2.19 | |

TABLE 2-continued

| IE/Group Name | Presence | Range | IE type and reference | Semantics description |
|---|---|---|---|---|
| >Connectivity Support | M | | 9.2.2.28 | |
| >Measurement Timing Configuration | M | | OCTET STRING | Contains the MeasurementTiming-Configuration inter-node message for the neighbour cell, as defined in TS 38.331 [10]. |
| >Additional Measurement Timing Configuration List | O | 1 .. <maxnoofMTCItems> | | |
| >>Additional Measurement Timing Configuration Item | M | | OCTET STRING | Contains the MeasurementTiming-Configuration inter-node message for the neighbour cell, as defined in TS 38.331 [10]. |
| >Active Measurement Timing Configuration Index | C-ifadditional MTC | | 9.2.2.x Measurement Timing Configuration Index NR | "0" refers to the configuration contained in the Measurement Timing Configuration IE. Any value between "1" and "maxnoofMTCItems" to a configuration within the Additional Measurement Timing Configuration List. |
| >Neighbour Relation dependency on Served NR cell's Measurement Timing Configuration | O | 1 .. <maxnoofMTCItems> | | Only included if the item in the Neighbour Information NR IE is associated with a serving NR cell providing multiple Measurement Timing Configurations. |
| >>Neighbour Relation for given for the indicated Measurement Timing Configuration Index | M | | 9.2.2.x Measurement Timing Configuration Index NR | Provides information whether the NR cell is a neighbour of the serving NR cell for an active Measurement Timing Configuration. |

| Range bound | Explanation | |
|---|---|---|
| maxnoofNeighbours | Maximum no. of neighbour cells associated to a given served cell. Value is 1024. | |
| maxnoofMTCItems | Maximum no. of measurement timing configurations associated with the neighbour cell. | |

| Condition | Explanation | |
|---|---|---|
| ifadditionalMTC | This IE may be required to be present if the Additional Measurement Timing Configuration List is present. | |

9.2.2.14 Neighbour Information E-UTRA

This IE may contain cell configuration information of E-UTRA cells that a neighbour NG-RAN node may need to properly operate its own served cells.

TABLE 3

| IE/Group Name | Presence | Range | IE type and reference | Semantics description |
|---|---|---|---|---|
| E-UTRA Neighbour Information E-UTRA | | 1 .. <maxnoofNeighbours> | | |
| >E-UTRA PCI | M | | INTEGER (0..503, ... ) | E-UTRA Physical Cell Identifier of the neighbour cell |
| >ECGI | M | | E-UTRA CGI 9.2.2.8 | |
| >EARFCN | M | | E-UTRA ARFCN 9.2.2.21 | DL EARFCN for FDD or EARFCN for TDD |
| >TAC | M | | 9.2.2.5 | Tracking Area Code |
| >RANAC | O | | RAN Area Code 9.2.2.6 | |
| >Neighbour Relation dependency on Served NR cell's Measurement Timing Configuration | O | 1 .. <maxnoofMTCItems> | | Only included if the item in the Neighbour Information E-UTRA IE is associated with a serving NR cell providing multiple Measurement Timing Configurations. |
| >>Neighbour Relation for given for the indicated Measurement Timing Configuration Index | M | | 9.2.2.x Measurement Timing Configuration Index NR | Provides information whether the E-UTRA cell is a neighbour of the serving NR cell for an active Measurement Timing Configuration. |

| Range bound | Explanation |
|---|---|
| maxnoofNeighbours | Maximum no. of neighbour cells associated to a given served cell. Value is 1024. |

9.2.2.15 Served Cells to Update NR

This IE may contain updated configuration information for served NR cells exchanged between NG-RAN nodes.

TABLE 4

| IE/Group Name | Presence | Range | IE type and reference | Semantics description | Criticality | Assigned Criticality |
|---|---|---|---|---|---|---|
| Served Cells NR To Add | | 0.. <maxnoofCellsinNG-RAN node> | | List of added cells served by the NG-RAN node. | GLOBAL | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| Served Cells To Modify NR | | 0.. <maxnoofCellsinNG-RAN node> | | List of modified cells served by the NG-RAN node. | YES | reject |
| >Old NR CGI | M | | NR CGI 9.2.2.7 | | — | |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| >Deactivation Indication | O | | ENUMERATED (deactivated, . . . ) | Indicates that the concerned cell is switched off for energy saving reasons. | | |
| Served Cells To Delete NR | | 0.. <maxnooffCellsinNG-RAN node> | | List of deleted cells served by the NG-RAN node. | YES | reject |
| >Old NR-CGI | M | | NR CGI 9.2.2.7 | | — | |
| Served Cells MTC Modify NR | | 0.. <maxnoofCellsinNG-RAN node> | | List of NR cells for which the active Measurement Timing Configuration has changed. | YES | reject |
| >Measurement Timing Configuration Update Information NR | M | | 9.2.2.y | | — | |

| Range bound | Explanation |
| --- | --- |
| maxnoofCellsinNG-RAN node | Maximum no. cells that can be served by a NG-RAN node. Value is 16384. |

9.2.2.x Measurement Timing Configuration Index NR

This IE may contain an index to a Measurement Timing Configuration. It may be used if NR cell configuration information contains more than one MeasurementTiming-Configuration inter-node message as defined in TS 38.331 [10].

| IE/Group Name | Presence | Range | IE type and reference | Semantics description |
| --- | --- | --- | --- | --- |
| Measurement Timing Configuration Index NR | M | | INTEGER (0..maxnoofMTCItems) | "0" refers to the configuration contained in the Measurement Timing Configuration IE. Any value between "1" and "maxnoofMTCItems" to a configuration within the Additional Measurement Timing Configuration List. |

| Range bound | Explanation |
| --- | --- |
| maxnoofMTCItems | Maximum no. of measurement timing configurations associated with the neighbour cell. |

9.2.2.y Measurement Timing Configuration Update Information NR

This IE may contain a reduced set of information cell configuration information of an NR cell containing only an index to the currently active measurement timing configuration. If this IE is not included, the related neighbour relation to NR and E-UTRA cells do not change and stay as indicated in a previous XnAP message.

| IE/Group Name | Presence | Range | IE type and reference | Semantics description |
| --- | --- | --- | --- | --- |
| NR-PCI | M | | INTEGER (0..1007, . . . ) | NR Physical Cell ID |
| NR CGI | M | | 9.2.2.7 | |
| TAC | M | | 9.2.2.5 | Tracking Area Code |
| RANAC | O | | RAN Area Code 9.2.2.6 | |
| Broadcast PLMNs | | 1..<maxnoofBPLMNs> | | Broadcast PLMNs |
| >PLMN Identity | M | | 9.2.2.4 | |
| Active Measurement Timing Configuration Index | C-ifadditionalMTC | | 9.2.2.x | "0" refers to the configuration contained in the Measurement Timing Configuration IE. Any value between "1" and "maxnoofMTCItems" to a configuration within the Additional Measurement Timing Configuration List. |

XnAP Changes Method 2

In this method, the list of CSI-RS configurations used and/or supported by a cell may be fully exposed over the XnAP, that is, it may not only be visible within the MTC IE, but also at the XnAP level.

In this structure, each CSI-RS configuration listed in the XnAP message may be associated with an on-off status.

Also, for each CSI-RS configuration there may be a reference to neighbour cells

As a further enhancement, one may also signal a neighbour relation between the CSI-RS configuration and CSI-RS configurations in a given neighbour cells.

Figure 9:
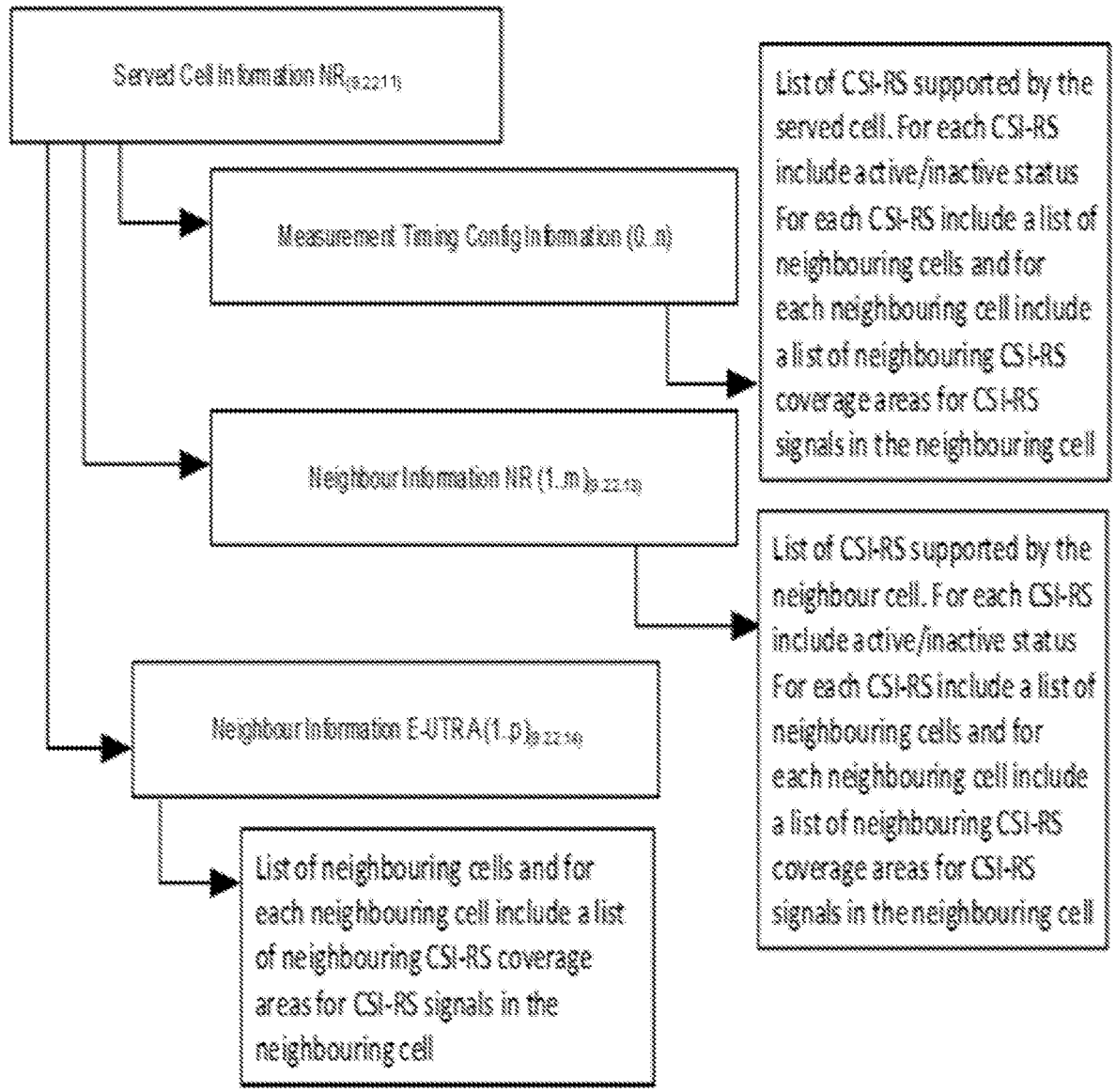
FIG. 9 is a schematic diagram illustrating an example of a Data structure in XnAP Example method 2, according to embodiments herein.

A Data Structure in XnAP Example Method 2, Taking TS38.423v15.5.0 as a reference, may be found in FIG. 9.

Figure 10:
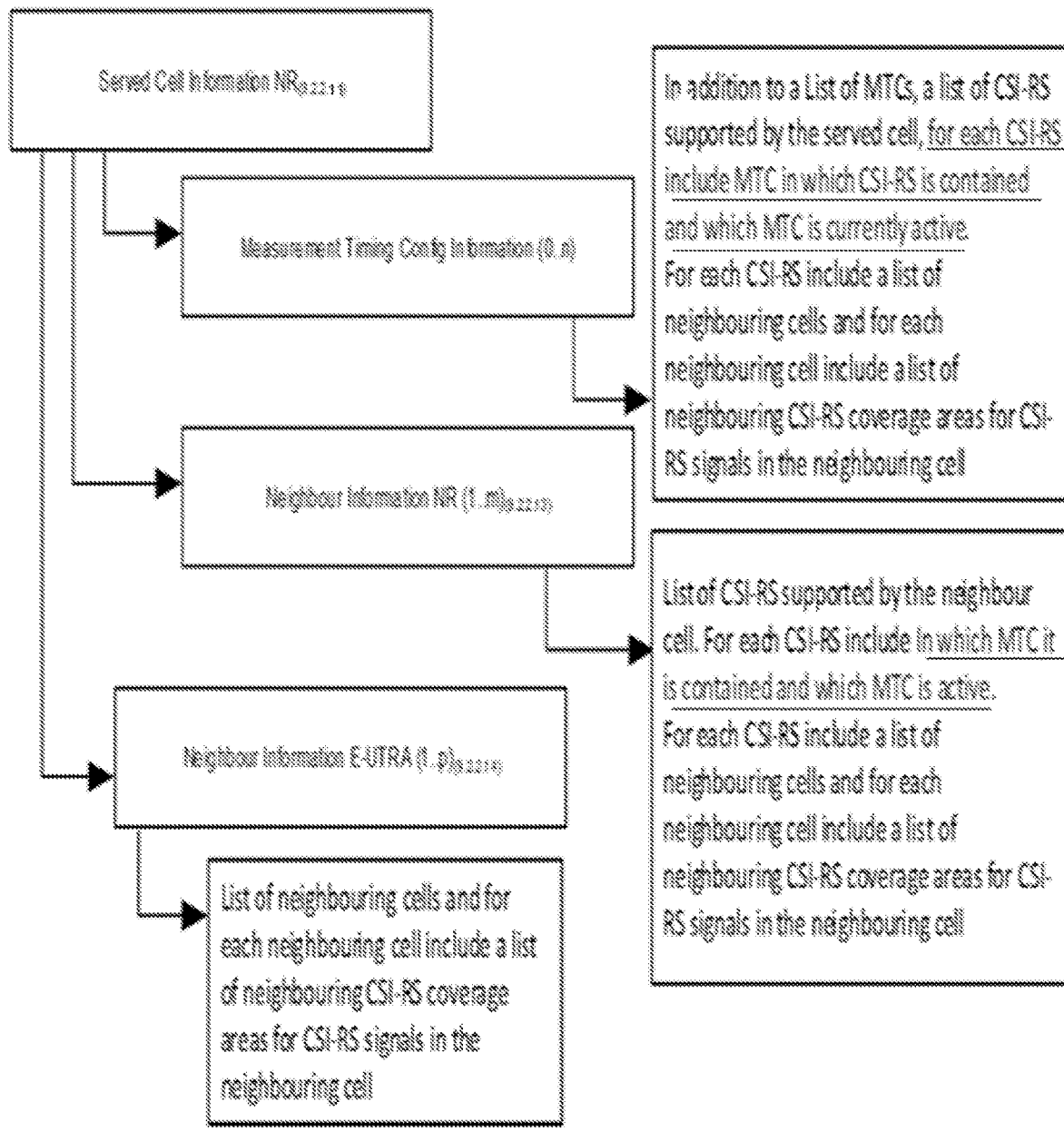
FIG. 10 is a schematic diagram illustrating another example of a Data structure in XnAP Example method 2, according to embodiments herein.

Alternatively, making more use of the MTC indices, reducing signalling effort, as shown in FIG. 10, for some IEs, in underlined font.

Start of the Changes to XnAP 9.1.3.1 XN Setup Request

This message may be sent by a NG-RAN node to a neighbouring NG-RAN node to transfer application data for an Xn-C interface instance.

| | | | | | | |
|---|---|---|---|---|---|---|
| Direction: NG-RAN node₁ → NG-RAN node₂. | | | | | | |
| IE/Group Name | Presence | Range | IE type and reference | Semantics description | Criticality | Assigned Criticality |
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| AMF Region Information | M | | 9.2.3.83 | Contains a list of all the AMF Regions to which the NG-RAN node belongs. | YES | reject |
| List of Served Cells NR | | 0 .. <maxnoofCellsinNG-RAN node> | | Contains a complete list of cells served by the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| List of Served Cells E-UTRA | | 0 .. <maxnoofCellsinNG-RAN node> | | Contains a complete list of cells served by the ng-eNB. | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| Interface Instance Indication | O | | 9.2.2.39 | | YES | reject |

| Range bound | Explanation |
|---|---|
| maxnoofCellsinNG-RAN node | Maximum no. cells that can be served by a NG-RAN node. Value is 16384. |

9.1.3.2 Xn Setup Response

This message may be sent by a NG-RAN node to a neighbouring NG-RAN node to transfer application data for an Xn-C interface instance.

Direction: NG-RAN node$_2$ → NG-RAN node$_1$.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| List of Served Cells NR | | 0 .. <maxnoofCellsinNG-RAN node> | | Contains a complete list of cells served by the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| List of Served Cells E-UTRA | | 0 .. <maxnoofCellsinNG-RAN node> | | Contains a complete list of cells served by the ng-eNB | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| Criticality Diagnostics | O | | 9.2.3.3 | | YES | ignore |
| AMF Region Information | O | | 9.2.3.83 | Contains a list of all the AMF Regions to which the NG-RAN node belongs. | YES | reject |
| Interface Instance Indication | O | | 9.2.2.39 | | YES | reject |

| Range bound | Explanation |
|---|---|
| maxnoofCellsinNG-RAN node | Maximum no. cells that can be served by a NG-RAN node. Value is 16384. |

9.1.3.4 NG-RAN Node Configuration Update

This message may be sent by a NG-RAN node to a neighbouring NG-RAN node to transfer updated information for an Xn-C interface instance.

| | | | | | | |
|---|---|---|---|---|---|---|
| Direction: NG-RAN node$_1$ → NG-RAN node$_2$. | | | | | | |
| IE/Group Name | Presence | Range | IE type and reference | Semantics description | Criticality | Assigned Criticality |
| Message Type | M | | 9.2.3.1 | | YES | reject |
| TAI Support List | O | | 9.2.3.20 | List of supported TAs and associated characteristics. | GLOBAL | reject |
| CHOICE Initiating NodeType | M | | | | YES | ignore |
| >gNB | | | | | | |
| >>Served Cells To Update NR | O | | 9.2.2.15 | | YES | ignore |
| >>Cell Assistance Information NR | O | | 9.2.2.17 | | YES | ignore |
| >ng-eNB | | | | | | |
| >>Served Cells to Update E-UTRA | O | | 9.2.2.16 | | YES | ignore |
| >>Cell Assistance Information NR | O | | 9.2.2.17 | | YES | ignore |
| TNLA To Add List | | 0..1 | | | YES | ignore |
| >TNLA To Add Item | | 1..<maxnoofTNLAssociations> | | | — | |
| >>TNLA Transport Layer Information | M | | CP Transport Layer Information 9.2.3.31 | CP Transport Layer Information of NG-RAN node$_1$ | — | |
| >>TNL Association Usage | O | | 9.2.3.84 | | — | |
| TNLA To Update List | | 0..1 | | | YES | ignore |
| >TNLA To Update Item | | 1..<maxnoofTNLAssociations> | | | — | |
| >>TNLA Transport Layer Information | M | | CP Transport Layer Information 9.2.3.31 | CP Transport Layer Information of NG-RAN node$_1$ | — | |
| >>TNL Association Usage | O | | 9.2.3.84 | | — | |
| TNLA To Remove List | | 0..1 | | | YES | ignore |
| >TNLA To Remove Item | | 1..<maxnoofTNLAssociations> | | | — | |
| >>TNLA Transport Layer Information | M | | CP Transport Layer Information 9.2.3.31 | CP Transport Layer Information of NG-RAN node$_1$ | — | |
| Global NG-RAN Node ID | O | | 9.2.2.3 | | YES | reject |
| AMF Region Information To Add | O | | AMF Region Information 9.2.3.83 | List of all added AMF Regions to which the NG- | YES | reject |

| | | Direction: NG-RAN node$_1$ → NG-RAN node$_2$. | | | | |
|---|---|---|---|---|---|---|
| AMF Region Information To Delete | O | | AMF Region Information 9.2.3.83 | RAN node belongs. List of all deleted AMF Regions to which the NG-RAN node belongs. | YES | reject |
| Interface Instance Indication | O | | 9.2.2.39 | | YES | reject |

| Range bound | Explanation |
|---|---|
| maxnoofTNLAssociations | Maximum numbers of TNL Associations between the NG RAN nodes. Value is 32. |

9.1.3.5 NG-RAN Node Configuration Update Acknowledge

This message may be sent by a neighbouring NG-RAN node to a peer node to acknowledge update of information for a TNL association.

| | | Direction: NG-RAN node$_2$ → NG-RAN node$_1$. | | | | |
|---|---|---|---|---|---|---|
| IE/Group Name | Presence | Range | IE type and reference | Semantics description | Criticality | Assigned Criticality |
| Message Type | M | | 9.2.3.1 | | YES | reject |
| CHOICE Responding NodeType | M | | | | YES | ignore |
| >ng-eNB | | | | | | |
| >gNB | | | | | | |
| >>Served NR Cells | | 0 .. <maxnoofCellsinNG-RANnode> | | Complete or limited list of cells served by a gNB, if requested by an NG-RAN node. | — | |
| >>>Served Cell Information NR | M | | 9.2.2.11 | | — | |
| >>>Neighbour Information NR | O | | 9.2.2.13 | NR neighbours. | — | |
| >>>Neighbour Information E-UTRA | O | | 9.2.2.14 | E-UTRA neighbours | — | |
| TNLA Setup List | | 0.. 1 | | | YES | ignore |
| >TNLA Setup Item | | 1.. <maxnoofTNLAssociations> | | | — | |
| >>TNLA Transport Layer Address | M | | CP Transport Layer Information 9.2.3.31 | CP Transport Layer Information as received from NG-RAN node$_1$ | — | |

-continued

| IE/Group Name | Presence | Range | IE type and reference | Semantics description | Criticality | Assigned Criticality |
|---|---|---|---|---|---|---|
| Direction: NG-RAN node$_2$ → NG-RAN node$_1$. | | | | | | |
| TNLA Failed to Setup Lis | | 0.. 1 | | | YES | ignore |
| >TNLA Failed To Setup Item | | 1.. <maxnoofTNLAssociations> | | | — | |
| >>TNLA Transport Layer Address | M | | CP Transport Layer Information 9.2.3.31 | CP Transport Layer Information as received from NG-RAN node$_1$ | — | |
| >>Cause | M | | 9.2.3.2 | | — | |
| Criticality Diagnostics | O | | 9.2.3.3 | | YES | ignore |
| Interface Instance Indication | O | | 9.2.2.39 | | YES | reject |

| Range bound | Explanation |
|---|---|
| maxnoofCellsinNGRANnode | Maximum no. cells that can be served by an NG-RAN node. Value is 16384. |
| maxnoofTNLAssociations | Maximum numbers of TNL Associations between NG-RAN nodes. Value is 32. |

9.2.2.11 Served Cell Information NR

This IE may contain cell configuration information of an NR cell that a neighbouring NG-RAN node may need for the Xn AP interface.

TABLE 5

| IE/Group Name | Presence | Range | IE type and reference | Semantics description | Criticality | Assigned Criticality |
|---|---|---|---|---|---|---|
| NR-PCI | M | | INTEGER (0.. 1007, ...) | NR Physical Cell ID | — | |
| NR CGI | M | | 9.2.2.7 | | — | |
| TAG | M | | 9.2.2.5 | Tracking Area Code | — | |
| RANAC | O | | RAN Area Code 9.2.2.6 | | — | |
| Broadcast PLMNs | | 1.. <maxnoofBPLMNs> | | Broadcast PLMNs | — | |
| >PLMN Identity | M | | 9.2.2.4 | | — | |
| CHOICE NR-Mode-Info | M | | | | — | |
| >FDD | | | | | | |
| >>FDD Info | | 1 | | | — | |
| >>>UL NR Frequency Info | M | | NR Frequency Info 9.2.2.19 | | — | |
| >>>DL NR Frequency Info | M | | NR Frequency Info 9.2.2.19 | | — | |
| >>>UL Transmission Bandwidth | M | | NR Transmission Bandwidth 9.2.2.20 | | — | |

TABLE 5-continued

| IE/Group Name | Presence | Range | IE type and reference | Semantics description | Criticality | Assigned Criticality |
|---|---|---|---|---|---|---|
| >>>DL Transmission Bandwidth | M | | NR Transmission Bandwidth 9.2.2.20 | | — | |
| >TDD | | | | | | |
| >>TDD Info | | 1 | | | | |
| >>>Frequency Info | M | | NR Frequency Info 9.2.2.19 | | — | |
| >>>Transmission Bandwidth | M | | NR Transmission Bandwidth 9.2.2.20 | | — | |
| Measurement Timing Configuration | M | | OCTET STRING | Contains the Measurement TimingConfiguration inter-node message for the served cell, as defined in TS 38.331 [10]. | — | |
| Additional Measurement Timing Configuration List | O | 1..<maxnoofMTCItems> | | | YES | Ignore |
| >Additional Measurement Timing Configuration Item | M | | OCTET STRING | Contains the Measurement TimingConfiguration inter-node message for the neighbour cell, as defined in TS 38.331 [10]. | — | |
| >CSI-RS List | M | 1..<maxnoofCSIRS Configurations> | | This list explicitly expresses the CSI RS configurations contained in the MTC | — | |
| >>CSI-RS Index | M | | INTEGER (0..95) | Index of CSI-RS as in MTC | | |
| >>CSI-RS status | M | | ENUMERATED (Active, Inactive, . . . ) | | | |
| >>CSI-RS neighbour list | O | 1..<maxnoofCSIRS neighbouringCells> | | This list expresses the cells and CSI-RSs neighbouring the CSI RS in CSI-RS Index | | |
| >>>NR CGI | M | | 9.2.2.7 | | | |
| >>>CSI-RS list | O | 1..<maxnoofCSIRS neighbourCells> | | This list expresses the CSI-RSs served by the NR CGI, which are neighbouring the CSI-RS of the served cell and contained in | | |

TABLE 5-continued

| IE/Group Name | Presence | Range | IE type and reference | Semantics description | Criticality | Assigned Criticality |
|---|---|---|---|---|---|---|
| >>>>CSI-RS Index | M | | INTEGER (0..95) | the MTC indicated by the neighbouring NR cell. | | |
| Connectivity Support | M | | 9.2.2.28 | | — | |
| Broadcast PLMN Identity Info List NR | | 0..<maxnoofBPLMNs-1> | | This IE corresponds to the PLMN-IdentityInfoList IE in SIB1 as specified in TS 38.331 [8]. The PLMN Identities and associated information contained in this IE are provided in the same order as broadcast in SIB1. | YES | ignore |
| >Broadcast PLMNs | | 1..<maxnoofBPLMNs> | | Broadcast PLMNs | — | |
| >>PLMN Identity | M | | 9.2.2.4 | | — | |
| >TAC | M | | 9.2.2.5 | | — | |
| >NR Cell Identity | M | | BIT STRING (SIZE(36)) | | — | |
| >RANAC | O | | RAN Area Code 9.2.2.6 | | — | |

| Range bound | Explanation |
|---|---|
| maxnoofBPLMNs | Maximum no. of broadcast PLMNs by a cell. Value is 12. |
| maxnoofBPLMNs-1 | Maximum no. of PLMN Ids.broadcast a cell minus 1. Value is 11. |
| maxnoofMTCItems | Maximum no. of measurement timing configurations associated with the neighbour cell. |
| maxnoofCSIRSConfigurations | Maximum number of CSI RS configurations reported in the MTC. Value is 96 |
| maxnoofCSIRSneighbourCells | Maximum number of cells neighbouring a CSI-RS coverage area. Value is 16 |
| maxnoofCSIRSneighbourCells | Maximum number of CSI-RS coverage areas neighbouring a specific CSI-RS coverage area. Value is 16 |

9.2.2.13 Neighbour Information NR

This IE may contain cell configuration information of NR cells that a neighbour NG-RAN node may need to properly operate its own served cells.

TABLE 6

| IE/Group Name | Presence | Range | IE type and reference | Semantics description |
|---|---|---|---|---|
| Neighbour Information NR | | 1 ..<maxnoofNeighbours> | | |
| >NRPCI | M | | INTEGER (0..1007) | NR Physical Cell ID |
| >NR CGI | M | | 9.2.2.7 | |
| >TAC | M | | 9.2.2.5 | Tracking Area Code |
| >RANAC | O | | RAN Area Code 9.2.2.6 | |

TABLE 6-continued

| IE/Group Name | Presence | Range | IE type and reference | Semantics description |
|---|---|---|---|---|
| >CHOICE NR-Mode-Info | M | | | |
| >>FDD | | | | |
| >>>FDD Info | | 1 | | |
| >>>>UL NR FreqInfo | M | | NR Frequency Info 9.2.2.19 | |
| >>>>DL NR FreqInfo | M | | NR Frequency Info 9.2.2.19 | |
| >>TDD | | | | |
| >>>TDD Info | | 1 | | |
| >>>>NR FreqInfo | M | | NR ARFCN Frequency Info 9.2.2.19 | |
| >Connectivity Support | M | | 9.2.2.28 | |
| >Measurement Timing Configuration | M | | OCTET STRING | Contains the MeasurementTiming-Configuration inter-node message for the neighbour cell, as defined in TS 38.331 [10]. |
| >Additional Measurement Timing Configuration List | O | 1 .. <maxnoofMTCItems> | | |
| >>Additional Measurement Timing Configuration Item | M | | OCTET STRING | Contains the MeasurementTiming-Configuration inter-node message for the neighbour cell, as defined in TS 38.331 [10]. |
| >>CSI-RS List | M | 1 .. <maxnoofCSIRSConfigurations> | | This list explicitly expresses the CSI RS configurations contained in the MTC |
| >>>CSI-RS Index | M | | INTEGER (0..95) | Index of CSI-RS as in MTC |
| >>>CSI-RS status | M | | ENUMERATED (Active, Inactive, . . . ) | |
| >>CSI-RS neighbour list | O | 1 .. <maxnoofCSIRSneighbourCells> | | This list expresses the cells and CSI-RSs neighbouring the CSI RS in CSI-RS Index |
| >>>>NR CGI | M | | 9.2.2.7 | |
| >>>>CSI-RS list | O | 1 .. <maxnoofCSIRSneighbourCells> | | This list expresses the CSI-RSs served by the CGI, which are neighbouring the CSI-RS of the neighbour cell |
| >>>>> CSI-RS Index | M | | INTEGER (0..95) | |

| Range bound | Explanation |
|---|---|
| maxnoofNeighbours | Maximum no. of neighbour cells associated to a given served cell. Value is 1024. |
| maxnoofMTCItems | Maximum no. of measurement timing configurations associated with the neighbour cell. |
| maxnoofCSIRSConfigurations | Maximum number of CSI RS configurations reported in the MTC. Value is 96 |
| maxnoofCSIRSneighbourCells | Maximum number of cells neighbouring a CSI-RS coverage area. Value is 16 |
| maxnoofCSIRSneighbourCells | Maximum number of CSI-RS coverage areas neighbouring a specific CSI-RS coverage area. Value is 16 |

| Condition | Explanation |
|---|---|
| ifadditionalMTC | This IE may be required to be present if the Additional Measurement Timing Configuration List is present. |

9.2.2.14 Neighbour Information E-UTRA

This IE may contain cell configuration information of E-UTRA cells that a neighbour NG-RAN node may need to properly operate its own served cells.

TABLE 7

| IE/Group Name | Presence | Range | IE type and reference | Semantics description |
|---|---|---|---|---|
| E-UTRA Neighbour Information E-UTRA | | 1 .. <maxnoofNeighbours> | | |
| >E-UTRA PCI | M | | INTEGER (0..503, ... ) | E-UTRA Physical Cell Identifier of the neighbour cell |
| >ECGI | M | | E-UTRA CGI 9.2.2.8 | |
| >EARFCN | M | | E-UTRA ARFCN 9.2.2.21 | DL EARFCN for FDD or EARFCN for TDD |
| >TAC | M | | 9.2.2.5 | Tracking Area Code |
| >RANAC | O | | RAN Area Code 9.2.2.6 | |
| >CSI-RS neighbour list | O | 1 .. <maxnoofCSIRSneighbourCells> | | This list expresses the NR cells and CSI-RSs neighbouring the E-UTRA cell |
| >>>>NRCGI | M | | 9.2.2.7 | |
| >>>>CSI-RS list | O | 1 .. <maxnoofCSIRSneighbourCells> | | This list expresses the CSI-RSs served by the CGI, which are neighbouring the CSI-RS of the neighbour cell |
| >>>>> CSI-RS Index | M | | INTEGER (0..95) | |

| Range bound | Explanation |
|---|---|
| maxnoofNeighbours | Maximum no. of neighbour cells associated to a given served cell. Value is 1024. |
| maxnoofCSIRSneighbourCells | Maximum number of cells neighbouring a CSI-RS coverage area. Value is 16 |
| maxnoofCSIRSneighbourCells | Maximum number of CSI-RS coverage areas neighbouring a specific CSI-RS coverage area. Value is 16 |

9.2.2.15 Served Cells to Update NR

This IE may contain updated configuration information for served NR cells exchanged between NG-RAN nodes.

TABLE 8

| IE/Group Name | Presence | Range | IE type and reference | Semantics description | Criticality | Assigned Criticality |
|---|---|---|---|---|---|---|
| Served Cells NR To Add | | 0 .. <maxnoofCellsinNG-RAN node> | | List of added cells served by the NG-RAN node. | GLOBAL | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| Served Cells To Modify NR | | 0 .. <maxnoofCellsinNG-RAN node> | | List of modified cells served by the NG-RAN node. | YES | reject |
| >Old NR CGI | M | | NR CGI 9.2.2.7 | | — | |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| >Deactivation Indication | O | | ENUMERATED (deactivated, . . . ) | Indicates that the concerned cell is switched off for energy saving reasons. | — | |
| Served Cells To Delete NR | | 0 .. <maxnoofCellsinNG-RAN node> | | List of deleted cells served by the NG-RAN node. | YES | reject |
| >Old NR-CGI | M | | NR CGI 9.2.2.7 | | — | |
| Served Cells MTC Modify NR | | 0 .. <maxnoofCellsinNG-RAN node> | | List of NR cells for which the active Measurement Timing Configuration has changed. | YES | reject |
| >Measurement Timing Configuration Update Information NR | M | | 9.2.2.y | | — | |

TABLE 8-continued

| IE/Group Name | Presence | Range | IE type and reference | Semantics description | Criticality | Assigned Criticality |
|---|---|---|---|---|---|---|
| >CSI-RS List | M | 1 .. <maxnoofCSIRS Configurations> | | This list explicitly expresses the CSI RS configurations contained in the MTC | — | |
| >>CSI-RS Index | M | | INTEGER (0..95) | Index of CSI-RS as in MTC | | |
| >>CSI-RS status | M | | ENUMERATED (Active, Inactive, . . . ) | | | |
| >>CSI-RS neighbour list | O | 1 .. <maxnoofCSIRS neighbourCells> | | This list expresses the cells and CSI-RSs neighbouring the CSI RS in CSI-RS Index | | |
| >>>NRCGI | M | | 9.2.2.7 | | | |
| >>>CSI-RS list | O | 1 .. <maxnoofCSIRS neighbourCells> | | This list expresses the CSI-RSs served by the CGI, which are neighbouring the CSI-RS of the served cell | | |
| >>>>CSI-RS Index | M | | INTEGER (0..95) | | | |

| Range bound | Explanation |
|---|---|
| maxnoofCellsinNG-RAN node | Maximum no. cells that can be served by a NG-RAN node. Value is 16384. |

9.2.2.x Measurement Timing Configuration Index NR

This IE may contain an index to a Measurement Timing Configuration. It may be used if NR cell configuration information contains more than one MeasurementTiming-Configuration inter-node message as defined in TS 38.331 [10].

| IE/Group Name | Presence | Range | IE type and reference | Semantics description |
|---|---|---|---|---|
| Measurement Timing Configuration Index NR | M | | INTEGER (0..maxnoof-MTCItems) | "0" refers to the configuration contained in the Measurement Timing Configuration IE. Any value between "1" and "maxnoof-MTCItems" to a configuration within the Additional Measurement Timing Configuration List. |

| Range bound | Explanation |
|---|---|
| maxnoofMTCItems | Maximum no. of measurement timing configurations associated with the neighbour cell. |

9.2.2.y Measurement Timing Configuration Update Information NR

This IE may contain a reduced set of information cell configuration information of an NR cell containing only the an index to the currently active measurement timing configuration. If this IE is included, the related neighbour relation to NR and E-UTRA cells does not change and stays as indicated in a previous XnAP message

| IE/Group Name | Presence | Range | IE type and reference | Semantics description |
|---|---|---|---|---|
| NR-PCI | M | | INTEGER (0..1007, . . . ) | NR Physical Cell ID |
| NR CGI | M | | 9.2.2.7 | |
| TAC | M | | 9.2.2.5 | Tracking Area Code |

-continued

| IE/Group Name | Presence | Range | IE type and reference | Semantics description |
|---|---|---|---|---|
| RANAC | O | | RAN Area Code 9.2.2.6 | |
| Broadcast PLMNs | | 1 .. <maxnoofBPLMNs> | | Broadcast PLMNs |
| >PLMN Identity | M | | 9.2.2.4 | |
| Active Measurement Timing Configuration Index | C-ifadditionalMTC | | INTEGER (0..maxnoofMTCItems) | "0" refers to the configuration contained in the Measurement Timing Configuration IE. Any value between "1" and "maxnoofMTCItems" to a configuration within the Additional Measurement Timing Configuration List. |

As it may be seen from the description above, the signalling may be understood to be aimed at achieving the following:

For each served cell signalled, e.g., for each new Physical Cell Identifier (PCI) indicated in the Xn SETUP/CONFIGURATION UPDATE messages, by a RAN node, a list of CSI-RS signals supported by such cell may be described. Such description may include an indication of whether the CSI-RS signal is active or inactive. The purpose of this indication may be understood to be to update neighbour nodes about whether a given CSI-RS may be available over the air or not.

For each served cell CSI-RS coverage area, a list of cells neighbouring such coverage area may be provided. It may be understood that a coverage area may encompass a list of cells, e.g., a list of PCI IEs. Also, a list of coverage areas for CSI RS signals supported by the neighbour cell may be provided. This may be understood to allow each node receiving this information to build a neighbour relation between CSI RS signals of neighbour cells. The latter may be understood to be very useful when configuring CSI-RS based mobility, as it may allow to configure the UE with the CSI-RS relevant to the mobility event for the UE.

For each neighbour NR cell signalled by a RAN node, a list of CSI-RS signals supported by such cell may be described. Such description may include an indication of whether the CSI-RS signal is active or inactive. The purpose of this indication may be understood to be to update neighbour nodes about whether a given CSI-RS may be available over the air or not.

For each neighbour cell CSI-RS coverage area, a list of cells neighbouring such coverage area may be provided. Also, a list of coverage areas for CSI RS signals supported by the neighbour cell may be provided. This may allow each node receiving this information to build a neighbour relation between CSI RS signals of neighbour cells. The latter may be very useful when configuring CSI-RS based mobility, as it may allow to configure the UE with the CSI-RS relevant to the mobility event for the UE.

For each neighbour E-UTRA cell signalled by a RAN node, a list of NR cells neighbouring such E-UTRA cell may be included. Also, a list of coverage areas for CSI RS signals supported by the neighbour NR cell may be provided. This may allow each node receiving this information to build a neighbour relation between CSI RS signals of neighbour cells. The latter may be understood to be very useful when configuring CSI-RS based mobility, as it may allow to configure the UE with the CSI-RS relevant to the mobility event for the UE.

As a summarized overview of the above, embodiments herein may be understood to enable signaling to target SNs by sending the CSI-RS information, including a list of candidate SN list in the gNB configuration update message sent from the SN to the MN. This list may provide an indication as to which other SN candidates may need to be informed about this particular CSI-RS configuration change. The same principle may apply for ON/OFF related changes.

Certain embodiments disclosed herein may provide one or more of the following technical advantage(s), which may be summarized as follows. Embodiments herein may be understood to provide methods that enable to know which CSI-RS information of neighbouring SN nodes may need to be sent to a target SN, via the X2/Xn configuration update messages, and to add an indication on whether the CSI-RS is ON or OFF, with the duration of the CSI-RS transmission.

Figure 11:
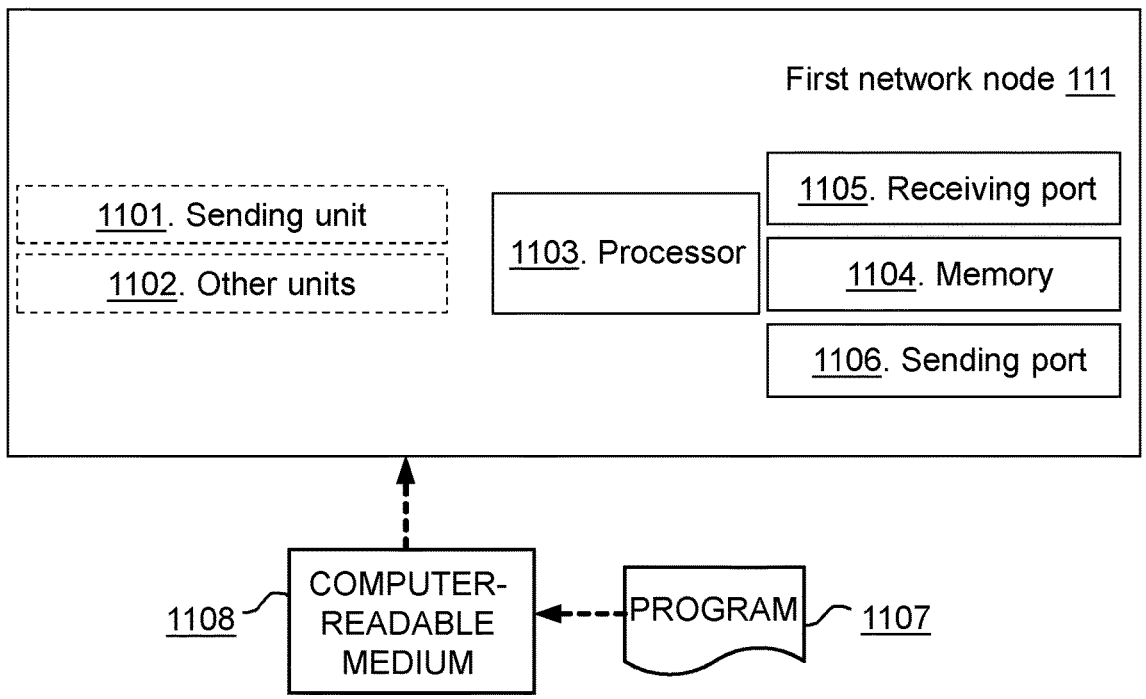
FIG. 11 is a schematic block diagram illustrating embodiments of a first network node, according to embodiments herein.
Figure 11:
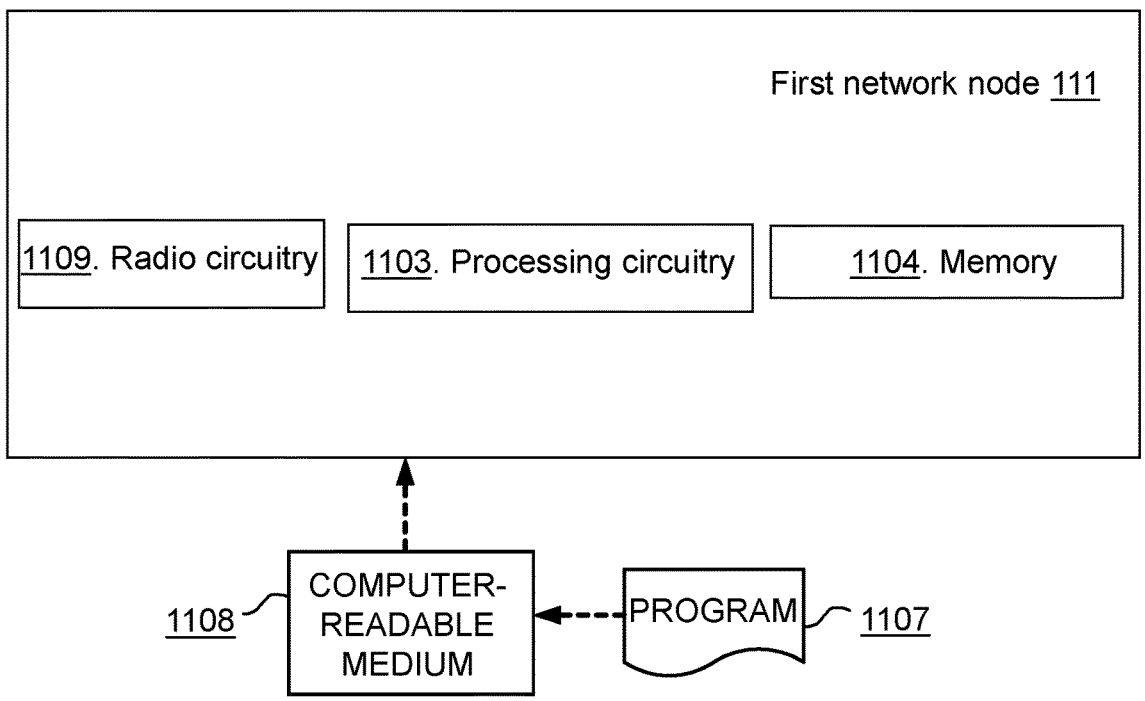
Figure 17:
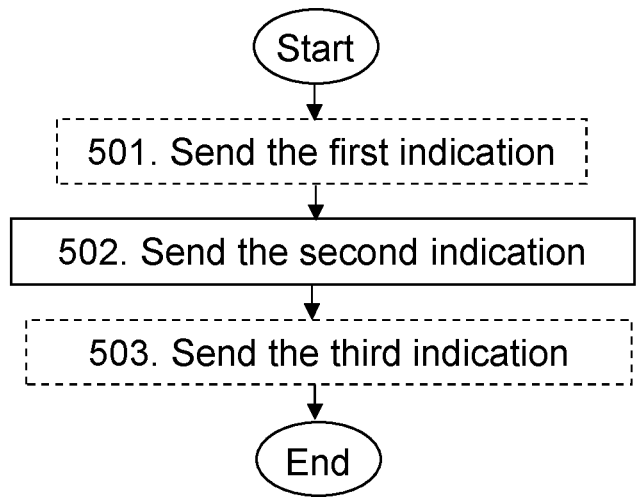
FIG. 17 is a flowchart depicting a method in a first network node, related to embodiments herein.

FIG. 11 depicts two different examples in panels a) and b), respectively, of the arrangement that the first network node 111 may comprise to perform the method actions described above in relation to FIG. 5, FIGS. 8-10, FIG. 14 and/or FIG. 17. In some embodiments, the first network node 111 may comprise the following arrangement depicted in FIG. 11a. The first network node 111 may be understood to be for handling a measurement configuration. The first network node 111 is configured operate in the communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111 and will thus not be repeated here. For example, in some embodiments, the first field may be mapped to one of the following fields in different IEs, e.g., according to an example method 1, described earlier: 1) A "Neighbour Relation for given for the indicated Measurement Timing Configuration Index" field, as provided in Table 2 under the Section numbered "9.2.2.13 Neighbour Information NR", 2) A "Neighbour Relation for given for the indicated Measurement Timing Configuration Index" field, as provided in Table 3 under the Section numbered "9.2.2.14 Neighbour Information E-UTRA". In other examples, the first field may be mapped to the following fields in different IEs, e.g., according to an example method 2, described earlier: 1) A "CSI-RS neighbour list" as provided in Table 5, Table 6, Table 7, and Table 8.

In FIG. 11, optional units are indicated with dashed boxes.

The first network node 111 may be configured to perform the sending of Action 503, e.g. by means of a sending unit 1101 within the first network node 111, configured to perform this action send an indication, that is, the third indication, to the second network node 112 configured to operate in the communications network 100. The third indication is configured to indicate the transmission status of one or more CSI-RS configurations of the first network node 111. The sending unit 1101 may be a processor 1103 of the first network node 111, or an application running on such processor.

In some embodiments, the first network node 111 may be configured to manage the first cell 151. The sending of the, third, indication may be configured to comprise sending the transmission status of the CSI-RS configurations of the first network node 111.

In some embodiments, the indication may be configured to be the third indication and the first network node 111 may be configured to perform the sending of Action 501, e.g. by means of the sending unit 1101, configured to send the first indication to the second network node 112. The first indication may be configured to indicate the one or more CSI-RS configurations of the first network node 111.

In some embodiments, the indication may be configured to be the third indication and the first network node 111 may be configured to perform the sending of Action 502, e.g. by means of the sending unit 1101, configured to perform send the second indication to the second network node 112. The second indication may be configured to indicate the relation between the one or more CSI-RS configurations of the first network node 111 with network nodes comprised in a first group of network nodes 120 configured to operate in the communications network 100 comprising the third network node 113.

In some embodiments, the relation may be configured to be the first relation and at least one of the following may be further configured to apply to the first relation between the one or more CSI-RS configurations of the first network node 111 with the network nodes comprised in the first group of network nodes 120: a. it may be configured to be based on the second relation between each CSI-RS of the first network node 111 and neighbouring New Radio, NR, cells 155 of the first network node 111; b. it may be configured to be based on the third relation between a group of CSI-RSs of the first network node 111 and the neighbouring NR cells 155 of the first network node 111; c. it may be configured to comprise the map between the one or more CSI-RS configurations of the first network node 111 and the network nodes configured to be comprised in the first group of network nodes 120; and d. it may be configured to comprise a list of one or more network nodes configured to be comprised in the first group of network nodes 120 to which the one or more CSI-RS configurations of the first network node 111 may be configured to be applicable.

In some embodiments, at least one of the following may be configured to apply: a. the first network node 111 may be configured to operate on NR; b. the second network node 112 may be configured to operate on E-UTRA; c. the third network node 113 may be configured to operate on NR; d. the first network node 111 may be configured to be an SN; e. the second network node 112 may be configured to be a MN; and f. the third network node 113 may be configured to be another SN.

In some embodiments, the second indication may be configured to comprise the explicit neighbour relation for at least one of: a. the set of CSI-RS indexes of the first cell 151 configured to be managed by the first network node 111; and b. each of the CSI-RS indexes of the first cell 151 configured to be managed by the first network node 111.

In some embodiments, at least one of: the following may be configured to apply: a. the second indication may be configured to be comprised in the first field in the first information element, and b. the third indication may be configured to be comprised in the second field in the second information element.

Other units 1102 may be comprised in the first network node 111.

The embodiments herein in the first network node 111 may be implemented through one or more processors, such as a processor 1103 in the first network node 111 depicted in FIG. 11a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1104 comprising one or more memory units. The memory 1104 is arranged to be used to store obtained information, store data, configurations, schedulings, and applications etc. to perform the methods herein when being executed in the first network node 111.

In some embodiments, the first network node 111 may receive information from, e.g., any of the second network node 112, the third network node 113, and any of the nodes comprised in any of the first group of network nodes 120, the second group of network nodes 130 and the third group of network nodes 140, the wireless device 160, the host computer 2110, or any of the other nodes, through a receiving port 1105. In some embodiments, the receiving port 1105 may be, for example, connected to one or more antennas in first network node 111. In other embodiments, the first network node 111 may receive information from another structure in the communications network 100 through the receiving port 1105. Since the receiving port 1105 may be in communication with the processor 1103, the receiving port 1105 may then send the received information to the processor 1103. The receiving port 1105 may also be configured to receive other information.

The processor 1103 in the first network node 111 may be further configured to transmit or send information to e.g., any of the second network node 112, the third network node 113, and any of the nodes comprised in any of the first group of network nodes 120, the second group of network nodes 130 and the third group of network nodes 140, the wireless device 160, the host computer 2110, or any of the other nodes, or another structure in the communications network 100, through a sending port 1106, which may be in communication with the processor 1103, and the memory 1104.

Those skilled in the art will also appreciate that the different units 1101-1102 described above may refer to a combination of analog and digital modules, and/or one or more processors configured with software and/or firmware, e.g., stored in memory, that, when executed by the one or more processors such as the processor 1103, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1101-1102 described above may be implemented as one or more applications running on one or more processors such as the processor 1103.

Thus, the methods according to the embodiments described herein for the first network node 111 may be respectively implemented by means of a computer program 1107 product, comprising instructions, i.e., software code portions, which, when executed on at least one processor 1103, cause the at least one processor 1103 to carry out the actions described herein, as performed by the first network node 111. The computer program 1107 product may be stored on a computer-readable storage medium 1108. The computer-readable storage medium 1108, having stored thereon the computer program 1107, may comprise instructions which, when executed on at least one processor 1103, cause the at least one processor 1103 to carry out the actions described herein, as performed by the first network node 111. In some embodiments, the computer-readable storage medium 1108 may be a non-transitory computer-readable storage medium, such as a CD ROM disc, or a memory stick. In other embodiments, the computer program 1107 product may be stored on a carrier containing the computer program 1107 just described, wherein the carrier is one of an electronic signal, optical signal, radio signal, or the computer-readable storage medium 1108, as described above.

The first network node 111 may comprise a communication interface configured to facilitate communications between the first network node 111 and other nodes or devices, e.g., any of the second network node 112, the third network node 113, and any of the nodes comprised in any of the first group of network nodes 120, the second group of network nodes 130 and the third group of network nodes 140, the wireless device 160, the host computer 2110, or any of the other nodes. The interface may, for example, include a transceiver configured to transmit and receive radio signals over an air interface in accordance with a suitable standard.

In other embodiments, the first network node 111 may comprise the following arrangement depicted in FIG. 11b. The first network node 111 may comprise a processing circuitry 1103, e.g., one or more processors such as the processor 1103, in the first network node 111 and the memory 1104. The first network node 111 may also comprise a radio circuitry 1109, which may comprise e.g., the receiving port 1105 and the sending port 1106. The processing circuitry 1109 may be configured to, or operable to, perform the method actions according to FIG. 5, FIGS. 8-10, FIG. 14, FIG. 17 and/or FIGS. 21-25 in a similar manner as that described in relation to FIG. 11a. The radio circuitry 1109 may be configured to set up and maintain at least a wireless connection with the second network node 112, the third network node 113, and/or the wireless device 160. Circuitry may be understood herein as a hardware component.

Hence, embodiments herein also relate to the first network node 111 comprising the processing circuitry 1103 and the memory 1104, said memory 1104 containing instructions executable by said processing circuitry 1103, whereby the first network node 111 is operative to perform the actions described herein in relation to the first network node 111, e.g., in FIG. 5, FIGS. 8-10, FIG. 14, FIG. 17 and/or FIGS. 21-25.

Figure 12:
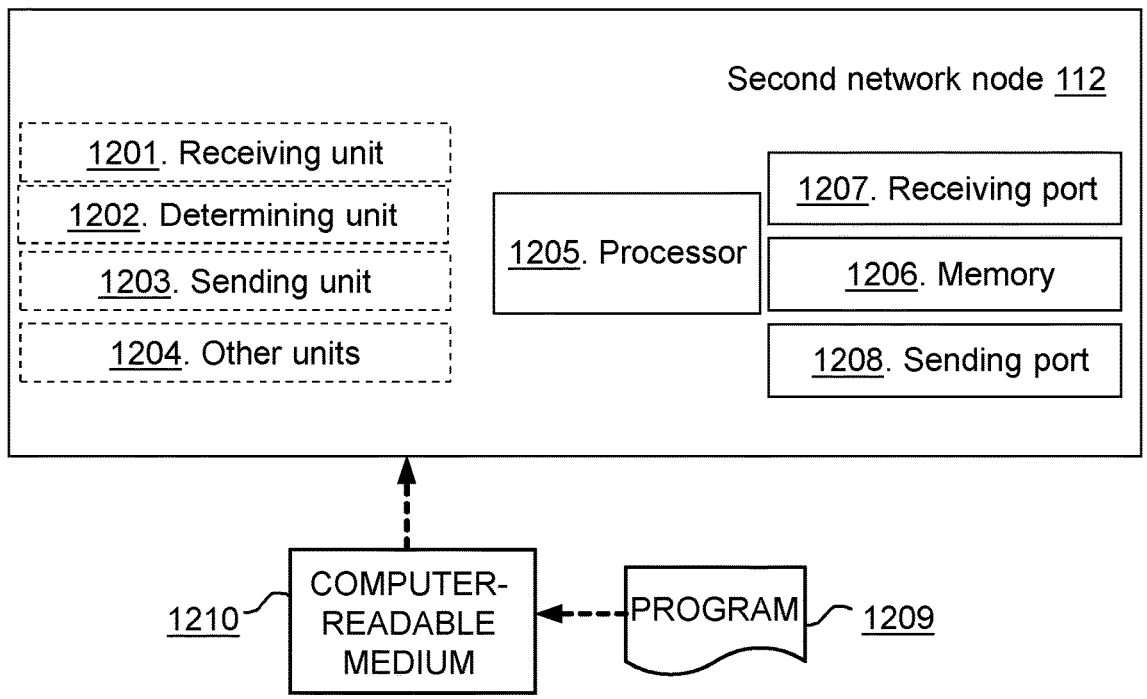
FIG. 12 is a schematic block diagram illustrating embodiments of a second network node, according to embodiments herein.
Figure 12:
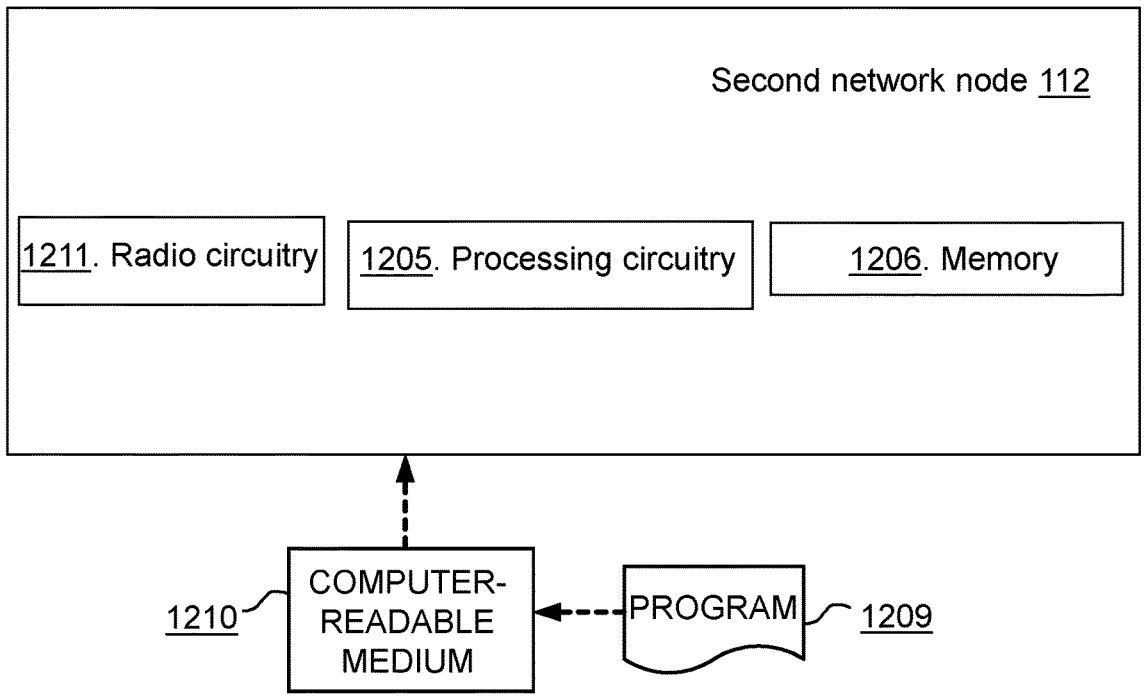

FIG. 12 depicts two different examples in panels a) and b), respectively, of the arrangement that the second network node 112 may comprise to perform the method actions described above in relation to FIG. 6, FIGS. 8-10, FIG. 15, FIG. 18 and/or FIGS. 21-25. In some embodiments, the second network node 112 may comprise the following arrangement depicted in FIG. 12a. The second network node 112 may be understood to be for handling a measurement configuration. The second network node 112 is configured operate in the communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111, and will thus not be repeated here. For example, in some embodiments, the first field may be mapped to one of the following fields in different IEs, e.g., according to an example method 1, described earlier: 1) A "Neighbour Relation for given for the indicated Measurement Timing Configuration Index" field, as provided in Table 2 under the Section numbered "9.2.2.13 Neighbour Information NR", 2) A "Neighbour Relation for given for the indicated Measurement Timing Configuration Index" field, as provided in Table 3 under the Section numbered "9.2.2.14 Neighbour Information E-UTRA". In other examples, the first field may be mapped to the following fields in different IEs, e.g., according to an example method 2, described earlier: 1) A "CSI-RS neighbour list" as provided in Table 5, Table 6, Table 7, and Table 8.

In FIG. 12, optional units are indicated with dashed boxes.

The second network node 112 may be configured to perform the receiving of Action 604, e.g. by means of a receiving unit 1201 within the second network node 112, configured to receive an indication, that is, the third indication, from the first network node 111 configured to operate in the communications network 100. The second network node 112 is configured to manage the first network node 111. The, third, indication is configured to indicate a transmission status of one or more CSI-RS configurations of the first network node 111. The receiving unit 1201 may be a processor 1205 of the second network node 112, or an application running on such processor.

In some embodiments, the first network node 111 may be configured to manage the first cell 151, and the receiving of the, third, indication may be configured to comprise receiving the transmission status of the CSI-RS configurations of the first network node 111.

In some embodiments, the indication may be configured to be the third indication and the second network node 112 may be configured to perform the receiving of Action 601, e.g., by means of the receiving unit 1201 within the second network node 112, configured to, receive the first indication from the first network node 111. The first indication may be configured to indicate the one or more CSI-RS configurations of the first network node 111.

In some embodiments, the indication may be configured to be the third indication and the second network node 112 may be configured to perform the receiving of Action 602, e.g., by means of the receiving unit 1201, configured to, receive the second indication from the first network node 111. The second indication may be configured to indicate the first relation between the one or more CSI-RS configurations of the first network node 111 with network nodes configured to be comprised in the first group of network nodes 120 configured to operate in the communications network 100 comprising the third network node 113.

The second network node 112 may be configured to perform the determining or selecting of Action 603, e.g. by means of a determining unit 1202, configured to, determine, based on the received second indication, the second group of network nodes 130 configured to operate in the communications network 100, to which the second network node 112 is to transmit the one or more CSI-RS configurations of the first network node 111. The determining unit 1202 may be a processor 1205 of the second network node 112, or an application running on such processor.

The second network node 112 may be configured to perform the sending of Action 604, e.g., by means of a sending unit 1203 within the second network node 112, configured to perform this action, send, based on the second group of network nodes 130 configured to be determined, the fourth indication to the third network node 113. The fourth indication may be configured to indicate the one or more CSI-RS configurations of the first network node 111. The sending unit 1203 may be the processor 1205 of the second network node 112, or an application running on such processor.

The second network node 112 may be configured to perform the determining or selecting of Action 606, e.g. by means of the determining unit 1202, configured to perform this action determine the third group of network nodes 140 configured to operate in the communications network 100, to which the second network node 112 may have to transmit the transmission status of the one or more CSI-RS configurations of the first network node 111.

In some embodiments, at least one of: a. the determining of the third group of network nodes 140 may be configured to be based on the received second indication, b. the determining of the third group of network nodes 140 may be configured to be based on the neighbour relation configured to be identified by the second network node 112 based on at least one of: i. radio measurements configured to be reported by the wireless device 160 configured to operate in the communications network 100, and ii. another indication configured to be sent by the first network node 111, and c) the determining of the second group of network nodes 130 may be configured to be based on the neighbour relation configured to be identified by the second network node 112.

In some embodiments, the indication may be configured to be the third indication and the second network node 112 may be configured to perform the sending of Action 607, e.g., by means of the sending unit 1203 within the second network node 112, configured to send the fifth indication to the fourth network node 114 configured to be comprised in the third group of network nodes 140. The fifth indication may be configured to indicate the transmission status of the one or more CSI-RS configurations of the first network node 111.

In some embodiments, at least one of the following may be further configured to apply to the first relation between the one or more CSI-RS configurations of the first network node 111 with the network nodes comprised in the first group of network nodes 120: a. it may be configured to be based on the second relation between each CSI-RS of the first network node 111 and neighbouring NR cells 155 of the first network node 111; b. it may be configured to be based on the third relation between the group of CSI-RSs of the first network node 111 and the neighbouring NR cells 155 of the first network node 111; c. it may be configured to comprise the map between the one or more CSI-RS configurations of the first network node 111 and the network nodes configured to be comprised in the first group of network nodes 120; and d. it may be configured to comprise the list of one or more network nodes to which the one or more CSI-RS configurations of the first network node 111 may be configured to be applicable.

In some embodiments, at least one of the following may be configured to apply: a. the first network node 111 may be configured to operate on NR; b. the second network node 112 may be configured to operate on E-UTRA; c. the third network node 113 may be configured to operate on NR; d. the first network node 111 may be configured to be an SN; e. the second network node 112 may be configured to be a MN; and f. the third network node 113 may be configured to be another SN.

In some embodiments, the second indication may be configured to comprise the explicit neighbour relation for at least one of: a. the set of CSI-RS indexes of the first cell 151 configured to be managed by the first network node 111; and b. each of the CSI-RS indexes of the first cell 151 configured to be managed by the first network node 111.

In some embodiments, at least one of: the following may be configured to apply: a. the second indication may be configured to be comprised in the first field in the first information element, and b. the third indication may be configured to be comprised in the second field in the second information element.

Other units 1204 may be comprised in the second network node 112.

The embodiments herein in the second network node 112 may be implemented through one or more processors, such as a processor 1205 in the second network node 112 depicted in FIG. 12*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1206 comprising one or more memory units. The memory 1206 is arranged to be used to store obtained information, store data, configurations, schedulings, and applications etc. to perform the methods herein when being executed in the second network node 112.

In some embodiments, the second network node 112 may receive information from, e.g., any of the first network node 111, the third network node 113, and any of the nodes comprised in any of the first group of network nodes 120, the second group of network nodes 130 and the third group of network nodes 140, the wireless device 160, the host computer 2110, or any of the other nodes, through a receiving port 1207. In some embodiments, the receiving port 1207 may be, for example, connected to one or more antennas in second network node 112. In other embodiments, the second network node 112 may receive information from another structure in the communications network 100 through the receiving port 1207. Since the receiving port 1207 may be in communication with the processor 1205, the receiving port 1207 may then send the received information to the processor 1205. The receiving port 1207 may also be configured to receive other information.

The processor 1205 in the second network node 112 may be further configured to transmit or send information to e.g., any of the first network node 111, the third network node 113, and any of the nodes comprised in any of the first group of network nodes 120, the second group of network nodes 130 and the third group of network nodes 140, the wireless device 160, the host computer 2110, or any of the other nodes, through a sending port 1208, which may be in communication with the processor 1205, and the memory 1206.

Those skilled in the art will also appreciate that the different units 1201-1204 described above may refer to a combination of analog and digital modules, and/or one or more processors configured with software and/or firmware, e.g., stored in memory, that, when executed by the one or more processors such as the processor 1205, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1201-1204 described above may be implemented as one or more applications running on one or more processors such as the processor 1205.

Thus, the methods according to the embodiments described herein for the second network node 112 may be respectively implemented by means of a computer program 1209 product, comprising instructions, i.e., software code portions, which, when executed on at least one processor 1205, cause the at least one processor 1205 to carry out the actions described herein, as performed by the second network node 112. The computer program 1209 product may be stored on a computer-readable storage medium 1210. The computer-readable storage medium 1210, having stored thereon the computer program 1209, may comprise instructions which, when executed on at least one processor 1205, cause the at least one processor 1205 to carry out the actions described herein, as performed by the second network node 112. In some embodiments, the computer-readable storage medium 1210 may be a non-transitory computer-readable storage medium, such as a CD ROM disc, or a memory stick. In other embodiments, the computer program 1209 product may be stored on a carrier containing the computer program 1209 just described, wherein the carrier is one of an electronic signal, optical signal, radio signal, or the computer-readable storage medium 1210, as described above.

The second network node 112 may comprise a communication interface configured to facilitate communications between the second network node 112 and other nodes or devices, e.g., any of the first network node 111, the third network node 113, and any of the nodes comprised in any of the first group of network nodes 120, the second group of network nodes 130 and the third group of network nodes 140, the wireless device 160, the host computer 2110, or any of the other nodes. The interface may, for example, include a transceiver configured to transmit and receive radio signals over an air interface in accordance with a suitable standard.

In other embodiments, the second network node 112 may comprise the following arrangement depicted in FIG. 12b. The second network node 112 may comprise a processing circuitry 1205, e.g., one or more processors such as the processor 1205, in the second network node 112 and the memory 1206. The second network node 112 may also comprise a radio circuitry 1211, which may comprise e.g., the receiving port 1207 and the sending port 1208. The processing circuitry 1205 may be configured to, or operable to, perform the method actions according to FIG. 6, FIGS. 8-10, FIG. 15, FIG. 18 and/or FIGS. 21-25 in a similar manner as that described in relation to FIG. 12a. The radio circuitry 1211 may be configured to set up and maintain at least a wireless connection with any of the first network node 111, the third network node 113, and any of the nodes comprised in any of the first group of network nodes 120, the second group of network nodes 130 and the third group of network nodes 140, the wireless device 160, the host computer 2110, or any of the other nodes. Circuitry may be understood herein as a hardware component.

Hence, embodiments herein also relate to the second network node 112 comprising the processing circuitry 1205 and the memory 1206, said memory 1206 containing instructions executable by said processing circuitry 1205, whereby the second network node 112 is operative to perform the actions described herein in relation to the second network node 112, e.g., in FIG. 6, FIGS. 8-10, FIG. 15, FIG. 18 and/or FIGS. 21-25.

Figure 13:
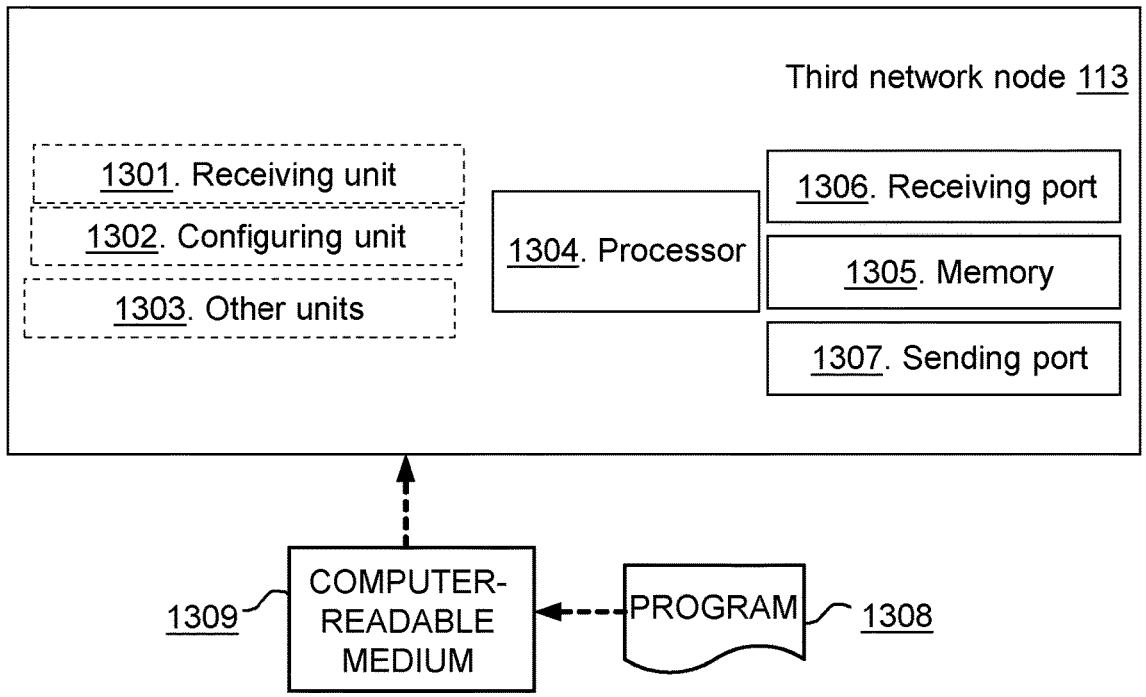
FIG. 13 is a schematic block diagram illustrating embodiments of a third network node, according to embodiments herein.
Figure 13:
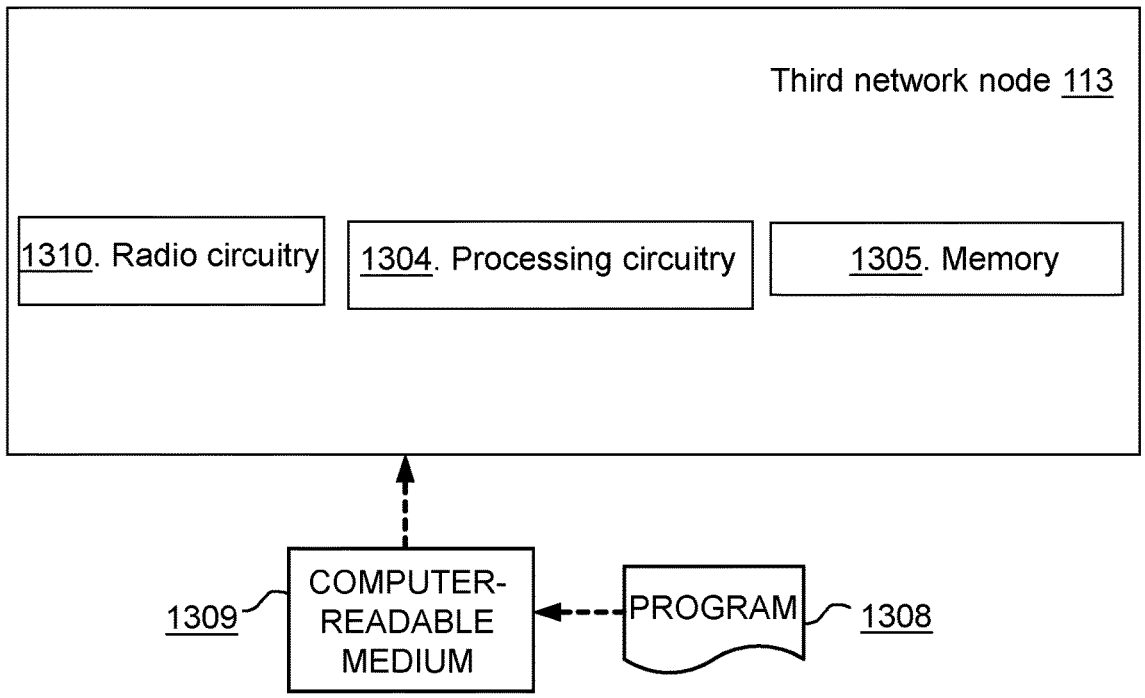

FIG. 13 depicts two different examples in panels a) and b), respectively, of the arrangement that the third network node 113 may comprise to perform the method actions described above in relation to FIG. 7, FIGS. 8-10, FIG. 16, FIG. 19 and/or FIGS. 21-25. In some embodiments, the third network node 113 may comprise the following arrangement depicted in FIG. 13a. The third network node 113 may be understood to be for handling a measurement configuration. The third network node 113 is configured operate in the communications network 100. The third network node 113 is configured to be comprised in the first group of network nodes 120. The first group of network nodes 120 are configured to be neighbours to the first network node 111 configured to operate in the communications network 100

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111, and will thus not be repeated here. For example, in some embodiments, the first field may be mapped to one of the following fields in different IEs, e.g., according to an example method 1, described earlier: 1) A "Neighbour Relation for given for the indicated Measurement Timing Configuration Index" field, as provided in Table 2 under the Section numbered "9.2.2.13 Neighbour Information NR", 2) A "Neighbour Relation for given for the indicated Measurement Timing Configuration Index" field, as provided in Table 3 under the Section numbered "9.2.2.14 Neighbour Information E-UTRA". In other examples, the first field may be mapped to the following fields in different IEs, e.g., according to an example method 2, described earlier: 1) A "CSI-RS neighbour list" as provided in Table 5, Table 6, Table 7, and Table 8.

In FIG. 13, optional units are indicated with dashed boxes.

The third network node 113 is configured to perform the receiving of Action 702, e.g. by means of a receiving unit 1301 within the third network node 113, configured to receive an indication, the fifth indication, from the second network node 112 configured to operate in the communications network 100. The third network node 113 is configured to be managed by the second network node 112. The indication is configured to indicate the transmission status of the one or more CSI-RS configurations of the first network node 111. The receiving unit 1301 may be a processor 1304 of the third network node 113, or an application running on such processor.

The third network node 113 is also configured to perform the configuring of Action 704, e.g. by means of a configuring unit 1302, configured to configure the wireless device 160 based on the, fifth, indication configured to be received. The configuring unit 1302 may be a processor 1304 of the third network node 113, or an application running on such processor.

In some embodiments, the indication may be configured to be the fifth indication, and the third network node 113 may be configured to perform the receiving of Action 701, e.g., by means of the receiving unit 1301, configured to receive the fourth indication from the second network node 112. The fourth indication may be configured to indicate the one or more CSI-RS configurations of the first network node 111.

In some embodiments, the indication may be configured to be the fifth indication, and the third network node 113 may be configured to perform the configuring of Action 703, e.g. by means of the configuring unit 1302, configured to configure the wireless device 160 configured to operate in the communications network 100 based on the fourth indication configured to be received.

In some embodiments, the receiving of the fourth indication may be configured to be based on at least one of: a. the relation between the one or more CSI-RS configurations of the first network node 111 and the third network node 113, b. the second relation between each CSI-RS of the first network node 111 and a third New Radio, NR, cell 153 of the third network node 113; and c) the third relation between a group of CSI-RSs of the first network node 111 and the third NR cell 153 of the third network node 113.

In some embodiments, at least one of the following may be configured to apply: a. the first network node 111 may be configured to operate on NR; b. the second network node 112 may be configured to operate on E-UTRA; c. the third network node 113 may be configured to operate on NR; d. the first network node 111 may be configured to be an SN; e. the second network node 112 may be configured to be a MN; and f. the third network node 113 may be configured to be another SN.

In some embodiments, the indication may be configured to be the fifth indication, and the fifth indication may be configured to be comprised in the second field in the second information element.

Other units 1204 may be comprised in the third network node 113.

The embodiments herein in the third network node 113 may be implemented through one or more processors, such as a processor 1304 in the third network node 113 depicted in FIG. 13a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the third network node 113. One such carrier may be in the form of a CD ROM disc. It is however feasible with other data carriers such as a memory stick. The computer program code may furthermore be provided as pure program code on a server and downloaded to the third network node 113.

The third network node 113 may further comprise a memory 1305 comprising one or more memory units. The memory 1305 is arranged to be used to store obtained information, store data, configurations, schedulings, and applications etc. to perform the methods herein when being executed in the third network node 113.

In some embodiments, the third network node 113 may receive information from, e.g., any of the first network node 111, the second network node 112, and any of the nodes comprised in any of the first group of network nodes 120, the second group of network nodes 130 and the third group of network nodes 140, the wireless device 160, the host computer 2110, or any of the other nodes, through a receiving port 1306. In some embodiments, the receiving port 1306 may be, for example, connected to one or more antennas in third network node 113. In other embodiments, the third network node 113 may receive information from another structure in the communications network 100 through the receiving port 1306. Since the receiving port 1306 may be in communication with the processor 1304, the receiving port 1306 may then send the received information to the processor 1304. The receiving port 1306 may also be configured to receive other information.

The processor 1304 in the third network node 113 may be further configured to transmit or send information to e.g., any of the first network node 111, the second network node 112, and any of the nodes comprised in any of the first group of network nodes 120, the second group of network nodes 130 and the third group of network nodes 140, the wireless device 160, the host computer 2110, or any of the other nodes, through a sending port 1307, which may be in communication with the processor 1304, and the memory 1305.

Those skilled in the art will also appreciate that the different units 1301-1303 described above may refer to a combination of analog and digital modules, and/or one or more processors configured with software and/or firmware, e.g., stored in memory, that, when executed by the one or more processors such as the processor 1304, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1301-1303 described above may be implemented as one or more applications running on one or more processors such as the processor 1304.

Thus, the methods according to the embodiments described herein for the third network node 113 may be respectively implemented by means of a computer program 1308 product, comprising instructions, i.e., software code portions, which, when executed on at least one processor 1304, cause the at least one processor 1304 to carry out the actions described herein, as performed by the third network node 113. The computer program 1308 product may be stored on a computer-readable storage medium 1309. The computer-readable storage medium 1309, having stored thereon the computer program 1308, may comprise instructions which, when executed on at least one processor 1304, cause the at least one processor 1304 to carry out the actions described herein, as performed by the third network node 113. In some embodiments, the computer-readable storage medium 1309 may be a non-transitory computer-readable storage medium, such as a CD ROM disc, or a memory stick. In other embodiments, the computer program 1308 product may be stored on a carrier containing the computer program 1308 just described, wherein the carrier is one of an electronic signal, optical signal, radio signal, or the computer-readable storage medium 1309, as described above.

The third network node 113 may comprise a communication interface configured to facilitate communications between the third network node 113 and other nodes or devices, e.g., any of the first network node 111, the second network node 112, and any of the nodes comprised in any of the first group of network nodes 120, the second group of network nodes 130 and the third group of network nodes 140, the wireless device 160, the host computer 2110, or any of the other nodes. The interface may, for example, include a transceiver configured to transmit and receive radio signals over an air interface in accordance with a suitable standard.

In other embodiments, the third network node 113 may comprise the following arrangement depicted in FIG. 13b. The third network node 113 may comprise a processing circuitry 1304, e.g., one or more processors such as the processor 1304, in the third network node 113 and the memory 1305. The third network node 113 may also comprise a radio circuitry 1310, which may comprise e.g., the receiving port 1306 and the sending port 1307. The processing circuitry 1304 may be configured to, or operable to, perform the method actions according to FIG. 7, FIGS. 8-10, FIG. 16, FIG. 19 and/or FIGS. 21-25, in a similar manner as that described in relation to FIG. 13a. The radio circuitry 1310 may be configured to set up and maintain at least a wireless connection with any of the first network node 111, the second network node 112, and any of the nodes comprised in any of the first group of network nodes 120, the second group of network nodes 130 and the third group of network nodes 140, the wireless device 160, the host computer 2110, or any of the other nodes. Circuitry may be understood herein as a hardware component.

Hence, embodiments herein also relate to the third network node 113 comprising the processing circuitry 1304 and the memory 1305, said memory 1305 containing instructions executable by said processing circuitry 1304, whereby the third network node 113 is operative to perform the actions described herein in relation to the third network node 113, e.g., in FIG. 7, FIGS. 8-10, FIG. 19 and/or FIGS. 21-25.

EXAMPLES

Some embodiments herein will now be further described with some non-limiting examples.

In the following description, action 1401 may be understood to correspond to Action 501, action 1402 may be understood to correspond to Action 502, action 1403 may be understood to correspond to Action 503, action 1501 may be understood to correspond to Action 601, action 1502 may be understood to correspond to Action 602, action 1503 may be understood to correspond to Action 603, action 1504 may be understood to correspond to Action 604, action 1505 may be understood to correspond to Action 605, action 1506 may be understood to correspond to Action 606, action 1507 may be understood to correspond to Action 607, action 1601 may be understood to correspond to Action 701, action 1602 may be understood to correspond to Action 702, action 1603 may be understood to correspond to Action 703 and/or Action 704.

General Description of Examples

A general description of examples of embodiments herein may be summarized as follows.

The scenario taken as reference for examples herein is one where CSI-RS based mobility may be performed. Namely, a RAN node serving the wireless device 160, e.g., UE, may configure the wireless device 160 to perform CSI-RS measurements on specific CSI-RS signals of target cells. One of the examples where such type of mobility may be of relevance is the SN initiated SN change, where an SN node may configure a UE such as the wireless device 160, to monitor and report measurements on a CSI RS signals of a neighbour cell and where, if a suitable target CSI-RS is reported by the UE, the source SN, such as the first network node 111, may signal to the MN node, such as the second network node 112, that an SN change towards the target CSI-RS at target SN may be needed.

In another example of embodiments herein, the mobility events may consist of a change of the primary cell from one serving node to another serving node. In this case, the UE may also be configured with a measurement configuration to monitor and report specific CSI-RSs from a given one or more neighbour cells. In these examples, the methods may propose to signal between the source and target node information about the CSI-RS signals used by each served cell and to signal the neighbour relations of such signals with CSI-RS coverage areas of other neighbour cells. The latter may facilitate CSI-RS measurement configurations by the source RAN node.

In order to support the SN initiated SN change between the two NR cells, a RAN node, such as the second network node 112, acting as MN and connected to the SNs, each serving one of the two NR cells, may aid the forwarding, according to Action 501, of CSI-RS configurations of the first NR cell in the first SN, such as the first network node 111, to a second NR cell in the second SN, such as the third network node 113. The RAN node acting as MN may reduce the amount of X2/Xn communication required to forward the CSI-RS configurations of the first NR cell by using one of the following methods.

Assuming that the MN is RAN Node 2, that the SN of which CSI-RS configurations want to be forwarded is RAN node 1, while the cell hosting the CSI-RS is Cell1, and that the SN to which the CSI-RS configuration wants to be signaled in RAN node 3, the following may be described. RAN node 2 may forward the CSI-RS configurations of Cell 1 in RAN node 1 to only the neighbouring NR cells of RAN node 2.

a. According to a first group of examples, the identification of the neighbouring NR cells of Cell 1 may be performed by the MN RAN node 2 via available neighbour cells list, e.g., such as the Neighbour Information NR/NR Neighbour Information in TS 38.423, v. 16.0.0/TS 36.423, v. 16.0.0, provided at the Xn/X2 setup between the first NR cell and the LTE cell. This may enable the first NR cell to setup or update other NR cell relations, that is, to send the CSI-RS configuration of the first NR cell to its neighbour NR cells.

b. According to a second group of examples, the identification of the neighbouring NR cells of Cell 1 cell may be performed by RAN node 1 via signaling to RAN node 2 an explicit neighbour relation information provided for a set of the CSI-RS indexes of Cell 1. This may enable the creation of a neighbour relation between CSI-RS beam in Cell 1 to the neighbouring cells, that is, the CSI-RS beam of Cell 1 to neighbour NR cells.

c. According to a third group of examples, the identification of the neighbouring NR cells of Cell 1 as well as the identification of CSI-RS coverage areas of the neighbour cells, which may be neighbouring Cell 1, may be performed by RAN node 1 via the explicit neighbour relations provided for each of the CSI-RS indexes of Cell 1. This may enable each CSI-RS beam of Cell 1 to be linked to a neighbour CSI-RS area in a neighbour cell.

d. According to a fourth group of examples, the identification of the neighbouring NR cells of Cell 1 may be performed by RAN node 1 via a combination of the methods described in 1b and 1c above.

e. According to a fifth group of examples, the identifications of which of the CSI-RS indexes may be part of the currently active CSI-RS configuration and which of the neighbour relations, CSI-RS and/or Cell related, may be currently applicable, may be performed either by indicating per CSI-RS whether it is active or by referencing to a measurement timing configuration which may contain configuration information of the current active beams.

In all the above methods 1a,1b,1c,1d, embodiments herein may be understood to be associated to the following two aspects. According to a first aspect, the knowledge of the serving RAN node configuring the UE to measure neighbouring CSI-RSs of current serving CSI-RSs, or, in case of an inter-RAT neighbour relation, the current serving E-UTRA cell, in order to succeed in performing mobility towards a target CSI-RS. According to a second aspect, the 'selection' of NR neighbour cells by the RAN node 2 so that it may forward the changes of the CSI-RS configurations of Cell 1 to only relevant neighbouring NR cells in RAN node 3.

The above-mentioned CSI-RS configurations may include the details of CSI-RS configurations as captured in Measurement TimingConfiguration IE of 38.331, the transmission status of these CSI-RSs i.e., whether these CSI-RSs may be ON or OFF and also the duration for which this transmission status may be applicable.

Detailed Examples of the Second Group of Examples and the Third Group of Examples In these groups of examples, the first network node 111 may be the SN cell, e.g., an NR cell, the second network node may be the MN cell, e.g., an EUTRA cell acting as the MN, and the third network node 113 may be another candidate SN cell, e.g., a neighbour NR cell which may be a SN cell to a UE such as the wireless device 160.

Figure 14:
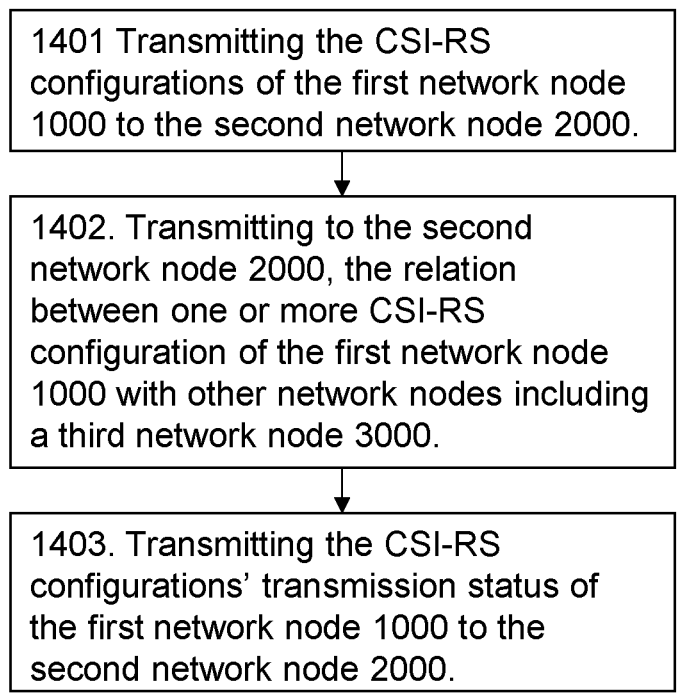
FIG. 14 is a flowchart depicting an example of a method in a first network node, according to embodiments herein.

A method, depicted in FIG. 14, performed by a first network node 1000 for enabling CSI-RS based measurements in inter-node connected mode mobility wherein the first network node 1000 may be:
 transmitting 1401 to a second network node 2000 regarding the CSI-RS configurations of the first network node 1000.
 transmitting 1402 to the second network node 2000 regarding the relation between one or more CSI-RS configuration of the first network node 1000 with other network nodes including a third network node 3000. This may be an optional action.
 transmitting 1403 to the second network node 2000 regarding the transmission status of the CSI-RS configurations of the first network node 1000.

Figure 15:
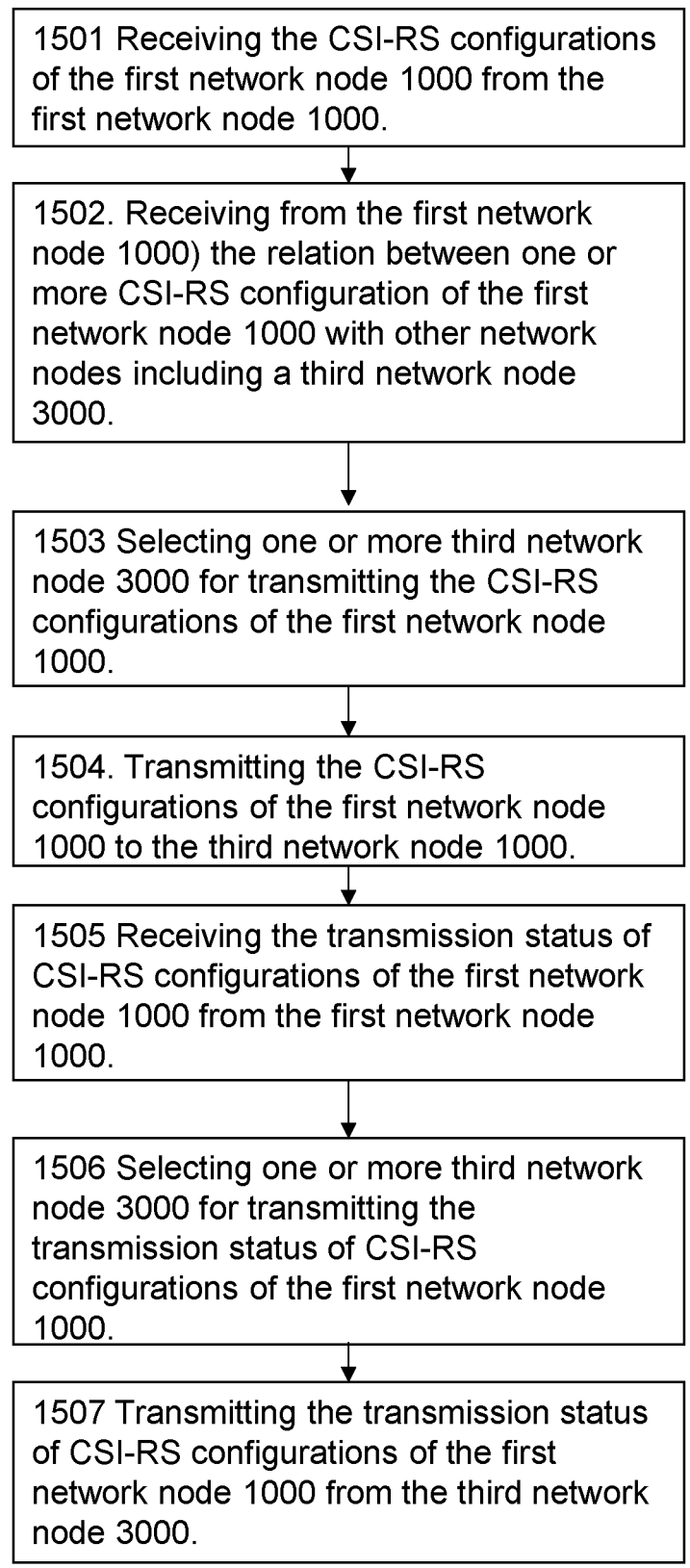
FIG. 15 is a flowchart depicting an example of a method in a second network node, according to embodiments herein.

A method, depicted in FIG. 15, performed by a second network node 2000 for enabling CSI-RS based measurements in connected mode mobility wherein the second network node 2000 may be:
 receiving 1501 the CSI-RS configurations of the first network node 1000 from the first network node 1000.
 receiving 1502 the relation between one or more CSI-RS configuration of the first network node 1000 with the other network nodes.
 selecting 1503 one or more third network nodes 3000 for transmitting the CSI-RS configurations of the first network node 1000.
 transmitting 1504 to a third network node 3000 regarding the CSI-RS configuration of the first network node 1000.
 receiving 1505 the CSI-RS configurations' transmission status of the first network node 1000 from the first network node 1000.
 selecting 1506 one or more third network nodes 3000 for transmitting the transmission status of CSI-RS configurations of the first network node 1000.
 transmitting 1507 to the third network node 3000 regarding the CSI-RS configurations' transmission status of the first network node 1000.

Figure 16:
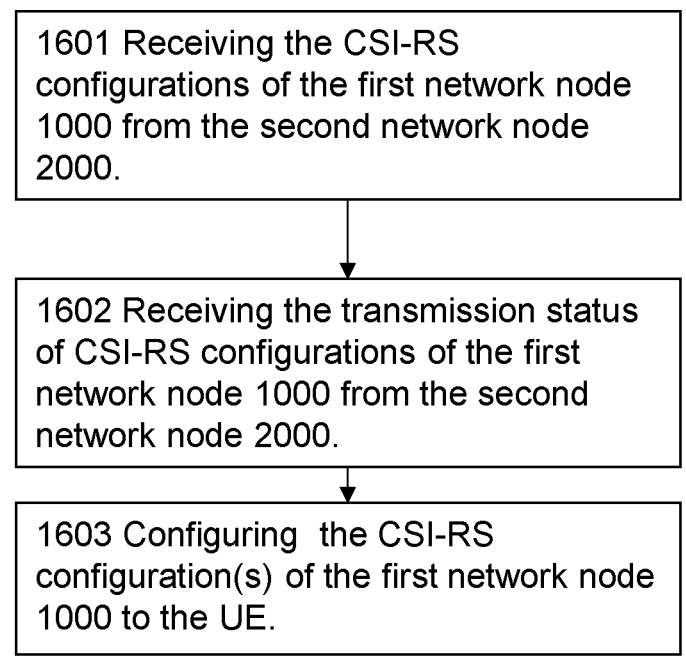
FIG. 16 is a flowchart depicting am example of a method in a third network node, according to embodiments herein.

A method, depicted in FIG. 16, in performed by the third network node 3000 for enabling CSI-RS based measurements in connected mode mobility wherein the third network node 300 is:
 receiving 1601 the CSI-RS configurations of the first network node 1000 from the second network node 200.
 receiving 1602 the CSI-RS configurations' transmission status of the first network node 1000 from the second network node 200.
 Configuring 1603 the UE with the relevant CSI-RS configuration of the first network node 1000.

Detailed Examples Regarding Whether these 'Transmitting (1401,1402,1403)' are Sent Together or not In some examples, the first network node 1000 may be a gNB and the second network node 2000 may be eNB and the third network node 3000 may be a gNB.

In some examples, the transmitting 1401 and the transmitting 1402 may be sent together at the same time from the first network node 1000 to the second network node 2000 in the inter-node message.

In some examples, the transmitting 1401 and the transmitting 1402 may be sent at different times from the first network node 1000 to the second network node 200 in inter-node message.

In some examples, the transmitting 102 and the transmitting 103 may be sent together at the same time from the first network node 1000 to the second network node 2000 in the inter-node message.

In some other examples, the transmitting 1402 and the transmitting 1403 may be sent at different times from the first network node 1000 to the second network node 2000 in the inter-node message.

In some examples, the transmitting 1401, the transmitting 1402 and the transmitting 1403 may be sent together at the same time from the first network node 1000 to the second network node 2000 in the inter-node message.

In some examples, the relation between one or more CSI-RS configuration of the first network node 1000 with other network nodes including the third network node 300 may be based on the relation between each CSI-RS of the first network node 1000 and the neighbouring NR cells. In some other examples, the relation between one or more CSI-RS configuration of the first network node 1000 with other network nodes including a third network node 3000 may be based on the relation between a group of CSI-RSs of the first network node 1000 and the neighbouring NR cells.

Detailed Examples Regarding the Timing of Transmitting 1504 and 1506

In some examples, the transmitting 1504, may be performed immediately upon receiving 1501 the CSI-RS configurations from the first network node 1000.

In some examples, the transmitting 1504, may be performed upon a specific request from the third network node 3000 regarding the CSI-RS configurations of the neighbouring nodes.

In some other examples, the transmitting 1506, may be performed immediately upon receiving 1505 the CSI-RS configurations from the first network node 1000.

In some other examples, the transmitting 1506, may be performed upon a specific request from the third network node 3000 regarding the CSI-RS transmission status of neighbouring nodes.

In some other examples, the transmitting 1506, may be performed periodically with certain periodicity.

In some examples, the contents of the transmitting 1504, 1506 may include only a subset of the CSI-RSs that may be sent by the first network node 1000. This sub-selection may be performed so that only those CSI-RSs of the first network node that may be impacting the associated NR neighbour cells may be selected.

Detailed Examples Related to the 'Relation' Included in 1402

In some examples, the said relation may include the mapping associated to each individual CSI-RS configuration with one or more neighbouring network nodes.

In some examples, the said relation may include the list of one or more neighbouring network nodes that may be applicable to all the CSI-RS configurations of the first node 1000.

Detailed Examples Related to the 'Selecting' Included in 1503, 1506

In some examples, the selecting 1503, 1506 may be based on the received 1502 relation between one or more CSI-RS configurations of the first network node 1000 with other network nodes including the third network node 3000.

In some examples, the selecting 1503, 1506 may be based on the specific request received from one or more network nodes including the third network node 3000.

In some examples, the selecting 1503, 1506 may be based on the first and third network node related neighbour relation identification based on RRM measurements obtained by the second network node from one or more UEs.

Detailed Examples Related to the 'Transmission Status of CSI-RS Configurations' Included in 1403

In some examples, the first network node 1000 may include the transmission status of all the CSI-RS configurations that may have been included in 1401.

In some other examples, the first network node 1000 may include the transmission status of only those CSI-RS configurations that may have changed their status compared to a previous update of the transmission status.

In some other examples, both of the above examples may be included.

Detailed Examples of 1a

In this example, the first network node 1000 may be or manage the SN cell, e.g., an NR cell, the second network node 2000 may be or manage the MN cell, e.g., an EUTRA cell acting as the MN, and the third network node 3000 may be another candidate SN cell, e.g., a neighbour NR cell that may be acting as an SN.

A method performed by the first network node 1000 for enabling CSI-RS based measurements in inter-node connected mode mobility wherein the first network node 1000 may be:

transmitting, e.g., as in Action 501, to a second network node 2000 regarding the CSI-RS configurations of the first network node 1000, transmitting, e.g., as in Action 503, to a second network node 2000 regarding the transmission status of the CSI-RS configurations of the first network node 1000.

A method in a second network node 2000 for enabling CSI-RS based measurements in connected mode mobility wherein the second network node 2000 may be:

receiving, e.g., as in Action 601, the CSI-RS configurations of the first network node 1000 from the first network node 1000.

selecting, e.g., as in Action 603, one or more third network nodes 3000 for transmitting the CSI-RS configurations of the first network node 1000.

transmitting, e.g., as in Action 604, to a third network node 3000 regarding the CSI-RS configuration of the first network node 1000.

receiving, e.g., as in Action 605, the CSI-RS configurations' transmission status of the first network node 1000 from the first network node 1000.

selecting, e.g., as in Action 606, one or more third network nodes 3000 for transmitting the transmission status of CSI-RS configurations of the first network node 1000.

transmitting, e.g., as in Action 607, to a third network node 3000 regarding the CSI-RS configurations' transmission status of the first network node 1000.

A method performed by a third network node 3000 for enabling CSI-RS based measurements in connected mode mobility wherein the third network node 3000 is:

receiving, e.g., as in Action 701, the CSI-RS configurations of the first network node 1000 from the second network node 2000.

receiving, e.g., as in Action 702, the CSI-RS configurations' transmission status of the first network node 1000 from the second network node 2000.

Configuring, e.g., as in Actions 703 and/or 704, the UE with the relevant CSI-RS configuration of the first network node 1000.

In this example, the selecting may be based on the available information at the LTE cell;

1) In some examples, the LTE cell may forward the CSI-RS configuration to all the neighbouring NR cells that may be part of the Neighbour Information NR in Xn setup/configuration update message shared by the first NR cell.

2) In some other examples, the LTE cell may derive the neighbour relation of the first NR cell with other NR cells based on the radio measurements reported by the UE to the LTE cell.

3) In yet other examples, the LTE cell may derive the neighbour relation of the first NR cell based on the combination of the above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Examples Related to Embodiments Herein

The following may be understood as examples related to embodiments herein.

The first network node 111 embodiments relate to FIG. 17, FIGS. 8-10, FIG. 11, FIG. 14 and FIGS. 20-25.

A method, performed by a first network node, such as the first network node 111 is described herein. The method may be understood to be for handling a measurement configuration. The first network node 111 may be operating in the communications network 100.

The method may comprise one or more of the following actions.

In some embodiments, all the actions may be performed. In other embodiments, one or more actions may be performed. One or more embodiments may be combined, where applicable. All possible combinations are not described to simplify the description. A non-limiting example of the method performed by the first network node 111 is depicted in FIG. 17.

Sending 502 an indication. The first network node 111 may be configured to perform this sending action 502, e.g. by means of a sending unit 1101 within the first network node 111, configured to perform this action. The sending unit 1101 may be a processor 1103 of the first network node 111, or an application running on such processor.

The sending in this Action 502 may be performed, e.g., via the first link 171.

The first network node 111 may send the indication to the second network node 112 operating in the communications network 100.

The first network node 111 may be managed by the second network node 112. The indication may indicate a relation between one or more Channel State Information-Reference Signal (CSI-RS) configurations of the first network node 111 with network nodes comprised in the first group of network nodes 120 operating in the communications network 100 comprising the third network node 113.

In some embodiments, the indication may be, or may be referred to herein as a second indication.

The network nodes in the first group of network nodes 120 may be neighbour nodes to the first network node 111.

In some examples, the second indication may be mapped to, that is, comprised in, a first field in an Information Element (IE), e.g., a first IE.

The first field may be mapped to one of the following fields in different IEs, e.g., according to the example method 1, which will be described later:
1) A "Neighbour Relation for given for the indicated Measurement Timing Configuration Index" field, as provided in Table 2p under the Section numbered "9.2.2.13 Neighbour Information NR". This may be understood to be specific to NR neighbour cells. This field may provide an indication as to which neighbour cells, amongst all the one that may be listed as neighbour cells in the previous similar Xn messages, are still the neighbours based on the currently activated CSI-RS configuration.
2) A "Neighbour Relation for given for the indicated Measurement Timing Configuration Index" field, as provided in Table 3p under the Section numbered "9.2.2.14 Neighbour Information E-UTRA", This may be understood to be specific to LTE neighbour cells.

The first field may be mapped to the following fields in different IEs, e.g., according to the example method 2, which will be described later:
1) A "CSI-RS neighbour list" as provided in Table 5p, Table 6p, Table 7p, and Table 8p.

However, it may be noted that the examples provided in the data structures are just examples. There may be other ways of providing the second indication in the data structure.

In some embodiments, e.g., wherein the indication is a second indication, the method may provide one or more of the following actions:

Sending 501 a first indication. The first network node 111 may be configured to perform this sending action 501, e.g. by means of the sending unit 1101, configured to perform this action.

The first network node 111 may send the first indication to the second network node 112.

The sending in this Action 501 may be performed, e.g., via the first link 171.

The first indication may indicate the one or more CSI-RS configurations of the first network node 111.

The first indication may map to, that is, be comprised in another field, which may be referred to herein as a third field, in another IE, which may be referred to herein as a third IE.

Sending 503 a third indication. The first network node 111 may be configured to perform this sending action 503, e.g. by means of the sending unit 1101, configured to perform this action.

The first network node 111 may send the third indication to the second network node 112.

The sending in this Action 503 may be performed, e.g., via the first link 171.

The third indication may indicate a transmission status of the one or more CSI-RS configurations of the first network node 111.

In some examples, the third indication may be mapped to a second field in an Information Element (IE), e.g., a second IE.

The second field may be mapped to, that is, comprised in, one of the following fields in different IEs, e.g., according to the example method 1, which will be described later:
1) The combination of "Additional Measurement Timing Configuration Item" and "Active Measurement Timing Configuration Index" as provided in Table 1p wherein "Additional Measurement Timing Configuration Item" may provide different configurations mapped to different indexes and "Active Measurement Timing Configuration Index" may inform that a configuration associated to the said index is active.

2) The "Active Measurement Timing Configuration Index" is further detailed in Section 9.2.2.x provided under Table 4p (third paragraph under Table 4p).

3) The ">Measurement Timing Configuration Update Information NR" provided in Table 4p. The details of the field are provided in Section 9.2.2.y, above the last table of the Section entitled "XnAP Example method 1", Section 9.2.2.y provides a further reference to 9.2.2.x The second field may be mapped to, that is, comprised in, the following field in different IEs, e.g., according to the example method 2, which will be described later:

1) A "CSI-RS status" as provided in Table 5p, Table 6p, and Table 8p.

However, it may be noted that the examples provided in the data structures are just examples. There may be other ways of providing the third indication in the data structure.

In some embodiments, the relation may be a first relation and at least one of the following may apply to the first relation between the one or more CSI-RS configurations of the first network node 111 with the network nodes comprised in the first group of network nodes 120:

a. it may be based on a second relation between each CSI-RS of the first network node 111 and neighbouring New Radio (NR) cells 155 of the first network node 111;

b. it may be based on a third relation between a group of CSI-RSs of the first network node 111 and the neighbouring NR cells 155 of the first network node 111;

c. it may comprise a map between the one or more CSI-RS configurations of the first network node 111 and the network nodes comprised in the first group of network nodes 120; and d. it may comprise a list of one or more network nodes comprised in the first group of network nodes 120 to which the one or more CSI-RS configurations of the first network node 111 may be applicable.

In some embodiments, at least one of the following may apply:

a. the first network node 111 may operate on Fifth Generation 3GPP, 5G;

b. the second network node 112 may operate on Long Term Evolution, LTE;

c. the third network node 113 may operate on 5G 3GPP;

d. the first network node 111 may be a Secondary Node, SN;

e. the second network node 112 may be a Master Node, MN; and f. the third network node 113 may be another SN.

In some embodiments, the indication may be a second indication which comprises an explicit neighbour relation for at least one of:

a. a set of CSI-RS indexes of a first cell 151 managed by the first network node 111; and b. each of the CSI-RS indexes of the first cell 151 managed by the first network node 111.

In any of the above embodiments, the different sets of parameters may be due to the parameters originating in e.g., different core networks, different slices, different providers, etc. . . . using their own sets of parameters to identify a same feature, e.g., a same requirement, target or service.

The second network node 112 embodiments relate to FIG. 18, FIGS. 8-10, FIG. 12, FIG. 15, and FIGS. 20-25.

A method, performed by a second network node, such as the second network node 112 is described herein. The method may be understood to be for handling a measurement configuration. The second network node 112 may operate in the communications network 100.

The method may comprise one or more of the following actions.

Figure 18:
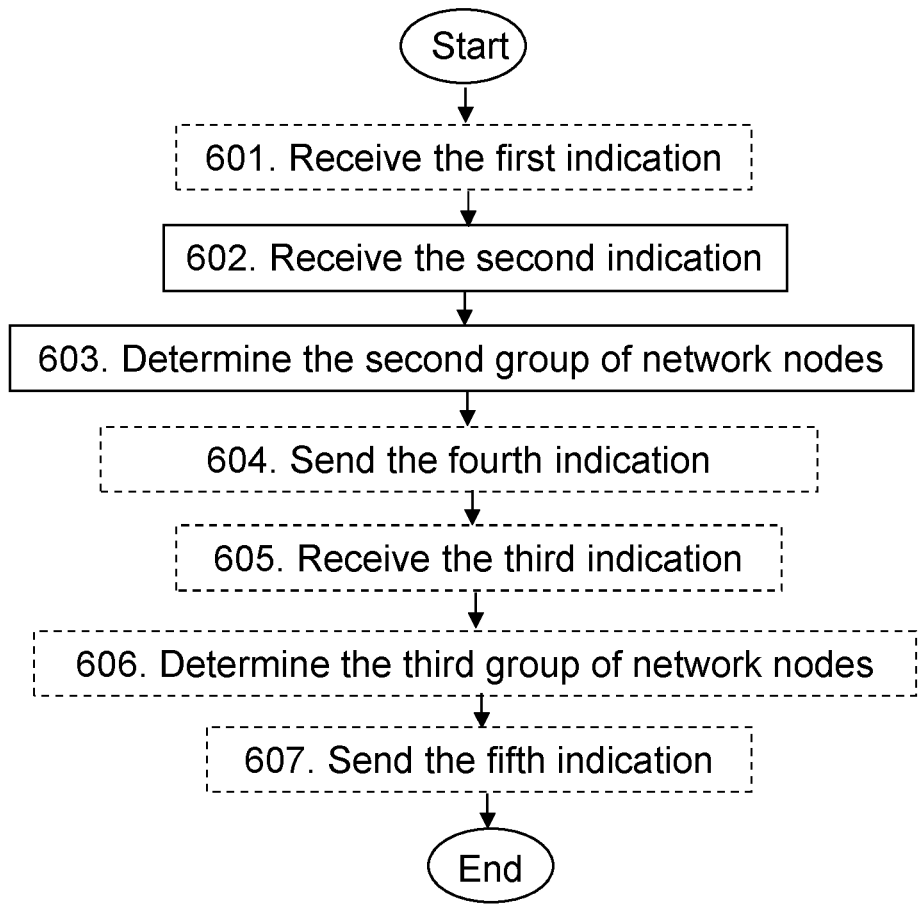
FIG. 18 is a flowchart depicting a method in a second network node, related to embodiments herein.
Figure 19:
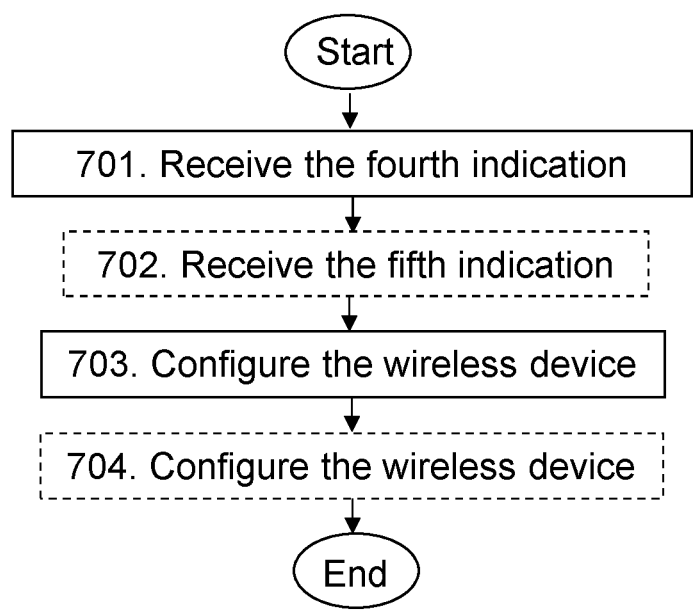
FIG. 19 is a flowchart depicting a method in a third network node, related to embodiments herein.

In some embodiments, all the actions may be performed. In other embodiments, one or more actions may be performed. One or more embodiments may be combined, where applicable. All possible combinations are not described to simplify the description. A non-limiting example of the method performed by the second network node 112 is depicted in FIG. 18. Some actions may be performed in a different order than that shown in FIG. 18. The detailed description of some of the following corresponds to the same references provided above, in relation to the actions described for the first node 111, and will thus not be repeated here. For example, the second indication may map to the first field, as described earlier, and/or the third indication may map to the second field, as described earlier.

Receiving 602 the indication. The second network node 112 may be configured to perform this receiving action 602, e.g. by means of a receiving unit 1201 within the second network node 112, configured to perform this action. The receiving unit 1201 may be a processor 1205 of the second network node 112, or an application running on such processor.

The second network node 112 may receive the indication from the first network node 111 operating in the communications network 100.

The receiving in this Action 602 may be performed, e.g., via the first link 171.

The second network node 112 may manage the first network node 111. The indication may indicate the first relation between the one or more Channel State Information-Reference Signal (CSI-RS) configurations of the first network node 111 with network nodes comprised in the first group of network nodes 120 operating in the communications network 100 comprising the third network node 113.

Determining/selecting 603 a second group of network nodes 130 operating in the communications network 100. The second network node 112 may be configured to perform this determining or selecting action 603, e.g. by means of a determining unit 1202, configured to perform this action. The determining unit 1202 may be a processor 1205 of the second network node 112, or an application running on such processor.

Determining may be understood as e.g., calculating, deriving, selecting, etc. . . . .

The second network node 112 may select the second group of network nodes 130 based on the received indication. The second group of network nodes 130 may be to which the second network node 112 is to transmit the one or more CSI-RS configurations of the first network node 111.

In some embodiments, the indication may be, or may be referred to herein as a second indication.

In some embodiments, e.g., wherein the indication is a second indication, the method may provide one or more of the following actions:

Receiving 601 the first indication. The second network node 112 may be configured to perform this receiving action 601, e.g., by means of a receiving unit 1201 within the second network node 112, configured to perform this action. The receiving unit 1201 may be the processor 1205 of the second network node 112, or an application running on such processor.

The second network node 112 may receive the first indication from the first network node 111.

The receiving in this Action 601 may be performed, e.g., via the first link 171.

The first indication may indicate the one or more CSI-RS configurations of the first network node 111.

Sending 604 a fourth indication. The second network node 112 may be configured to perform this sending action 604, e.g., by means of a sending unit 1203 within the second network node 112, configured to perform this action. The sending unit 1203 may be the processor 1205 of the second network node 112, or an application running on such processor.

The second network node 112 may send the fourth indication to the third network node 113.

The sending in this Action 604 may be performed, e.g., via the second link 172.

The second network node 112 may send the fourth indication to the third network node 113 based on the determined second group of network nodes 130. The fourth indication may indicate the one or more CSI-RS configurations of the first network node 111.

The fourth indication may map to, that is, be comprised in yet another field, which may be referred to herein as a fourth field, in another IE, which may be referred to herein as a fourth IE.

Receiving 605 the third indication. The second network node 112 may be configured to perform this receiving action 601, e.g., by means of the receiving unit 1201, configured to perform this action.

The second network node 112 may receive the third indication from the first network node 111.

The receiving in this Action 601 may be performed, e.g., via the first link 171.

The third indication may indicate the transmission status of the one or more CSI-RS configurations of the first network node 111.

Determining/selecting 606 a third group of network nodes 140 operating in the communications network 100. The second network node 112 may be configured to perform this determining or selecting action 606, e.g. by means of the determining unit 1202, configured to perform this action.

The third group of network nodes 140 may be to which the second network node 112 is to transmit the transmission status of the one or more CSI-RS configurations of the first network node 111.

In some embodiments, at least one of the following may apply:
a. the determining 606 of the third group of network nodes 140 may be based on the received second indication,
b. the determining 606 of the third group of network nodes 140 may be based on a neighbour relation identified by the second network node 112 based on at least one of:
  i. radio measurements reported by a wireless device 160 operating in the communications network 100, and
  ii. another indication sent by the first network node 111,
c. the determining 603 of the second group of network nodes 130 may be based on the neighbour relation identified by the second network node 112.

Sending 607 a fifth indication. The second network node 112 may be configured to perform this sending action 607, e.g., by means of the sending unit 1203 within the second network node 112, configured to perform this action.

The second network node 112 may send the fifth indication to the fourth network node 114.

The fourth network node 114 may be comprised in the third group of network nodes 140. The sending in this Action 604 may be performed, e.g., via the second link 172.

The fifth indication may indicate the transmission status of the one or more CSI-RS configurations of the first network node 111.

The fifth indication may map to, that is, be comprised in another field, which may be referred to herein as a fifth field, in another IE, which may be referred to herein as a fifth IE.

In some embodiments, at least one of the following may apply to the first relation between the one or more CSI-RS configurations of the first network node 111 with the network nodes comprised in the first group of network nodes 120:
a. it may be based on the second relation between each CSI-RS of the first network node 111 and neighbouring New Radio, NR, cells 155 of the first network node 111;
b. it may be based on the third relation between a group of CSI-RSs of the first network node 111 and the neighbouring NR cells 155 of the first network node 111;
c. it may comprise the map between the one or more CSI-RS configurations of the first network node 111 and the network nodes comprised in the first group of network nodes 120; and
d. it may comprise the list of one or more neighbouring network nodes to which the one or more CSI-RS configurations of the first network node 111 are applicable.

In some embodiments, at least one of the following may apply:
a. the first network node 111 may operate on Fifth Generation 3GPP, 5G;
b. the second network node 112 may operate on Long Term Evolution, LTE;
c. the third network node 113 may operate on 5G 3GPP;
d. the first network node 111 may be a Secondary Node, SN;
e. the second network node 112 may be a Master Node, MN; and
f. the third network node 113 may be another SN.

In some embodiments, the indication may be a second indication which comprises an explicit neighbour relation for at least one of:
a. the set of CSI-RS indexes of the first cell 151 managed by the first network node 111; and
b. each of the CSI-RS indexes of the first cell 151 managed by the first network node 111.

In some examples, the second indication may be mapped to the first field in an Information Element (IE).

In some examples, the third indication may be mapped to the second field in an Information Element (IE).

The third network node 113 embodiments relate to FIG. 19, FIGS. 8-10, FIG. 13, FIG. 16, and FIGS. 20-25.

A method, performed by a third network node, such as the third network node 113 is described herein. The method may be understood to be for handling a measurement configuration. The third network node 113 may operate in the communications network 100. The third network node 113 may be comprised in the first group of network nodes 120. The first group of network nodes 120 may be neighbour network nodes to the first network node 111 operating in the communications network 100.

The method may comprise one or more of the following actions.

In some embodiments, all the actions may be performed. In other embodiments, one or more actions may be performed. One or more embodiments may be combined, where applicable. All possible combinations are not described to simplify the description. A non-limiting example of the method performed by the third network node 113 is depicted in FIG. 18. Some actions may be performed in a different order than that shown in FIG. 18. The detailed description of some of the following corresponds to the same references provided above, in relation to the actions described for the first node 111, and will thus not be repeated here. For example, the second indication may map to the first field, as described earlier, and/or the third indication may map to the second field, as described earlier.

Receiving 701 the fourth indication. The third network node 113 may be configured to perform this receiving action 701, e.g. by means of a receiving unit 1301 within the third network node 113, configured to perform this action. The receiving unit 1301 may be a processor 1304 of the third network node 113, or an application running on such processor.

The third network node 113 may receive the fourth indication from the second network node 112 operating in the communications network 100. The third network node 113 may be managed by the second network node 112. The fourth indication may indicate one or more Channel State Information-Reference Signal (CSI-RS) configurations of the first network node 111.

The receiving in this Action 701 may be performed, e.g., via the second link 172.

Configuring 703 the wireless device 130 operating in the communications network 100. The third network node 113 may be configured to perform this configuring action 703, e.g. by means of a configuring unit 1302, configured to perform this action. The configuring unit 1302 may be a processor 1304 of the third network node 113, or an application running on such processor.

The third network node 113 may configure the wireless device 130 based on the received fourth indication.

Receiving 702 the fifth indication. The third network node 113 may be configured to perform this receiving action 702, e.g., by means of the receiving unit 1301, configured to perform this action.

The third network node 113 may receive the fifth indication from the second network node 112. The fifth indication may indicate the transmission status of the one or more CSI-RS configurations of the first network node 111.

The receiving in this Action 702 may be performed, e.g., via the second link 172.

Configuring 704 the wireless device 130 operating in the communications network 100. The third network node 113 may be configured to perform this configuring action 704, e.g. by means of the configuring unit 1302, configured to perform this action.

The third network node 113 may configure the wireless device 130 based on the received fifth indication.

In some embodiments, the receiving in Action 701 may be based on at least one of:
    a. a relation between the one or more CSI-RS configurations of the first network node 111 and the third network node 113;
    b. a second relation between each CSI-RS of the first network node 111 and a third New Radio, NR, cell 153 of the third network node 113;
    c. a third relation between a group of CSI-RSs of the first network node 111 and the third NR cell 153 of the third network node 113.

In some embodiments, at least one of the following may apply:
    a. the first network node 111 may operate on Fifth Generation 3GPP, 5G;
    b. the third network node 113 may operate on Long Term Evolution, LTE;
    c. the third network node 113 may operate on 5G 3GPP;
    d. the first network node 111 may be a Secondary Node, SN;
    e. the third network node 113 may be a Master Node, MN; and
    f. the third network node 113 may be another SN.

In some examples, the second indication may be mapped to, e.g., may be comprised in, the first field in an Information Element (IE).

In some examples, the third indication may be mapped to, e.g., may be comprised in, the second field in an Information Element (IE).

Selected Examples Related to Embodiments Herein:

Example 1. A method performed by a first network node (111), the first network node (111) operating in a communications network (100), the method being for handling a measurement configuration, the method comprising:
    sending (502) an indication to a second network node (112) operating in the communications network (100), the first network node (111) being managed by the second network node (112), the indication indicating a relation between one or more Channel State Information-Reference Signal (CSI-RS) configurations of the first network node (111) with network nodes comprised in a first group of network nodes (120) operating in the communications network (100) comprising a third network node (113).

Example 2. The method according to example 1, wherein the indication is a second indication and wherein the method further comprises:
    sending (501) a first indication to the second network node (112), the first indication indicating the one or more CSI-RS configurations of the first network node (111).

Example 3. The method according to any of examples 1-2, wherein the indication is a second indication and wherein the method further comprises:
    sending (503) a third indication to the second network node (112), the third indication indicating a transmission status of the one or more CSI-RS configurations of the first network node (111).

Example 4. The method according to any of examples 1-3, wherein the relation is a first relation and wherein at least one of the following applies to the first relation between the one or more CSI-RS configurations of the first network node (111) with the network nodes comprised in the first group of network nodes (120):
    a. it is based on a second relation between each CSI-RS of the first network node (111) and neighbouring New Radio, NR, cells (155) of the first network node (111);
    b. it is based on a third relation between a group of CSI-RSs of the first network node (111) and the neighbouring NR cells (155) of the first network node (111);
    c. it comprises a map between the one or more CSI-RS configurations of the first network node (111) and the network nodes comprised in the first group of network nodes (120); and
    d. it comprises a list of one or more network nodes comprised in the first group of network nodes (120) to which the one or more CSI-RS configurations of the first network node (111) are applicable.

Example 5. The method according to any of examples 1-4, wherein at least one of:
- a. the first network node (111) operates on Fifth Generation 3GPP, 5G;
- b. the second network node (112) operates on Long Term Evolution, LTE;
- c. the third network node (113) operates on 5G 3GPP;
- a. the first network node (111) is a Secondary Node, SN;
- b. the second network node (112) is a Master Node, MN; and
- c. the third network node (113) is another SN.

Example 6. The method according to any of examples 1-5, wherein the indication is a second indication which comprises an explicit neighbour relation for at least one of:
- a. a set of CSI-RS indexes of a first cell (151) managed by the first network node (111); and
- b. each of the CSI-RS indexes of the first cell (151) managed by the first network node (111).

Example 7. The method according to any of examples 1-6, wherein at least one of:
- a. the indication is a second indication which is comprised in a first field in a first information element, and
- b. the third indication is comprised in a second field in a second information element.

Example 8. A method performed by a second network node (112), the second network node (112) operating in a communications network (100), the method being for handling a measurement configuration, the method comprising:
- receiving (602) an indication from a first network node (111) operating in the communications network (100), the second network node (112) managing the first network node (111), the indication indicating a first relation between one or more Channel State Information-Reference Signal (CSI-RS) configurations of the first network node (111) with network nodes comprised in a first group of network nodes (120) operating in the communications network (100) comprising a third network node (113), and
- determining/selecting (603), based on the received indication, a second group of network nodes (130) operating in the communications network (100), to which the second network node (112) is to transmit the one or more CSI-RS configurations of the first network node (111).

Example 9. The method according to example 8, wherein the indication is a second indication and wherein the method further comprises:
- receiving (601) a first indication from the first network node (111), the first indication indicating the one or more CSI-RS configurations of the first network node (111).

Example 10. The method according to any of examples 8-9, wherein the indication is a second indication and wherein the method further comprises:
- sending (604), based on the determined second group of network nodes (130), a fourth indication to the third network node (113), the fourth indication indicating the one or more CSI-RS configurations of the first network node (111).

Example 11. The method according to any of examples 8-10, wherein the indication is a second indication and wherein the method further comprises:
- receiving (605) a third indication from the first network node (111), the third indication indicating a transmission status of the one or more CSI-RS configurations of the first network node (111).

Example 12. The method according to example 11, wherein the method further comprises:
- determining (606) a third group of network nodes (140) operating in the communications network (100), to which the second network node (112) is to transmit the transmission status of the one or more CSI-RS configurations of the first network node (111).

Example 13. The method according to example 12, wherein at least one of:
- a. the determining (606) of the third group of network nodes (140) is based on the received second indication,
- b. the determining (606) of the third group of network nodes (140) is based on a neighbour relation identified by the second network node (112) based on at least one of:
  - i. radio measurements reported by a wireless device (160) operating in the communications network (100), and
  - ii. another indication sent by the first network node (111),
- c. the determining (603) of the second group of network nodes (130) is based on the neighbour relation identified by the second network node (112).

Example 14. The method according to any of examples 12-13, herein the method further comprises:
- sending (607) a fifth indication to a fourth network node (114) comprised in the third group of network nodes (140), the fifth indication indicating the transmission status of the one or more CSI-RS configurations of the first network node (111).

Example 15. The method according to any of examples 8-14, wherein at least one of the following applies to the first relation between the one or more CSI-RS configurations of the first network node (111) with the network nodes comprised in the first group of network nodes (120):
- a. it is based on a second relation between each CSI-RS of the first network node (111) and neighbouring New Radio, NR, cells (155) of the first network node (111);
- b. it is based on a third relation between a group of CSI-RSs of the first network node (111) and the neighbouring NR cells (155) of the first network node (111);
- c. it comprises a map between the one or more CSI-RS configurations of the first network node (111) and the network nodes comprised in the first group of network nodes (120); and
- d. it comprises a list of one or more neighbouring network nodes to which the one or more CSI-RS configurations of the first network node (111) are applicable.

Example 16. The method according to any of examples 8-15, wherein at least one of:
- a. the first network node (111) operates on Fifth Generation 3GPP, 5G;
- b. the second network node (112) operates on Long Term Evolution, LTE;
- c. the third network node (113) operates on 5G 3GPP;
- d. the first network node (111) is a Secondary Node, SN;
- e. the second network node (112) is a Master Node, MN; and
- f. the third network node (113) is another SN.

Example 17. The method according to any of examples 8-16, wherein the indication is a second indication, and wherein the second indication comprises an explicit neighbour relation for at least one of:
- a. a set of CSI-RS indexes of a first cell (151) managed by the first network node (111); and
- b. each of the CSI-RS indexes of the first cell (151) managed by the first network node (111).

Example 18. The method according to any of examples 8-17, wherein at least one of:

a. the indication is a second indication which is comprised in a first field in a first information element, and
b. the third indication is comprised in a second field in a second information element.

Example 19. A method performed by a third network node (113), the third network node (113) operating in a communications network (100), the third network node (113) being comprised in a first group of network nodes (120), the first group of network nodes (120) may be neighbours to a first network node (111) operating in the communications network (100), the method being for handling a measurement configuration, the method comprising:

receiving (701) a fourth indication from a second network node (112) operating in the communications network (100), third network node (113) being managed by the second network node (112), the fourth indication indicating one or more Channel State Information-Reference Signal (CSI-RS) configurations of the first network node (111), and configuring (703) a wireless device (130) operating in the communications network (100) based on the received fourth indication.

Example 20. The method according to example 20, wherein the receiving (701) is based on at least one of:

a. a relation between the one or more CSI-RS configurations of the first network node (111) and the third network node (113),
b. a second relation between each CSI-RS of the first network node (111) and a third New Radio, NR, cell (153) of the third network node (113);
c. a third relation between a group of CSI-RSs of the first network node (111) and the third NR cell (153) of the third network node (113).

Example 21. The method according to example 20, wherein the method further comprises:

receiving (702) a fifth indication from the second network node (112), the fifth indication indicating a transmission status of the one or more CSI-RS configurations of the first network node (111), and configuring (704) the wireless device (130) based on the received fifth indication.

Example 22. The method according to any of examples 20-21, wherein at least one of:

a. the first network node (111) operates on Fifth Generation 3GPP, 5G;
b. the second network node (112) operates on Long Term Evolution, LTE;
c. the third network node (113) operates on 5G 3GPP;
d. the first network node (111) is a Secondary Node, SN;
e. the second network node (112) is a Master Node, MN; and
f. the third network node (113) is another SN.

Example 23. The method according to any of examples 20-22, wherein at least one of:

a. the indication is a second indication which is comprised in a first field in a first information element, and
b. the third indication is comprised in a second field in a second information element.

Further Extensions and Variations

Figure 20:
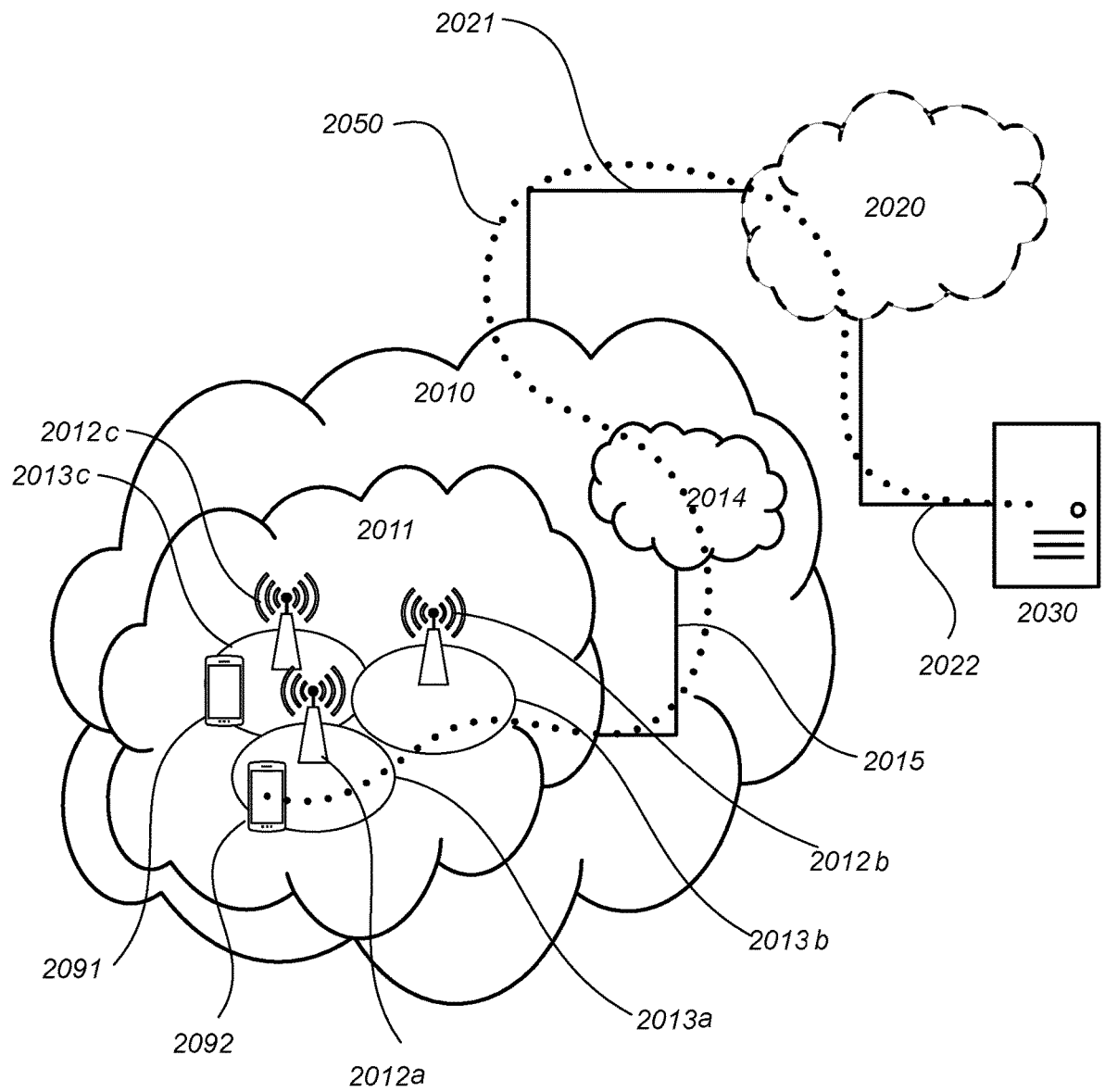
FIG. 20 is a schematic block diagram illustrating a telecommunication network connected via an intermediate network to a host computer, according to embodiments herein.

FIG. 20: Telecommunication Network Connected Via an Intermediate Network to a Host Computer in Accordance with Some Embodiments With reference to FIG. 20, in accordance with an embodiment, a communication system includes telecommunication network 2010 such as the communications network 100, for example, a 3GPP-type cellular network, which comprises access network 2011, such as a radio access network, and core network 2014. Access network 2011 comprises a plurality of network nodes such as any of the first network node 111, the second network node 112, the third network node 113, and/or any of the nodes comprised in any of the first group of network nodes 120, the second group of network nodes 130 and the third group of network nodes 140. For example, base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to core network 2014 over a wired or wireless connection 2015. A plurality of wireless devices, such as the wireless device 160 are comprised in the communications network 100. In FIG. 20, a first UE 2091 located in coverage area 2013c is configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the corresponding base station 2012. Any of the UEs 2091, 2092 are examples of the wireless device 160.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

In relation to FIGS. 21, 22, 23, 24, and 25, which are described next, it may be understood that a UE is an example of the wireless device 160, and that any description provided for the UE equally applies to the wireless device 160. It may be also understood that the base station is an example of any of the first network node 111, the second network node 112, the third network node 113, and/or any of the nodes comprised in any of the first group of network nodes 120, the second group of network nodes 130 and the third group of network nodes 140, and that any description provided for the base station equally applies to any of the first network node 111, the second network node 112, the third network node 113, and/or any of the nodes comprised in any of the first group of network nodes 120, the second group of network nodes 130 and the third group of network nodes 140.

Figure 21:
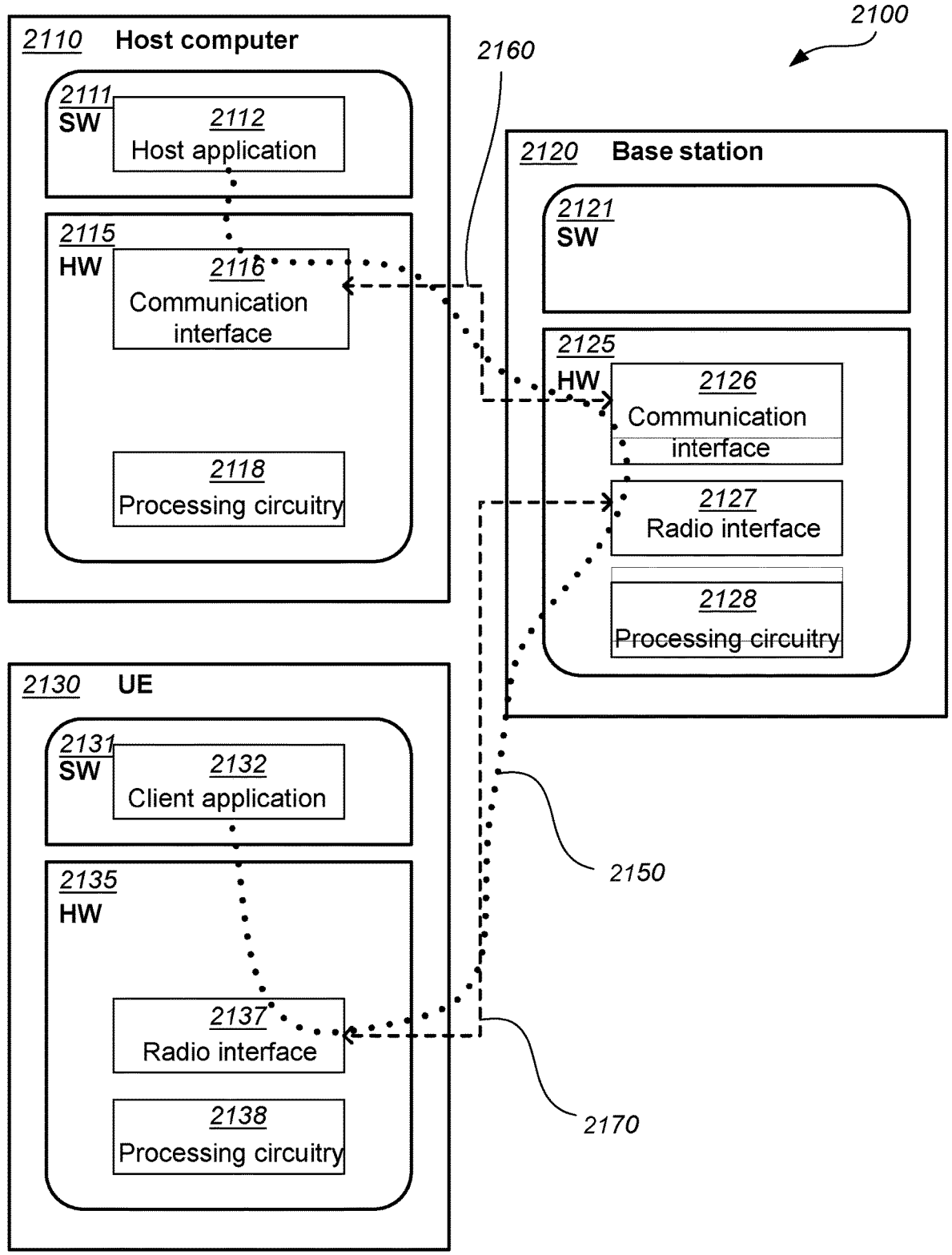
FIG. 21 is a generalized block diagram of a host computer communicating via a base station with a user equipment over a partially wireless connection, according to embodiments herein.

FIG. 21: Host Computer Communicating Via a Base Station with a User Equipment Over a Partially Wireless Connection in Accordance with Some Embodiments Example implementations, in accordance with an embodiment, of the wireless device 160, e.g., a UE, any of the first network node 111, the second network node 112, the third network node 113, and/or any of the nodes comprised in any of the first group of network nodes 120, the second group of network nodes 130 and the third group of network nodes 140, e.g., a base station and host computer discussed in the preceding paragraphs will now be described with reference to FIG. 21. In communication system 2100, such as the communications network 100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes any of the first network node 111, the second network node 112, the third network node 113, and/or any of the nodes comprised in any of the first group of network nodes 120, the second group of network nodes 130 and the third group of network nodes 140, exemplified in FIG. 21 as a base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with the wireless device 160, exemplified in FIG. 21 as a UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

It is noted that host computer 2110, base station 2120 and UE 2130 illustrated in FIG. 21 may be similar or identical to host computer 2030, one of base stations 2012a, 2012b, 2012c and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

FIG. 22: Methods Implemented in a Communication System Including a Host Computer, a Base Station and a User Equipment in Accordance with Some Embodiments FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

The first network node 111 embodiments relate to FIG. 5, FIGS. 8-10, FIG. 11, FIG. 14 and FIGS. 20-25.

The first network node 111 may also be configured to communicate user data with a host application unit in a host computer 2110, e.g., via another link such as 2160.

The first network node 111 may comprise an interface unit to facilitate communications between the first network node 111 and other nodes or devices, e.g., any of the second network node 112, the third network node 113, and any of the nodes comprised in any of the first group of network nodes 120, the second group of network nodes 130 and the third group of network nodes 140, the wireless device 160, the host computer 2110, or any of the other nodes. In some particular examples, the interface may, for example, include a transceiver configured to transmit and receive radio signals over an air interface in accordance with a suitable standard.

The first network node 111 may comprise an arrangement as shown in FIG. 11 or in FIG. 21.

The second network node 112 embodiments relate to FIG. 6, FIGS. 8-10, FIG. 12, FIG. 15, and FIGS. 20-25.

The second network node 112 may also be configured to communicate user data with a host application unit in a host computer 2110, e.g., via another link such as 2160.

The second network node 112 may comprise an interface unit to facilitate communications between the second network node 112 and other nodes or devices, e.g., any of the first network node 111, the second network node 112, the third network node 113, and any of the nodes comprised in any of the first group of network nodes 120, the second group of network nodes 130 and the third group of network nodes 140, the one the wireless device 160, the host computer 1110, or any of the other nodes. In some particular examples, the interface may, for example, include a transceiver configured to transmit and receive radio signals over an air interface in accordance with a suitable standard.

The second network node 112 may comprise an arrangement as shown in FIG. 12 or in FIG. 21.

The third network node 113 embodiments relate to FIG. 7, FIGS. 8-10, FIG. 13, FIG. 16, and FIGS. 20-25.

The third network node 113 may also be configured to communicate user data with a host application unit in a host computer 2110, e.g., via another link such as 2170.

The third network node 113 may comprise an interface unit to facilitate communications between the third network node 113 and other nodes or devices, e.g., any of the first network node 111, the second network node 112, the third network node 113, and any of the nodes comprised in any of the first group of network nodes 120, the second group of network nodes 130 and the third group of network nodes 140, the one the wireless device 170, the host computer 1110, or any of the other nodes. In some particular examples, the interface may, for example, include a transceiver configured to transmit and receive radio signals over an air interface in accordance with a suitable standard.

The third network node 113 may comprise an arrangement as shown in FIG. 13 or in FIG. 21.

FIG. 23: Methods Implemented in a Communication System Including a Host Computer, a Base Station and a User Equipment in Accordance with Some Embodiments FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

FIG. 24: Methods Implemented in a Communication System Including a Host Computer, a Base Station and a User Equipment in Accordance with Some Embodiments FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

FIG. 25: Methods Implemented in a Communication System Including a Host Computer, a Base Station and a User Equipment in Accordance with Some Embodiments FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by any of the first network node 111, the second network node 112, and/or the third network node 113.

5. A communication system including a host computer comprising:
 processing circuitry configured to provide user data; and
 a communication interface configured to forward the user data to a cellular network for transmission to a user equipment (UE),
 wherein the cellular network comprises a base station having a radio interface and processing circuitry, the base station's processing circuitry configured to perform one or more of the actions described herein as performed by any of the first network node 111, the second network node 112, and/or the third network node 113.

6. The communication system of embodiment 5, further including the base station.

7. The communication system of embodiment 6, further including the UE, wherein the UE is configured to communicate with the base station.

8. The communication system of embodiment 7, wherein:
 the processing circuitry of the host computer is configured to execute a host application, thereby providing the user data; and
 the UE comprises processing circuitry configured to execute a client application associated with the host application.

11. A method implemented in a base station, comprising one or more of the actions described herein as performed by any of the first network node 111, the second network node 112, and/or the third network node 113.

15. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the base station performs one or more of the actions described herein as performed by any of the first network node 111, the second network node 112, and/or the third network node 113.

16. The method of embodiment 15, further comprising:
 at the base station, transmitting the user data.

17. The method of embodiment 16, wherein the user data is provided at the host computer by executing a host application, the method further comprising:
 at the UE, executing a client application associated with the host application.

21. A user equipment (UE) configured to communicate with a base station, the UE comprising a radio interface and processing circuitry configured to perform one or more of the actions described herein as performed by the wireless device 160.

25. A communication system including a host computer comprising:
 processing circuitry configured to provide user data; and
 a communication interface configured to forward user data to a cellular network for transmission to a user equipment (UE),
 wherein the UE comprises a radio interface and processing circuitry, the UE's processing circuitry configured to perform one or more of the actions described herein as performed by the wireless device 160.

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

31. A method implemented in a user equipment (UE), comprising one or more of the actions described herein as performed by the wireless device 160.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the wireless device 160.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the wireless device 160.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the wireless device 160.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the wireless device 160.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the wireless device 160.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by any of the first network node 111, the second network node 112, and/or the third network node 113.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by any of the first network node 111, the second network node 112, and/or the third network node 113.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by any of the first network node 111, the second network node 112, and/or the third network node 113.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the wireless device 160.

76. The method of embodiment 75, further comprising:
at the base station, receiving the user data from the UE.

77. The method of embodiment 76, further comprising:
at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
AMF Access Management Function
CA Carrier Aggregation
CSI-RS Channel State Information Reference Signal
DL Downlink
DRB Data Radio Bearer
EN-DC E-UTRAN New Radio-Dual Connectivity
IP Internet Protocol
LCG Logical Channel Group
LCID Logical Channel Identity
LCP Logical Channel Prioritization
MAC Medium Access Control
MAC CE MAC Control Element
MAC CE Medium Access Control-Control Element
MR-DC Multi Radio Dual Connectivity
NR New radio
NW Network
PDU Packet Data Unit
PRB Physical Resource Block
RE Resource Element
RRC Radio Resource Control
SA Standalone
SMF Session Management Function
SSB Synchronization Signal Block
TRP Total Radiated Power
UE User Equipment
UL Uplink

REFERENCES

[1] R3-195941, "Discussion on CSI RS transfer in NG-RAN nodes", Ericsson, 3GPP RAN3 #105 meeting

The invention claimed is:

1. A method performed by a first network node, the first network node operating in a communications network, the method being for handling a measurement configuration, the method comprising:
sending an indication to a second network node operating in the communications network, the indication indicating a transmission status of one or more Channel State Information-Reference Signal, CSI-RS, configurations of the first network node, wherein the indication comprises the transmission status of only those CSI-RS configurations that have changed their status compared to a previous update of the transmission status; and
sending a second indication to the second network node, the second indication indicating a relation between the one or more CSI-RS configurations of the first network node with network nodes comprised in a first group of network nodes operating in the communications network comprising a third network node, wherein the second indication comprises an explicit neighbor relation for at least one of 1) a set of CSI-RS indexes of a first cell managed by the first network node and 2) each of the CSI-RS indexes of the first cell managed by the first network node.

2. The method according to claim 1, wherein the first network node manages a first cell, and wherein the sending comprises sending the transmission status of the CSI-RS configurations of the first network node.

3. The method according to claim 1, wherein the indication is a third indication and wherein the method further comprises: sending a first indication to the second network node, the first indication indicating the one or more CSI-RS configurations of the first network node.

4. The method according to claim 1, wherein the relation is a first relation and wherein at least one of the following applies to the first relation between the one or more CSI-RS configurations of the first network node with the network nodes comprised in the first group of network nodes:
a. it is based on a second relation between each CSI-RS of the first network node and neighboring New Radio, NR, cells of the first network node;
b. it is based on a third relation between a group of CSI-RSs of the first network node and the neighboring NR cells of the first network node;
c. it comprises a map between the one or more CSI-RS configurations of the first network node and the network nodes comprised in the first group of network nodes; and
d. it comprises a list of one or more network nodes comprised in the first group of network nodes to which the one or more CSI-RS configurations of the first network node are applicable.

5. The method according to claim 1, wherein at least one of:
a. the first network node operates on NR;
b. the second network node operates on Evolved Universal Terrestrial Access, E-UTRA;
c. the third network node operates on NR;
d. the first network node is a Secondary Node, SN;
e. the second network node is a Master Node, MN; and
f. the third network node is another SN.

6. The method according to claim 1, wherein the second indication comprises an explicit neighbor relation for at least one of:
a. a set of CSI-RS indexes of a first cell managed by the first network node; and
b. each of the CSI-RS indexes of the first cell managed by the first network node.

7. The method according to claim 1, wherein at least one of:
a. the second indication is comprised in a first field in a first information element, and
b. the third indication is comprised in a second field in a second information element.

8. A method performed by a second network node, the second network node operating in a communications network, the method being for handling a measurement configuration, the method comprising:
receiving an indication from a first network node operating in the communications network, the second network node managing the first network node, the indication indicating a transmission status of one or more Channel State Information-Reference Signal, CSI-RS, configurations of the first network node, wherein the indication comprises the transmission status of only those CSI-RS configurations that have changed their status compared to a previous update of the transmission status; and
receiving a second indication from the first network node, the second indication indicating a first relation between the one or more CSI-RS configurations of the first network node with network nodes comprised in a first group of network nodes operating in the communications network comprising a third network node.

9. The method according to claim 8, wherein the first network node manages a first cell, and wherein the receiving comprises receiving the transmission status of the CSI-RS configurations of the first network node.

10. The method according to claim 8, wherein the first network node manages a first cell, and wherein the receiving comprises receiving the transmission status of the CSI-RS configurations of the first network node.

11. The method according to claim 8, determining, based on the received second indication, a second group of network nodes operating in the communications network, to which the second network node is to transmit the one or more CSI-RS configurations of the first network node.

12. The method according to claim 11, wherein the method further comprises: sending, based on the determined second group of network nodes, a fourth indication to the third network node, the fourth indication indicating the one or more CSI-RS configurations of the first network node.

13. The method according to claim 11, wherein at least one of:
   a. the determining of the third group of network nodes is based on the received second indication,
   b. the determining of the third group of network nodes is based on a neighbor relation identified by the second network node based on at least one of:
      i. radio measurements reported by a wireless device operating in the communications network, and
      ii. another indication sent by the first network node,
   c. the determining of the second group of network nodes is based on the neighbor relation identified by the second network node.

14. The method according to claim 11, wherein at least one of the following applies to the first relation between the one or more CSI-RS configurations of the first network node with the network nodes comprised in the first group of network nodes:
   a. it is based on a second relation between each CSI-RS of the first network node and neighboring New Radio, NR, cells of the first network node;
   b. it is based on a third relation between a group of CSI-RSs of the first network node and the neighboring NR cells of the first network node;
   c. it comprises a map between the one or more CSI-RS configurations of the first network node and the network nodes comprised in the first group of network nodes; and
   d. it comprises a list of one or more neighboring network nodes to which the one or more CSI-RS configurations of the first network node are applicable.

15. The method according to claim 11, wherein at least one of:
   a. the first network node operates on NR;
   b. the second network node operates on Evolved Universal Terrestrial Access, E-UTRA;
   c. the third network node operates on NR;
   d. the first network node is a Secondary Node, SN;
   e. the second network node is a Master Node, MN; and
   f. the third network node is another SN.

16. The method according to claim 11, wherein the second indication comprises an explicit neighbor relation for at least one of:
   a. a set of CSI-RS indexes of a first cell managed by the first network node; and
   b. each of the CSI-RS indexes of the first cell managed by the first network node.

17. The method according to claim 11, wherein at least one of:
   a. the second indication is comprised in a first field in a first information element, and
   b. the third indication is comprised in a second field in a second information element.

18. The method according to claim 8, wherein the method further comprises: determining a third group of network nodes operating in the communications network, to which the second network node is to transmit the transmission status of the one or more CSI-RS configurations of the first network node.

19. The method according to claim 18, wherein the indication is a third indication, and wherein the method further comprises:
   sending a fifth indication to a fourth network node comprised in the third group of network nodes, the fifth indication indicating the transmission status of the one or more CSI-RS configurations of the first network node.

20. A method performed by a third network node, the third network node operating in a communications network, the third network node being comprised in a first group of network nodes, the first group of network nodes are neighbors to a first network node operating in the communications network, the method being for handling a measurement configuration, the method comprising:
   receiving an indication from a second network node operating in the communications network, the third network node being managed by the second network node, the indication indicating a transmission status of the one or more Channel State Information-Reference Signal, CSI-RS, configurations of the first network node, wherein the indication comprises the transmission status of only those CSI-RS configurations that have changed their status compared to a previous update of the transmission status, and
   configuring the wireless device based on the received indication.

21. The method according to claim 20, wherein the indication is a fifth indication, and wherein the method further comprises:
   receiving a fourth indication from the second network node, the fourth indication indicating the one or more CSI-RS configurations of the first network node, and
   configuring a wireless device operating in the communications network based on the received fourth indication.

22. The method according to claim 21, wherein the receiving is based on at least one of:
   a. a relation between the one or more CSI-RS configurations of the first network node and the third network node;
   b. a second relation between each CSI-RS of the first network node and a third New Radio, NR, cell of the third network node;
   c. a third relation between a group of CSI-RSs of the first network node and the third NR cell of the third network node.

23. The method according to claim 22, wherein the indication is a fifth indication, and wherein the fifth indication is comprised in a second field in a second information element.

24. The method according to claim 20, wherein at least one of:
   a. the first network node operates on NR;
   b. the second network node operates on Evolved Universal Terrestrial Access, E-UTRA;
   c. the third network node operates on NR;
   d. the first network node is a Secondary Node, SN;
   e. the second network node is a Master Node, MN; and
   f. the third network node is another SN.

* * * * *